US012010364B2

(12) United States Patent
Sanders et al.

(10) Patent No.: US 12,010,364 B2
(45) Date of Patent: Jun. 11, 2024

(54) USER INTERFACES FOR DISPLAYING CONTENT RECOMMENDATIONS FOR A GROUP OF USERS

(71) Applicant: Apple Inc., Cupertino, CA (US)

(72) Inventors: Christopher J. Sanders, San Jose, CA (US); Neil P. Cormican, Menlo Park, CA (US); Tommy J. Payne, Santa Monica, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/805,356

(22) Filed: Jun. 3, 2022

(65) Prior Publication Data

US 2022/0394349 A1    Dec. 8, 2022

Related U.S. Application Data

(60) Provisional application No. 63/197,444, filed on Jun. 6, 2021.

(51) Int. Cl.
*H04N 21/25* (2011.01)
*H04N 21/258* (2011.01)
(Continued)

(52) U.S. Cl.
CPC ..... *H04N 21/252* (2013.01); *H04N 21/25891* (2013.01); *H04N 21/43076* (2020.08);
(Continued)

(58) Field of Classification Search
CPC ........... H04N 21/252; H04N 21/25891; H04N 21/43076; H04N 21/4532; H04N 21/4661; H04N 21/4668; H04N 21/4826
See application file for complete search history.

(56) References Cited

U.S. PATENT DOCUMENTS 6,323,846 B1    11/2001  Westerman et al.
6,570,557 B1    5/2003   Westerman et al.
(Continued)

FOREIGN PATENT DOCUMENTS

WO    2013/169849 A2    11/2013
WO    2014/105276 A1    7/2014

OTHER PUBLICATIONS

International Search Report received for PCT Patent Application No. PCT/US2022/072753, mailed on Sep. 22, 2022, 5 pages.

*Primary Examiner* — John R Schnurr
(74) *Attorney, Agent, or Firm* — Kubota & Basol LLP

(57) ABSTRACT

In some embodiments, an electronic device presents recommended content for a set of users in accordance with some embodiments of the disclosure. The electronic device is associated with a plurality of user accounts, including a first user account, displaying, via a display generation component, a media browsing user interface associated with the first user account. In accordance a determination that the first user account satisfies one or more criteria and in accordance with a determination that a first subset of user accounts of the plurality of user accounts associated with the electronic device has been selected for inclusion in content recommendations, the electronic device is configured to display, in the media browsing user interface, one or more representations of media content recommendations based on one or more characteristics of the first user account and the first subset of user accounts.

36 Claims, 40 Drawing Sheets

(51) Int. Cl.
   *H04N 21/43*     (2011.01)
   *H04N 21/45*     (2011.01)
   *H04N 21/466*    (2011.01)
   *H04N 21/482*    (2011.01)

(52) U.S. Cl.
   CPC ..... *H04N 21/4532* (2013.01); *H04N 21/4661* (2013.01); *H04N 21/4668* (2013.01); *H04N 21/4826* (2013.01)

(56) References Cited

U.S. PATENT DOCUMENTS

| | | |
|---|---|---|
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,933,937 B2 | 4/2018 | Lemay et al. |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2014/0244753 A1 | 8/2014 | Tseng |
| 2016/0029057 A1* | 1/2016 | Wickenkamp ... H04N 21/26283 725/14 |
| 2016/0029098 A1* | 1/2016 | Fogelson ............ G06F 16/435 725/14 |
| 2019/0342616 A1 | 11/2019 | Domm et al. |
| 2020/0396497 A1* | 12/2020 | Liu .................... H04N 21/4826 |

\* cited by examiner

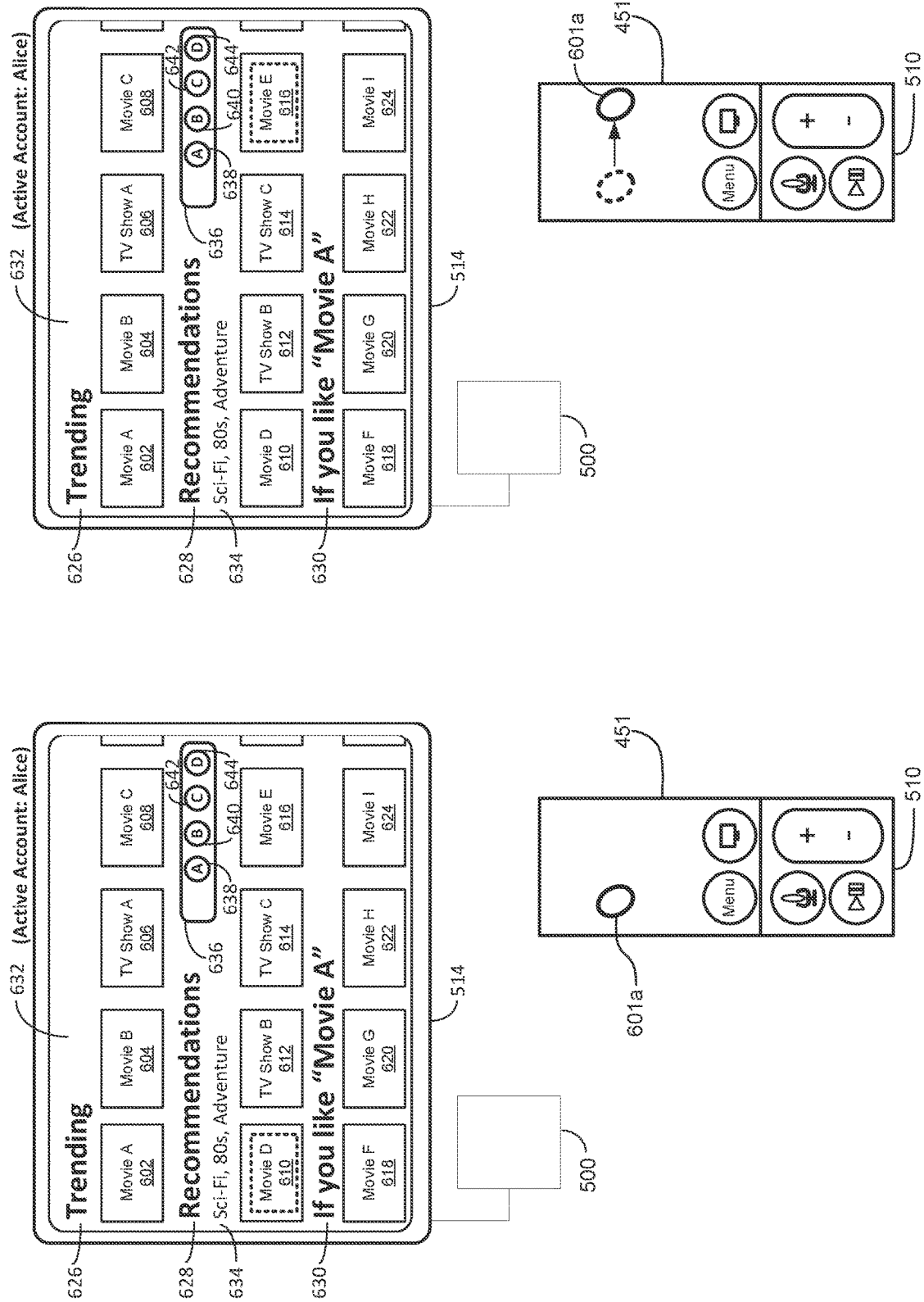

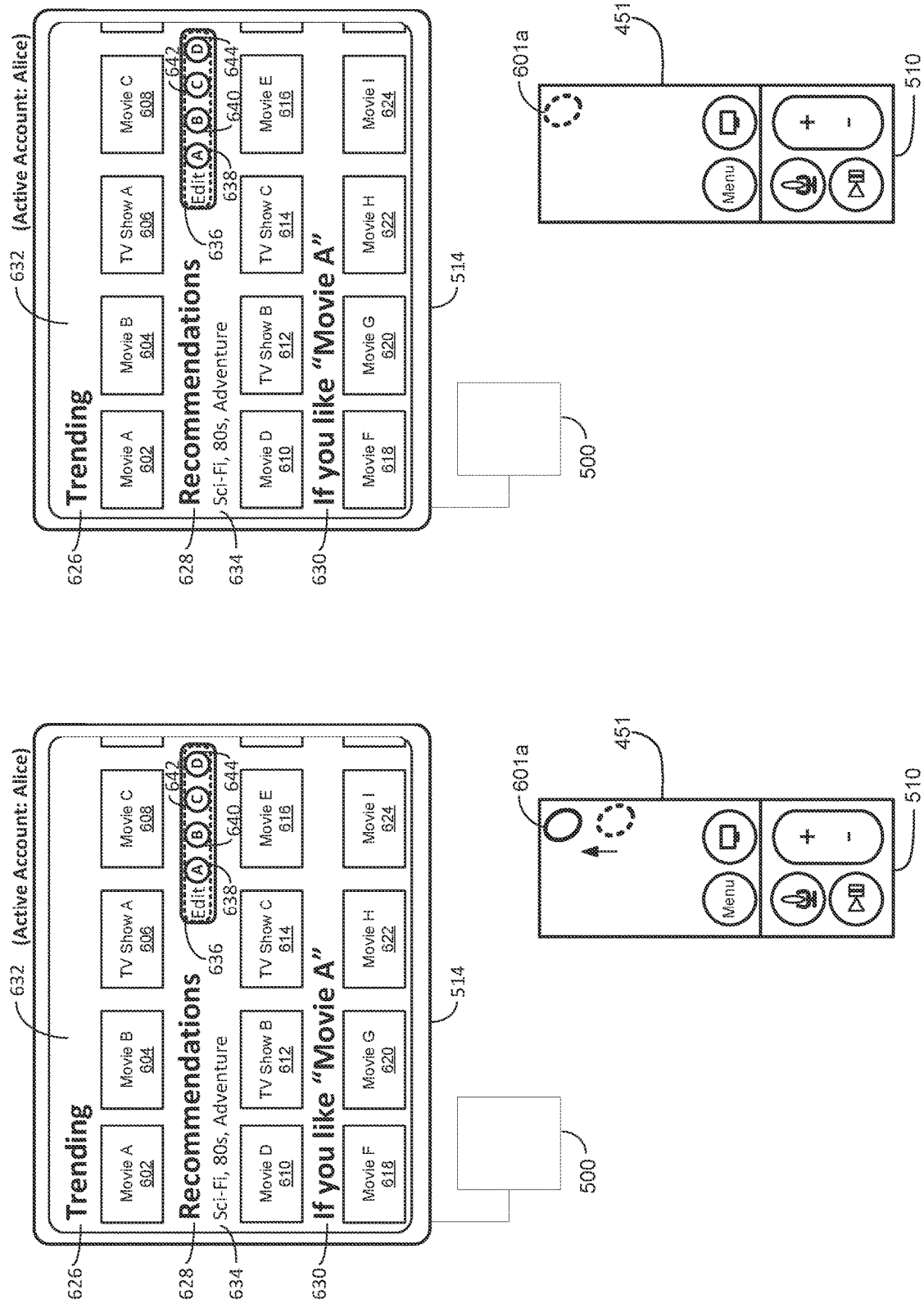

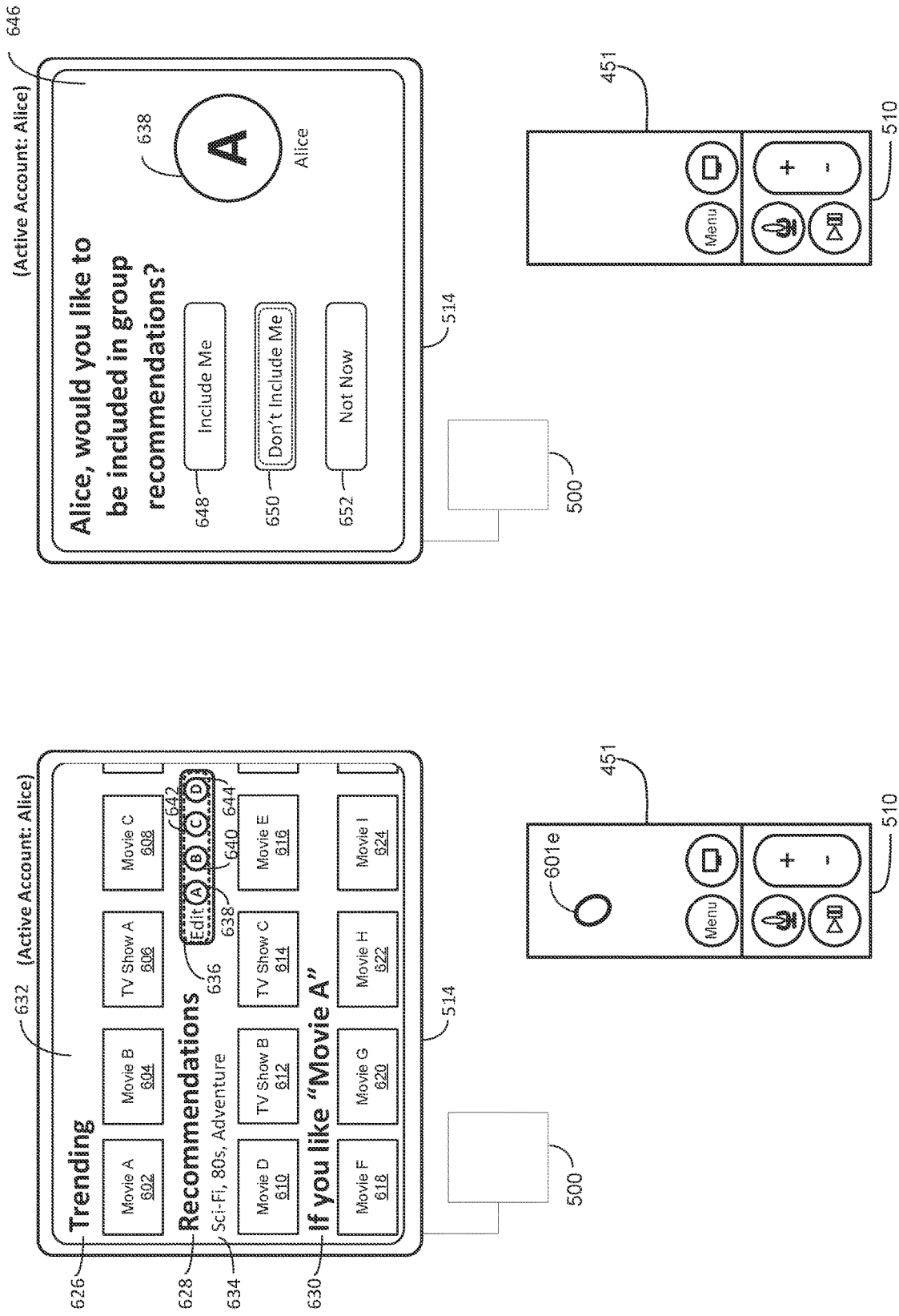

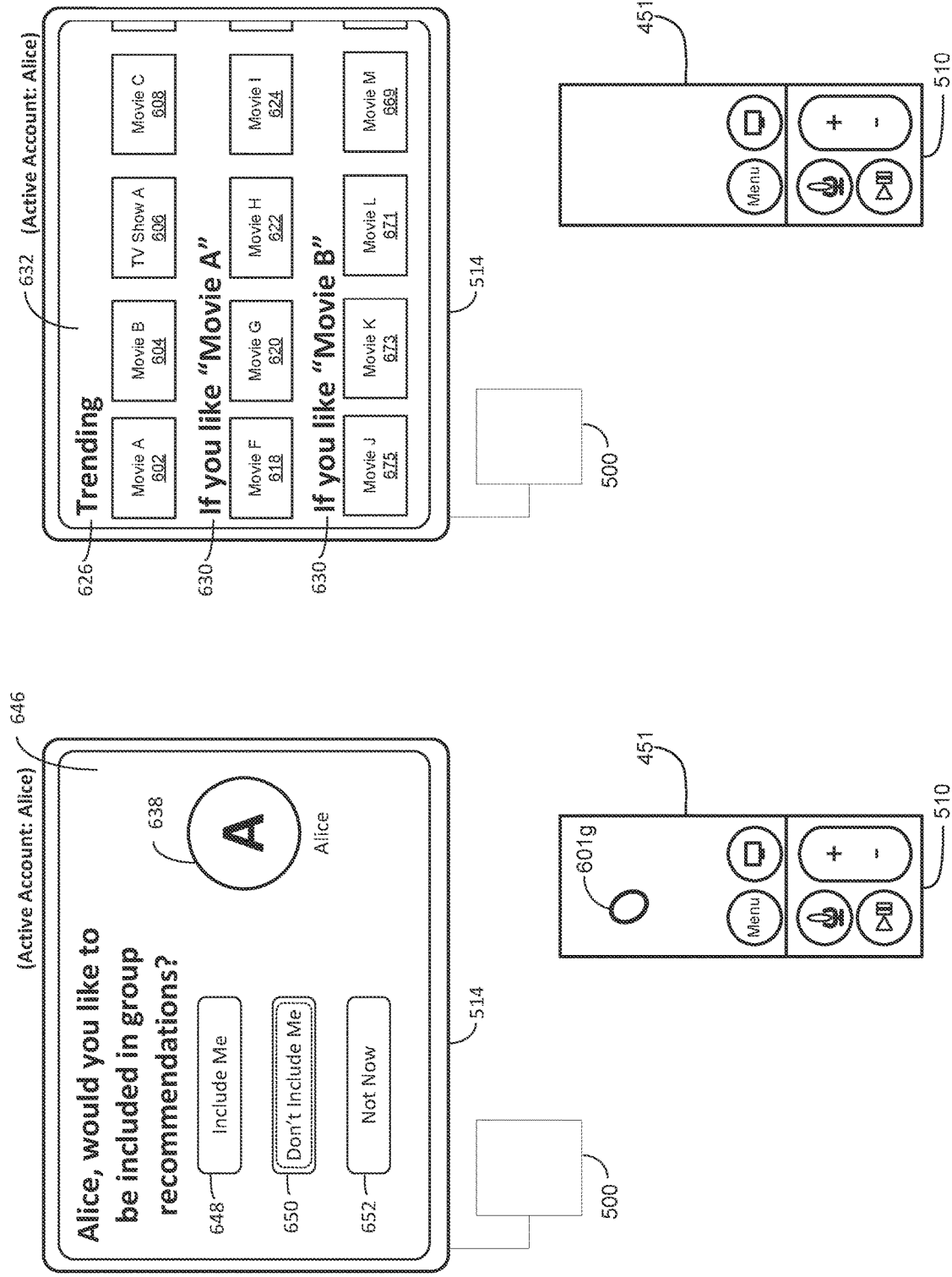

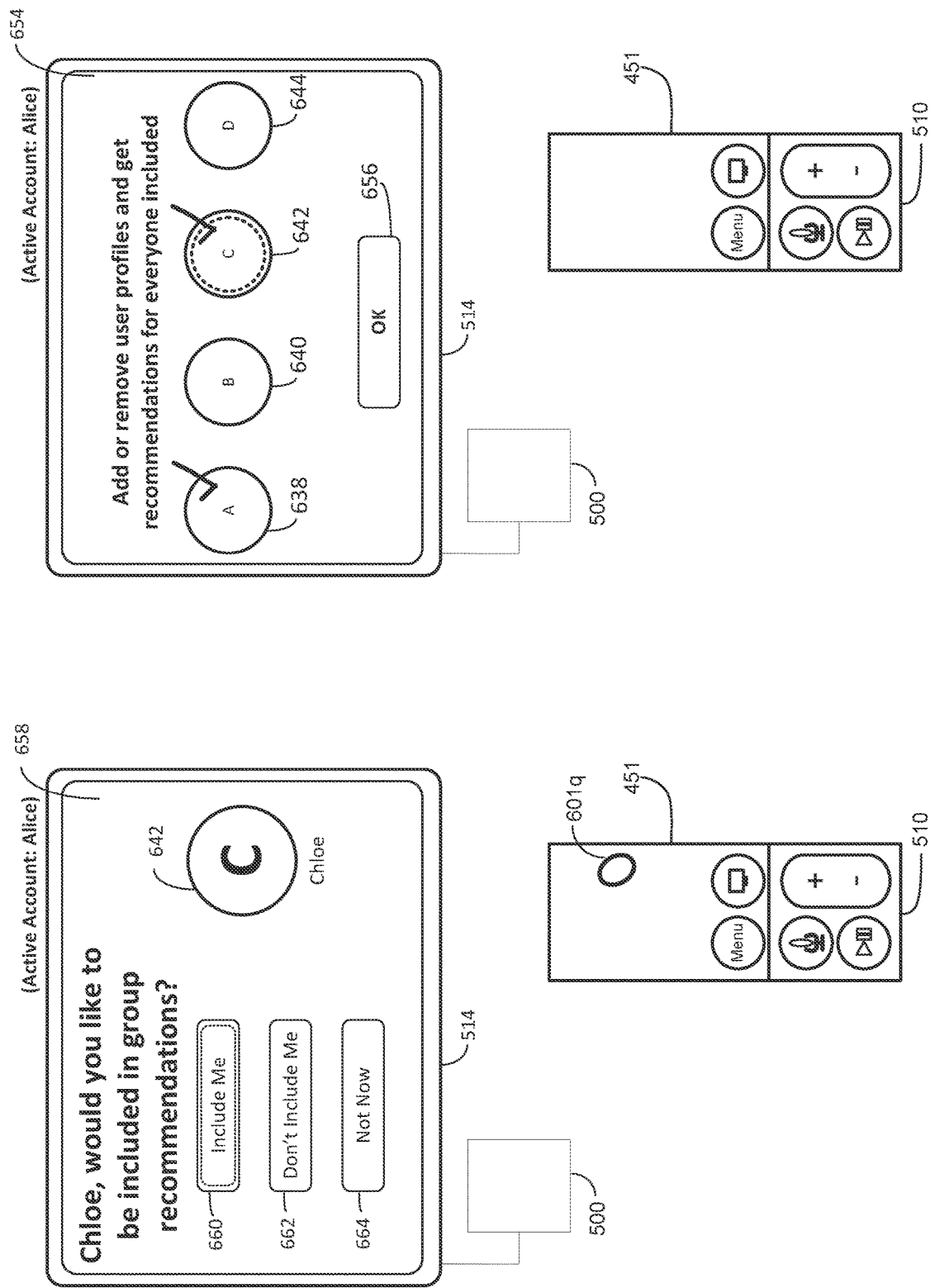

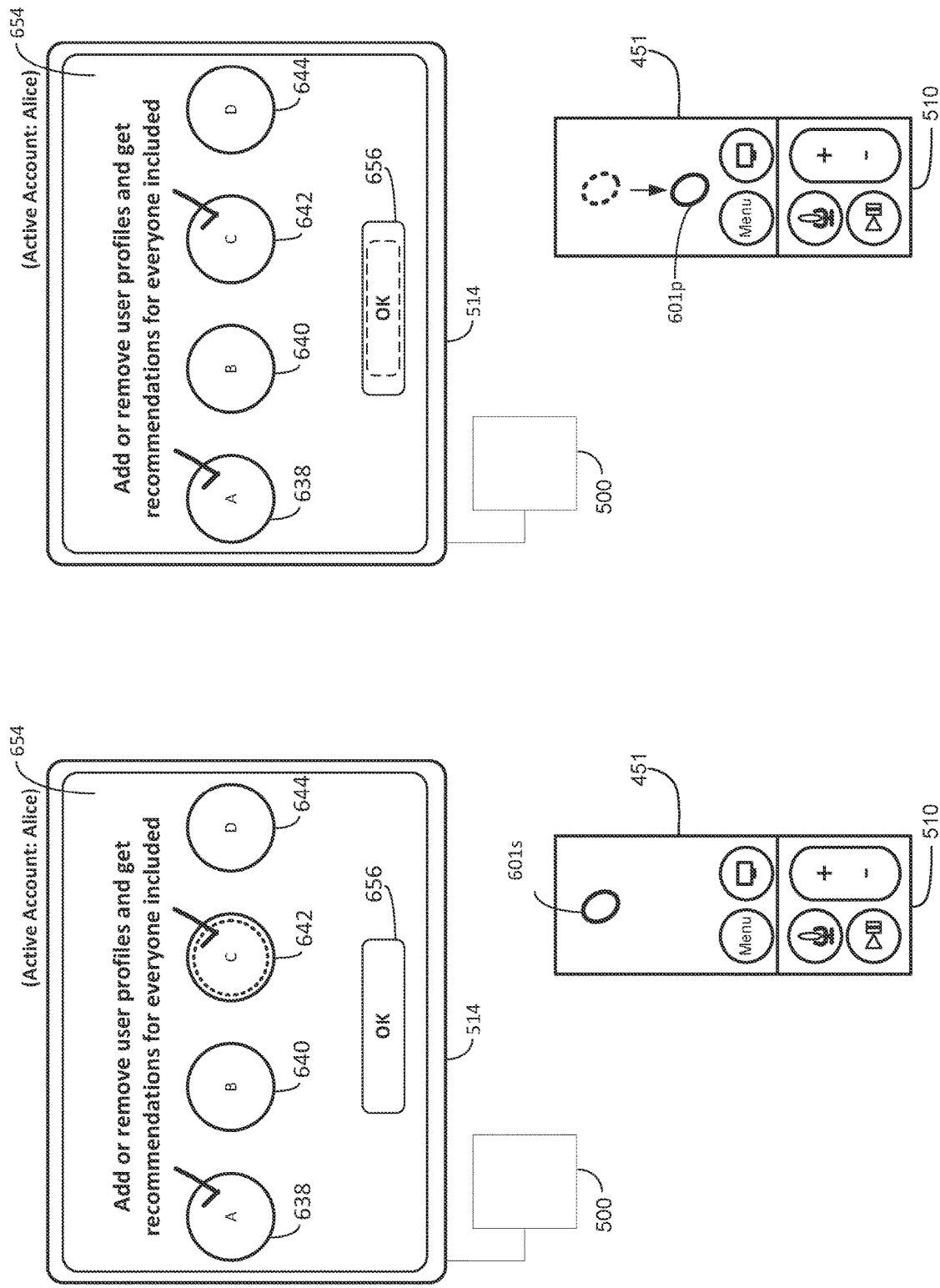

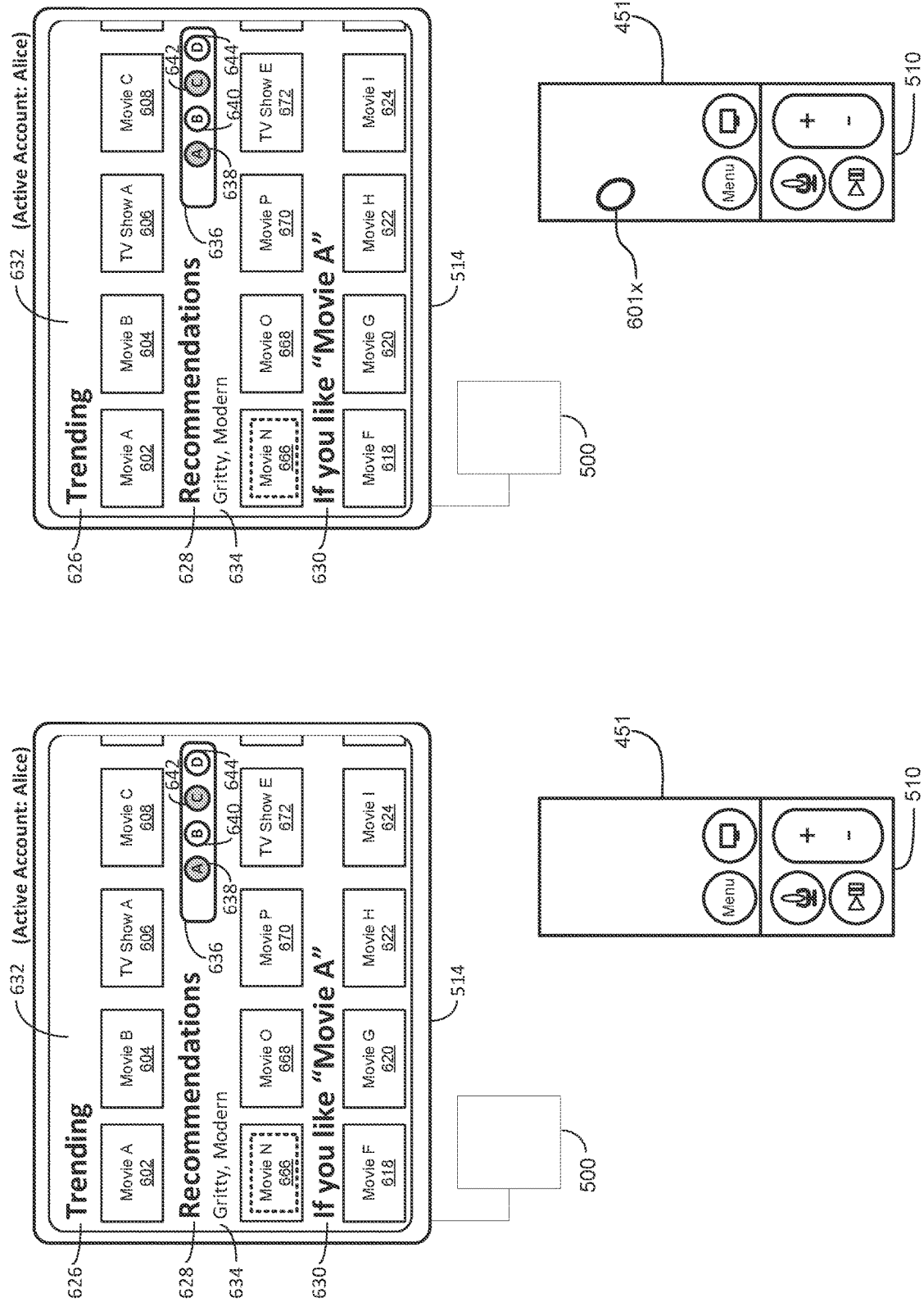

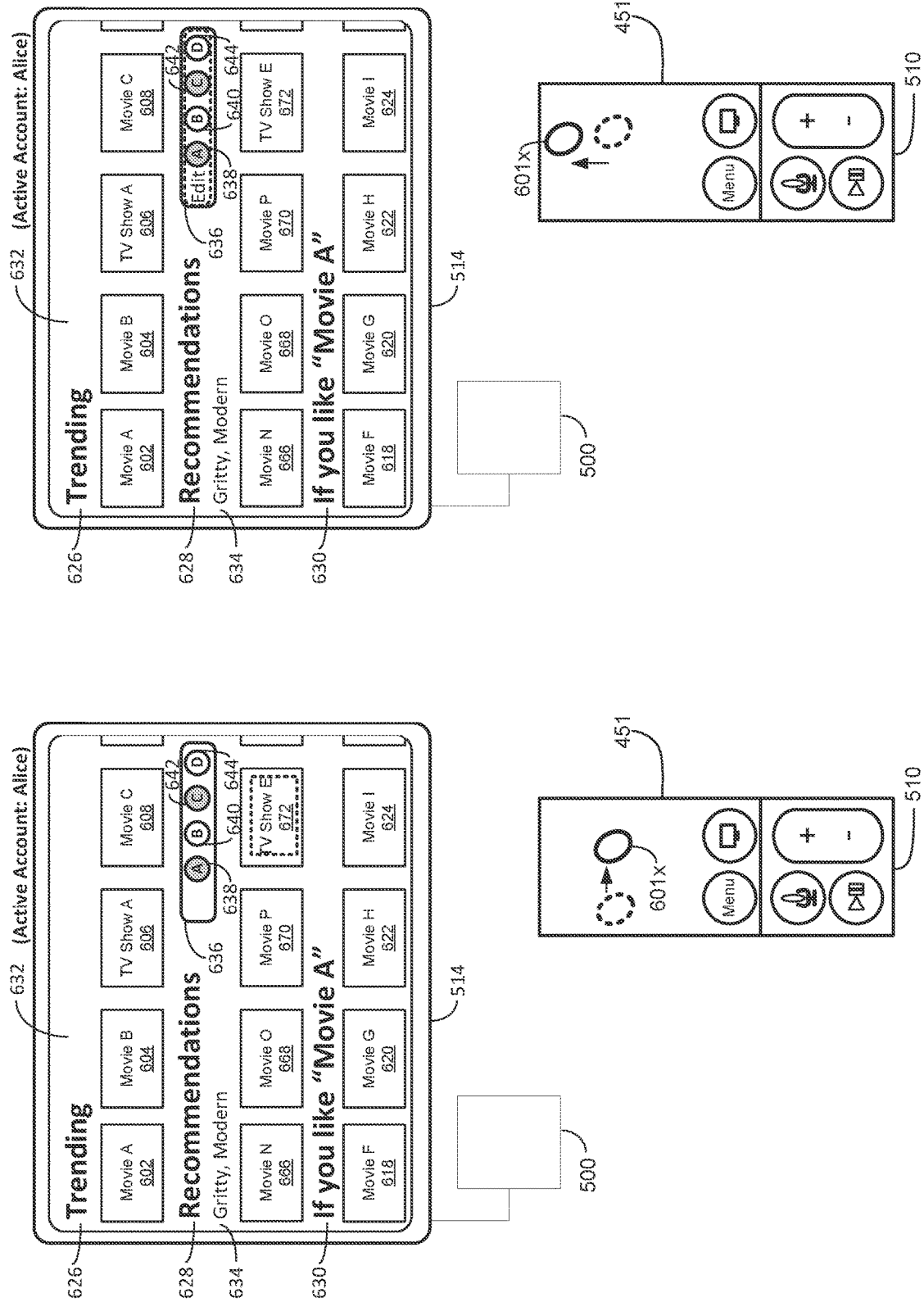

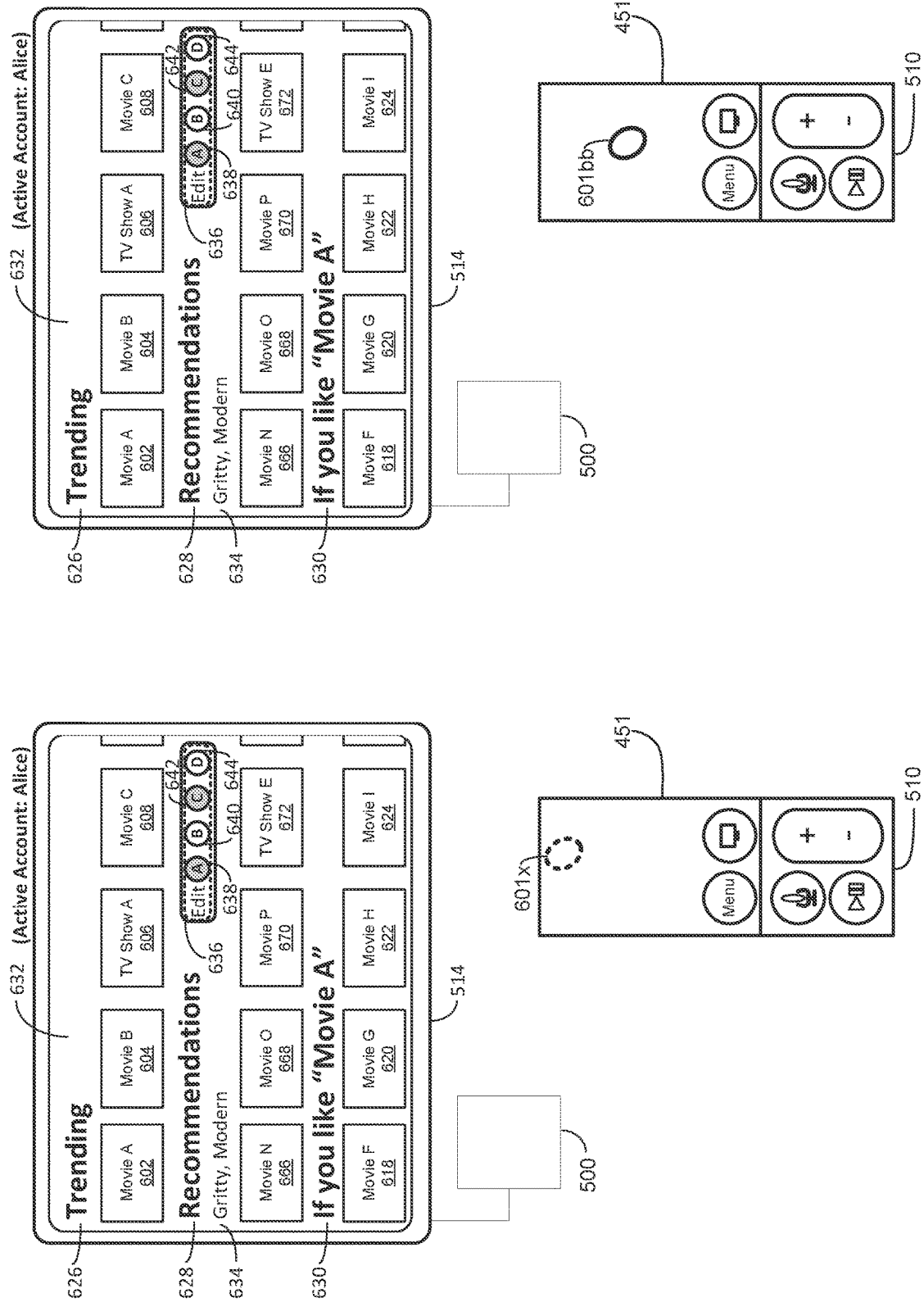

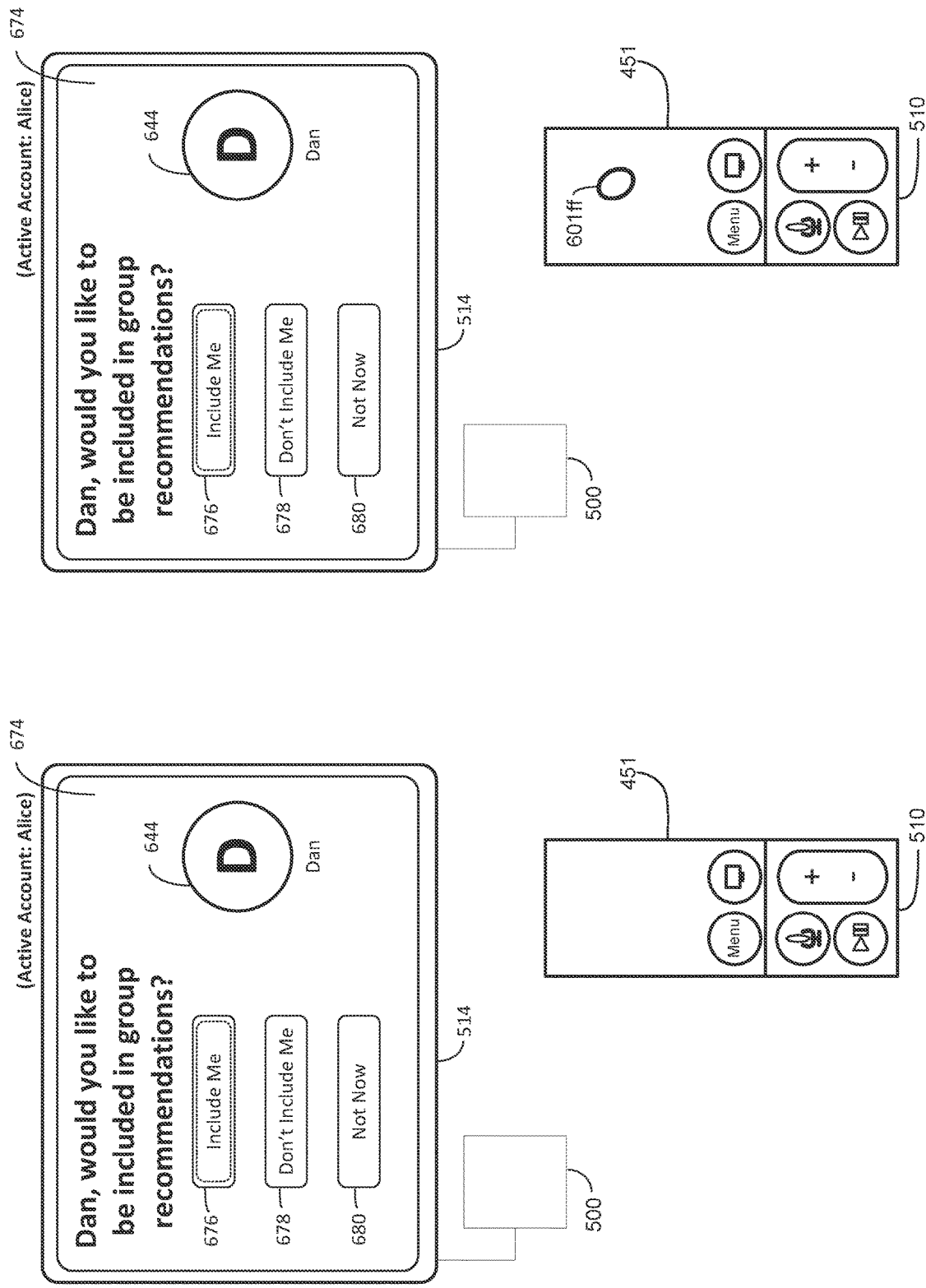

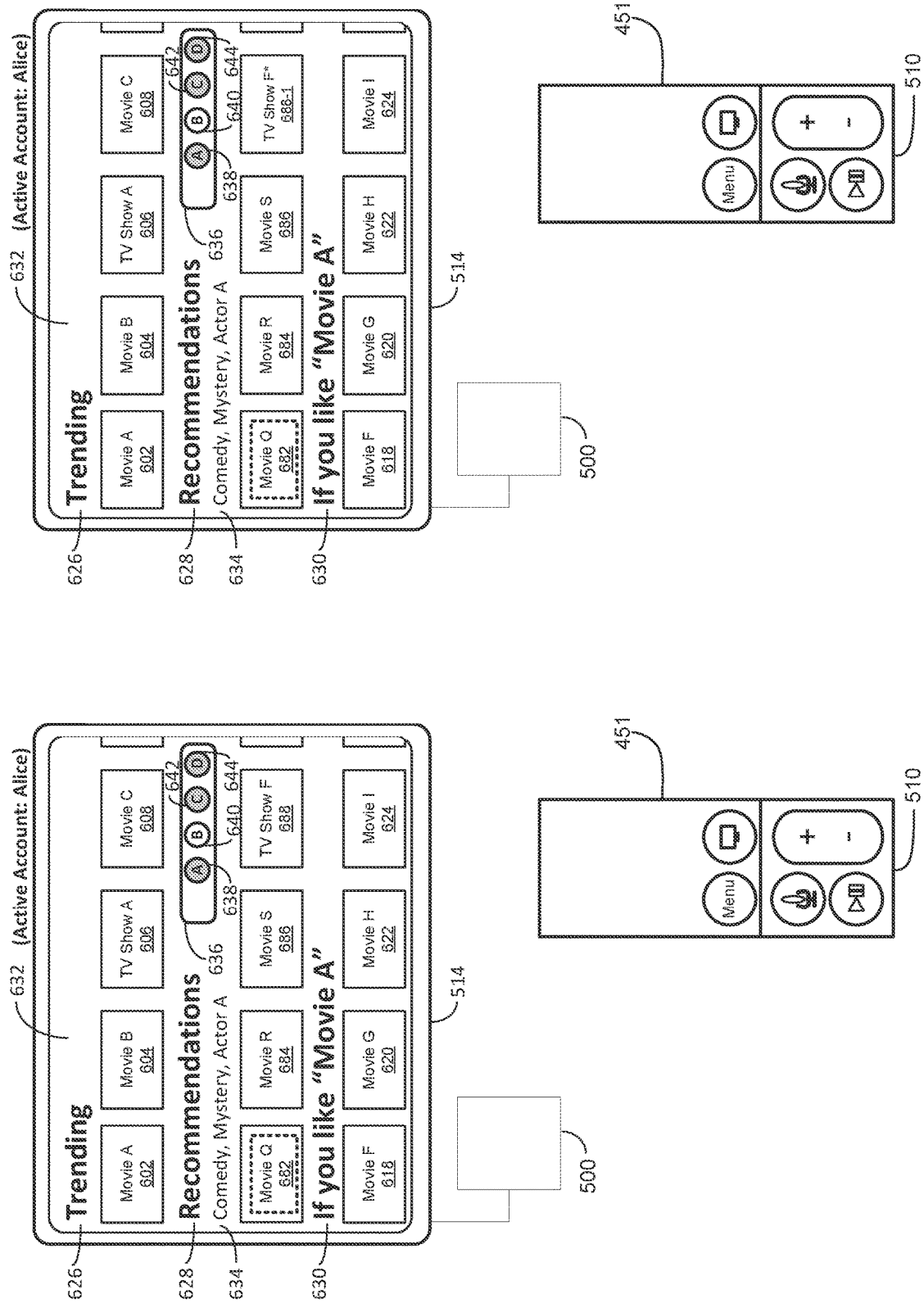

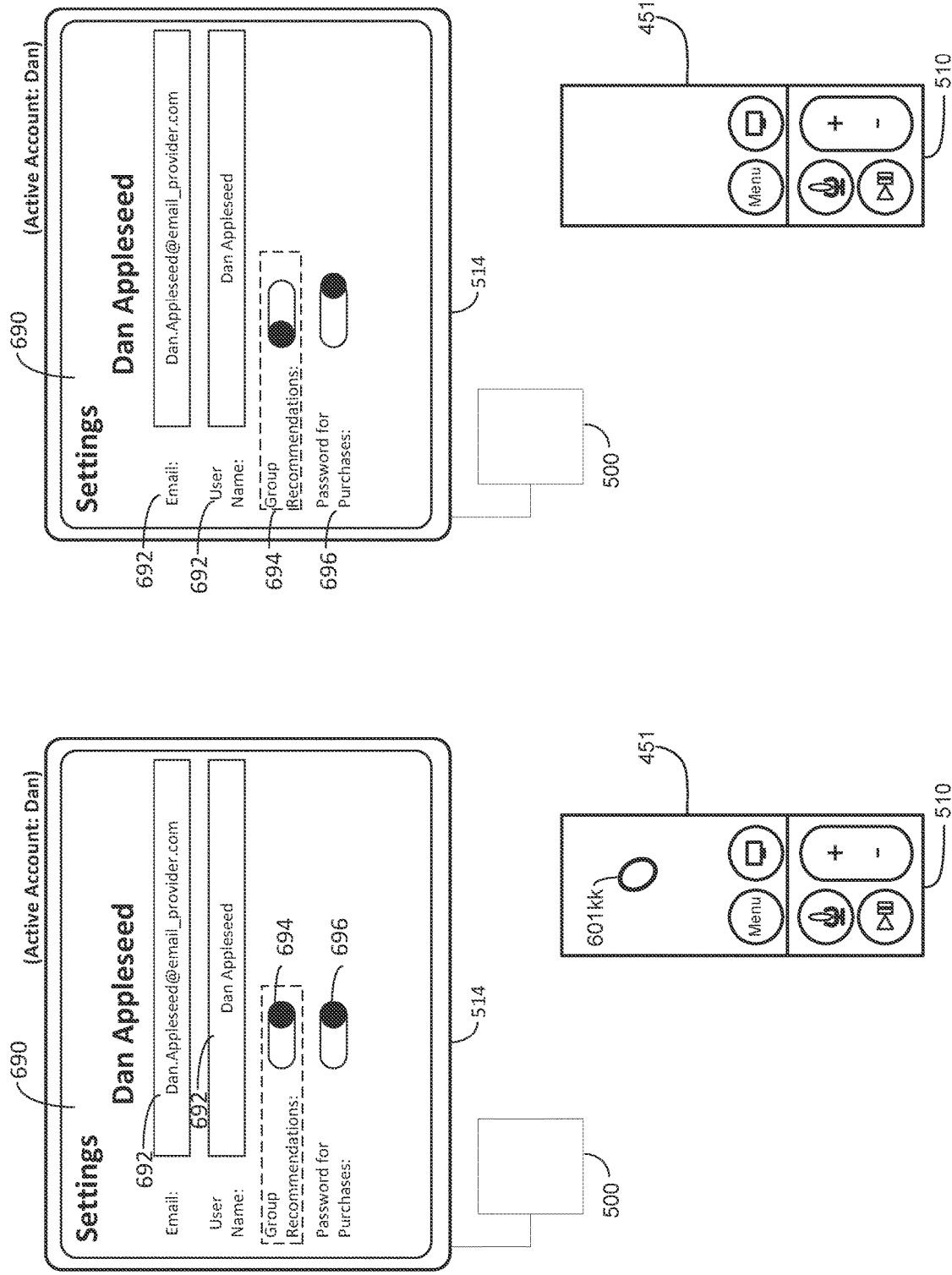

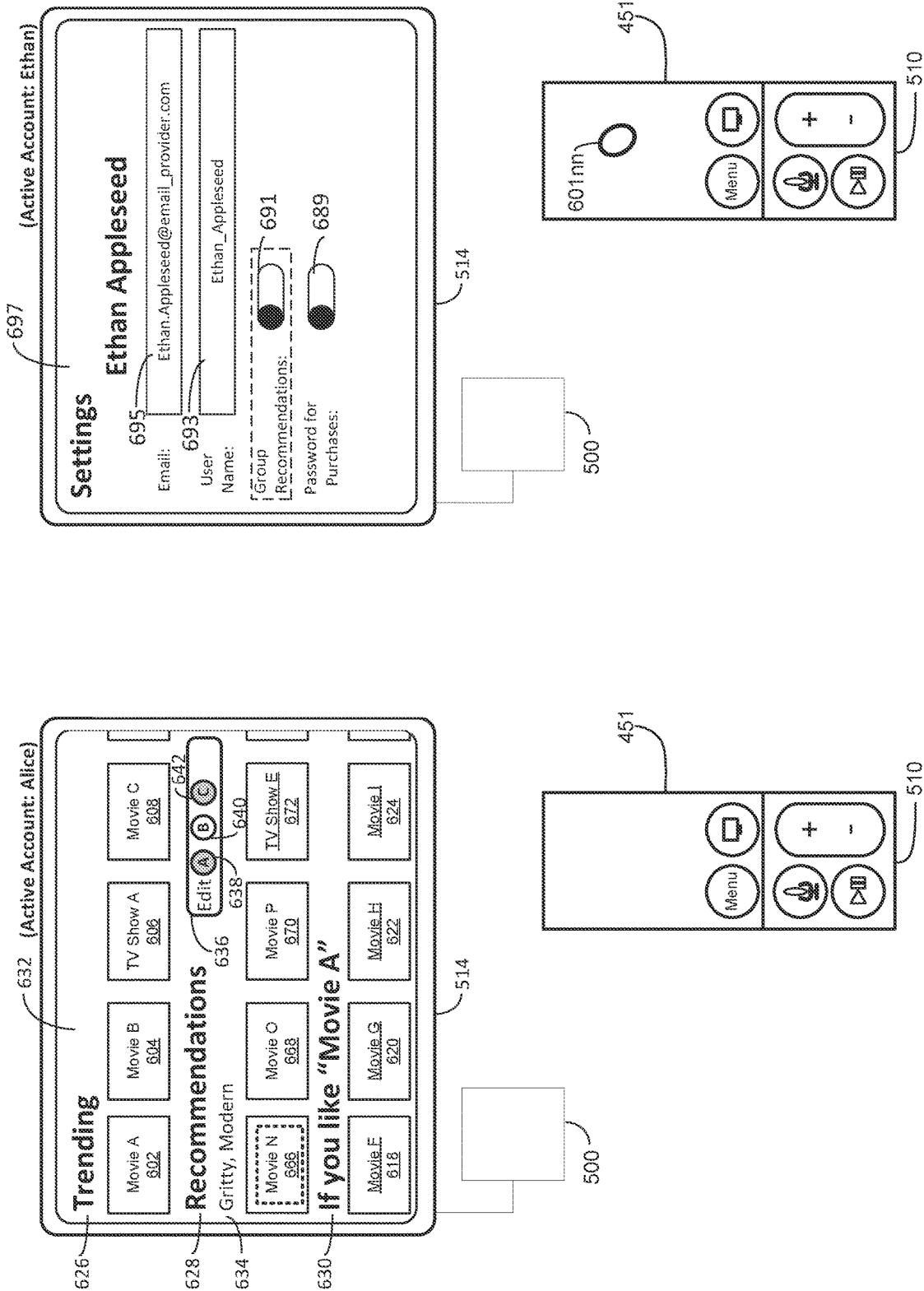

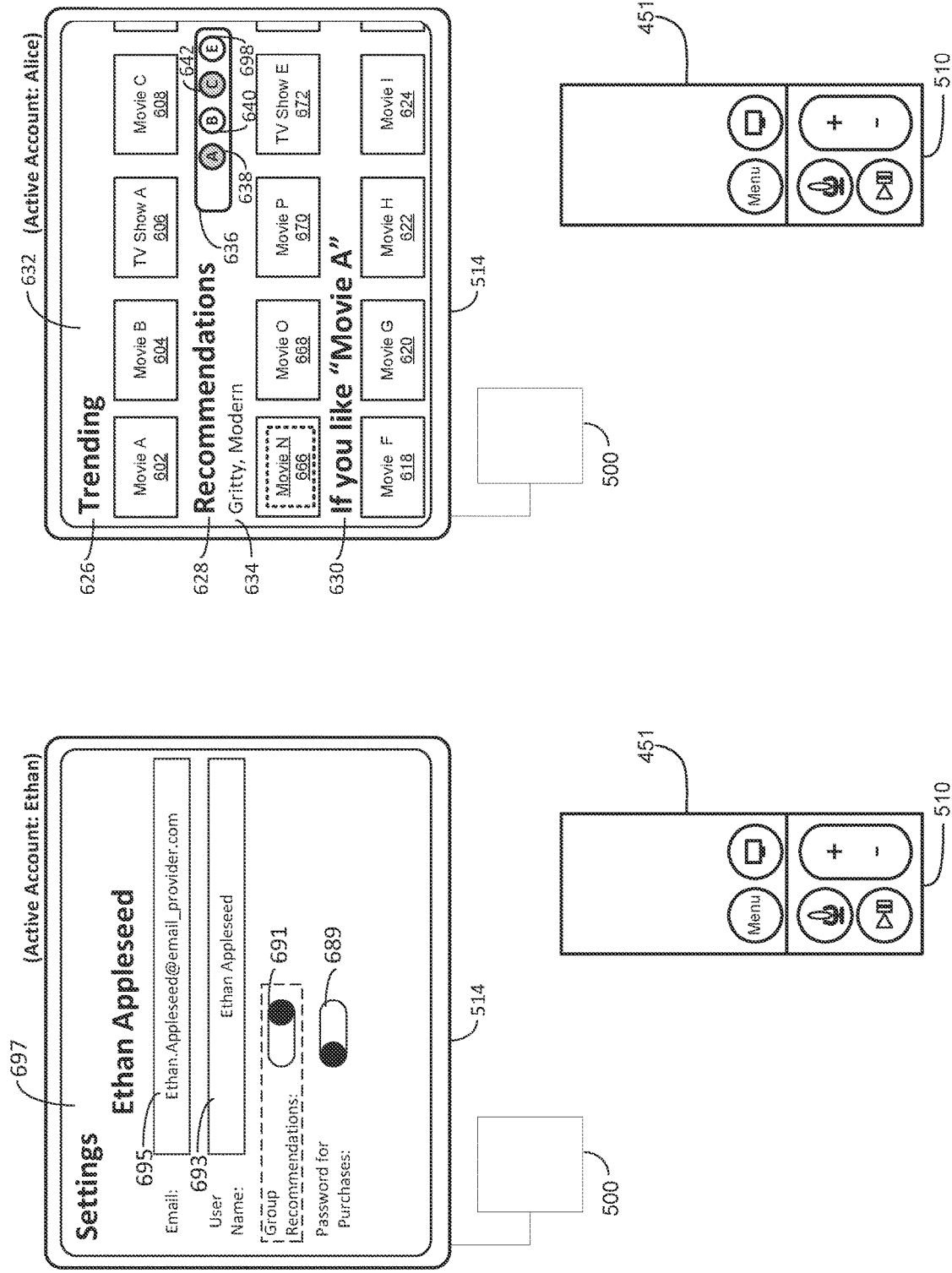

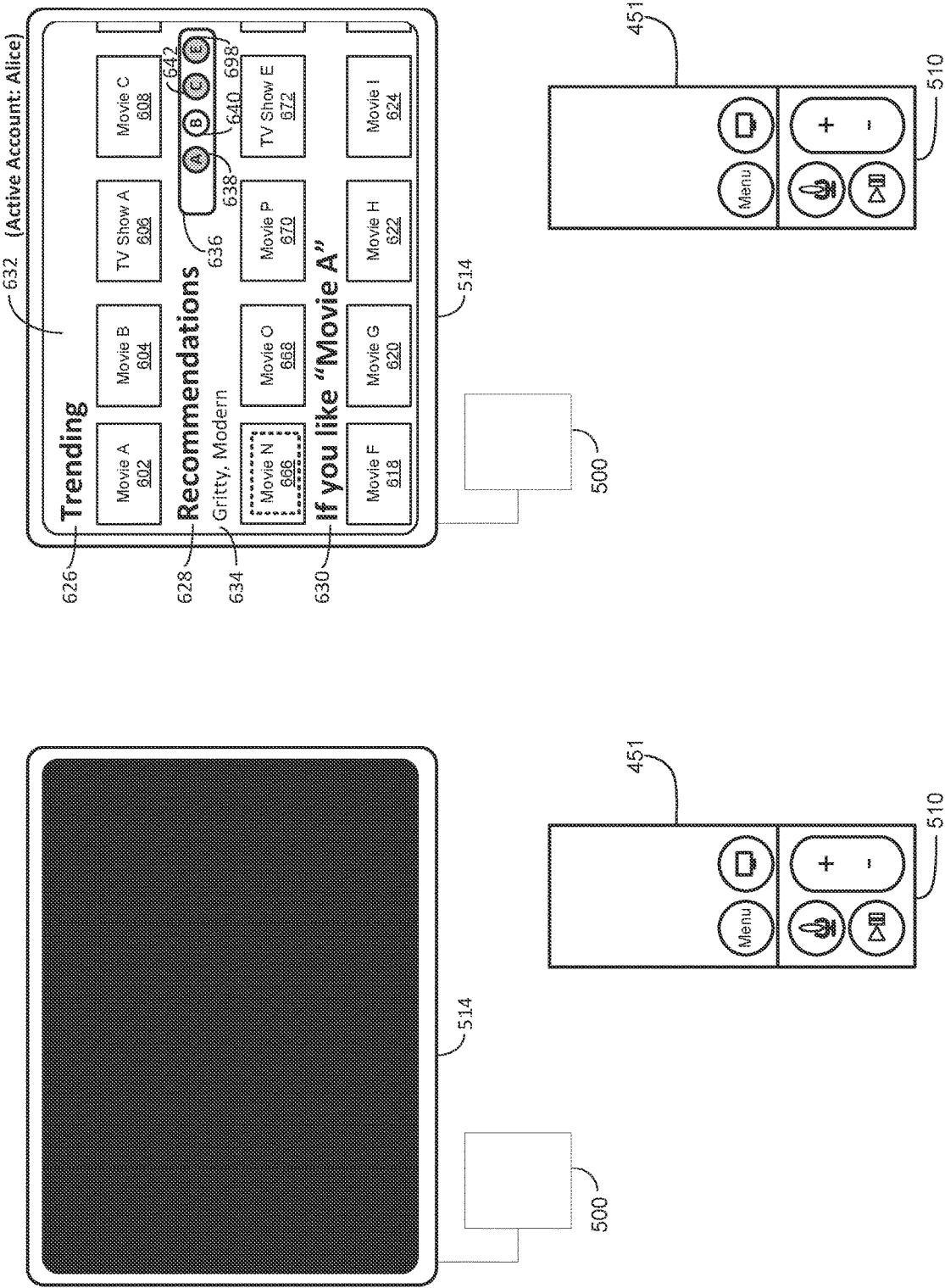

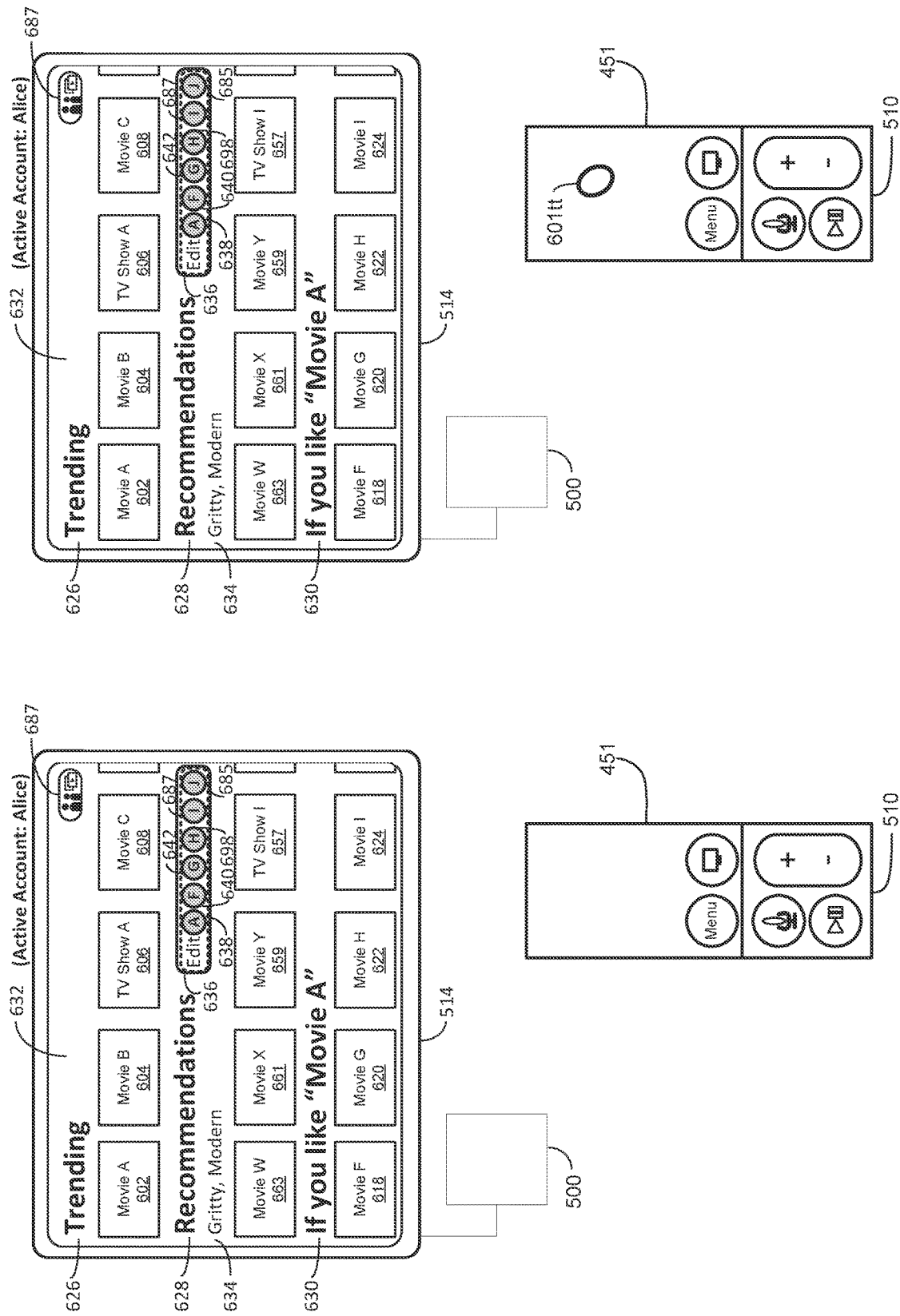

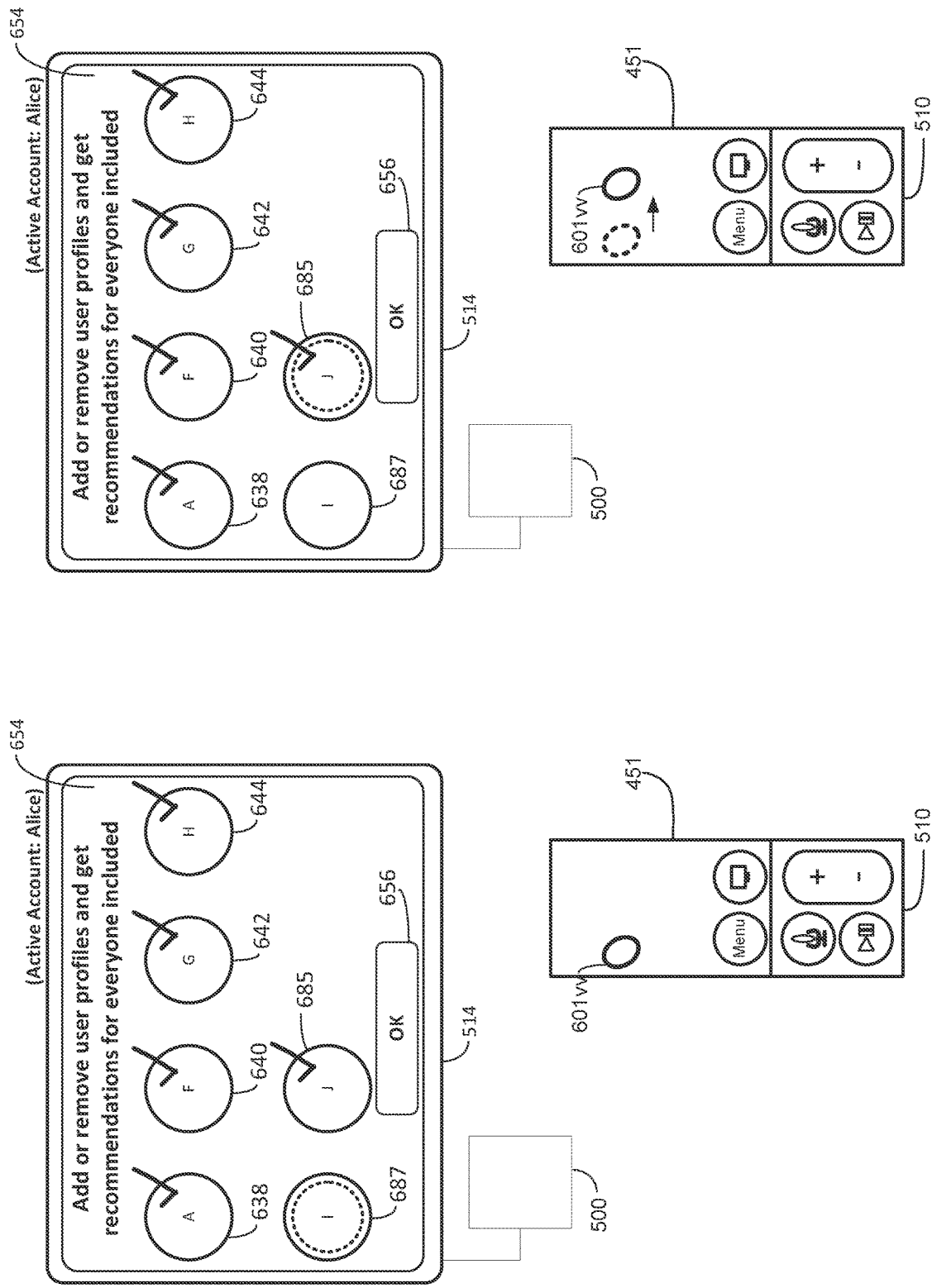

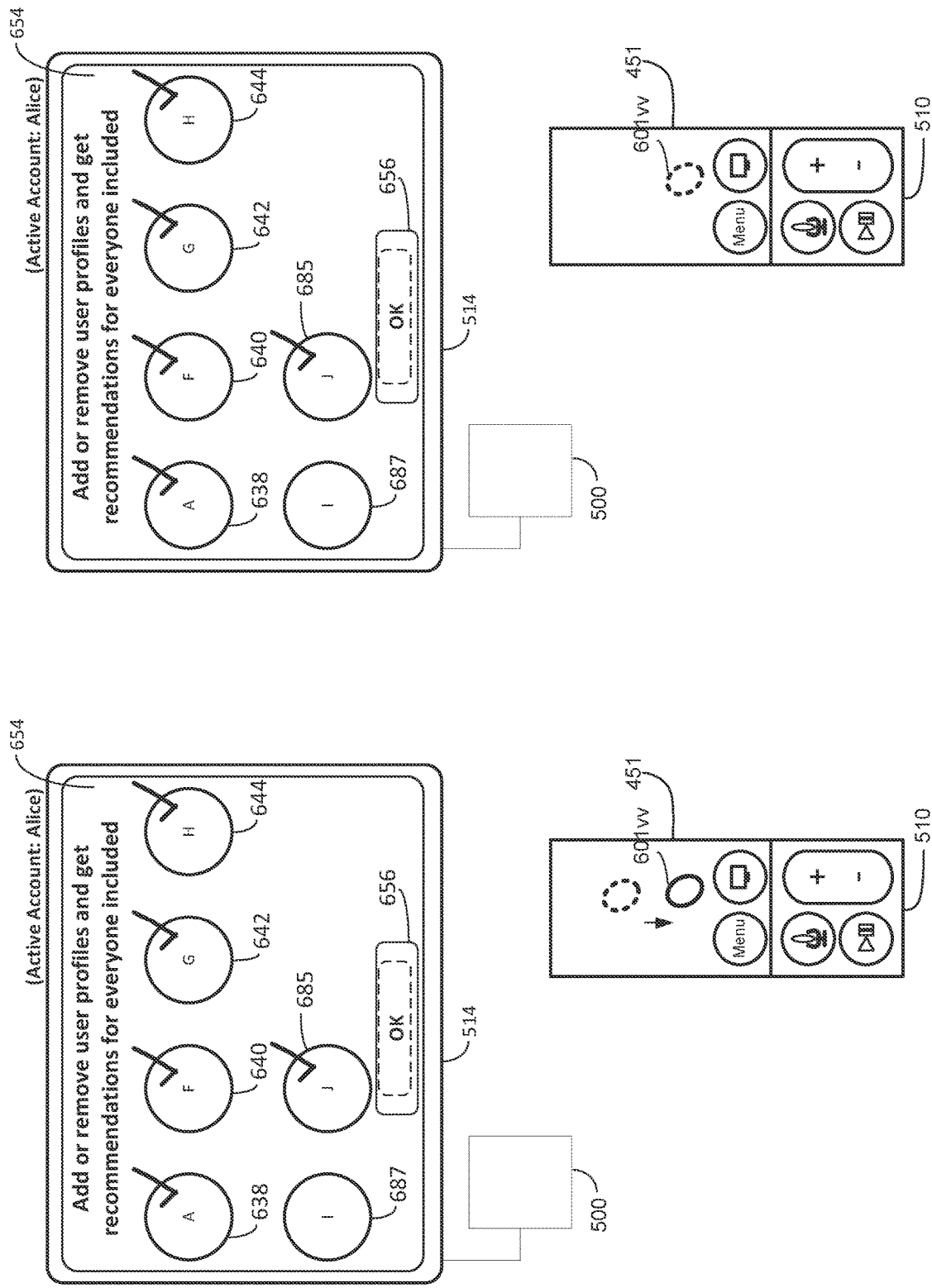

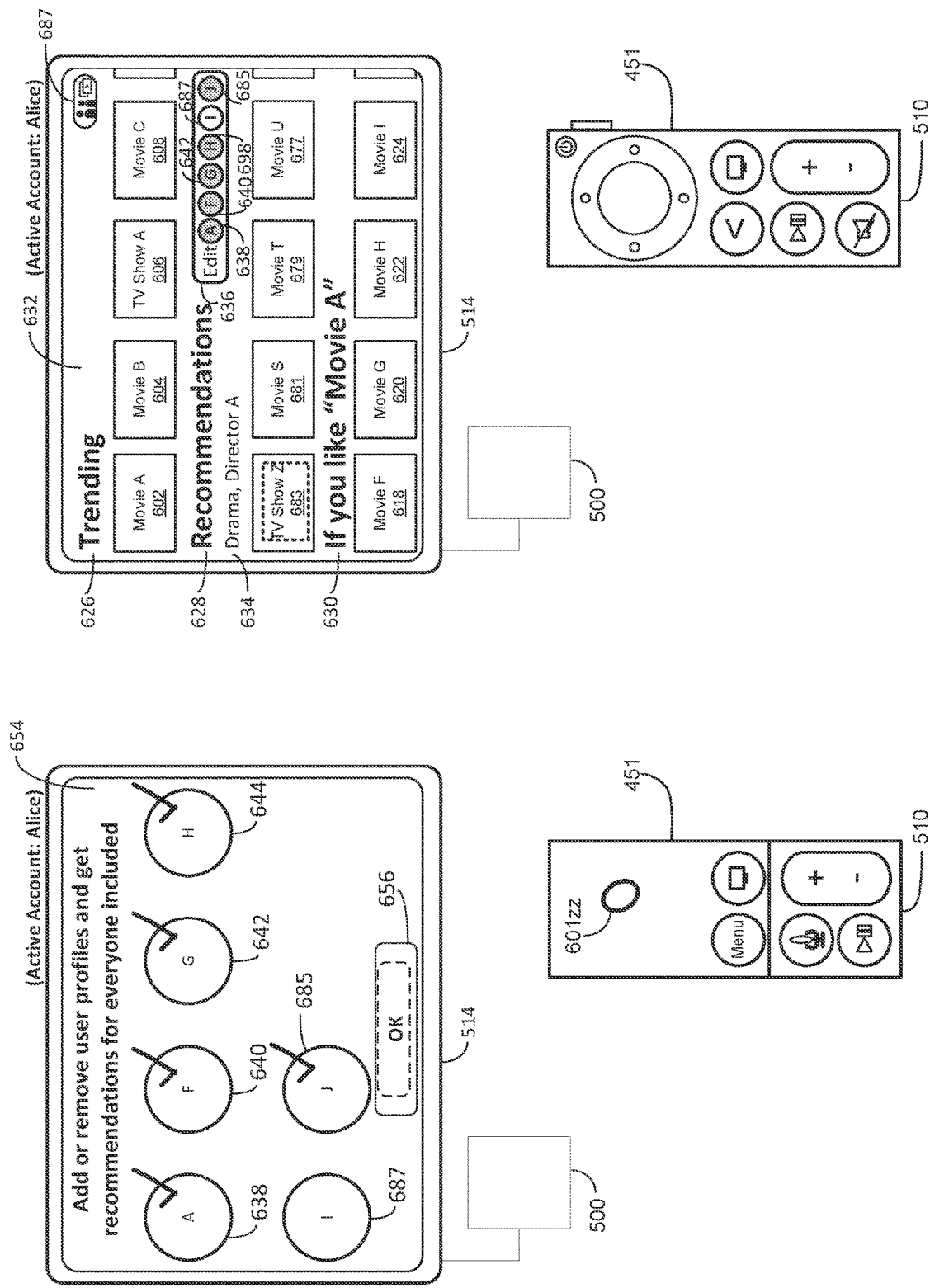

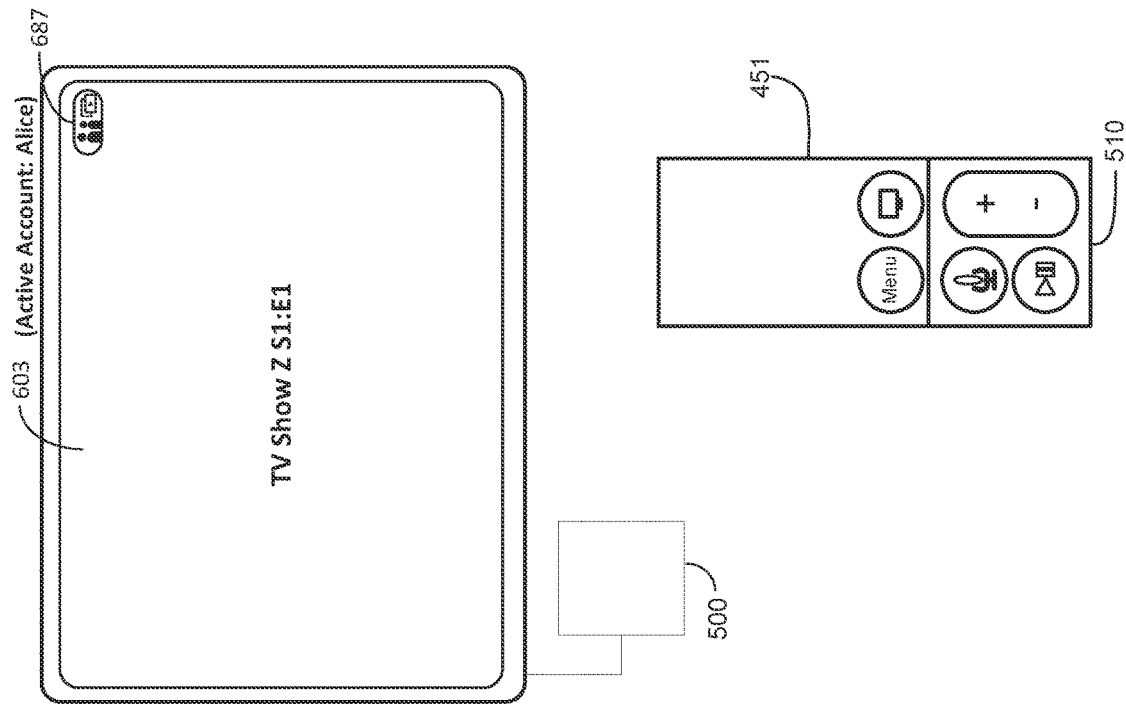
FIG. 6CCC
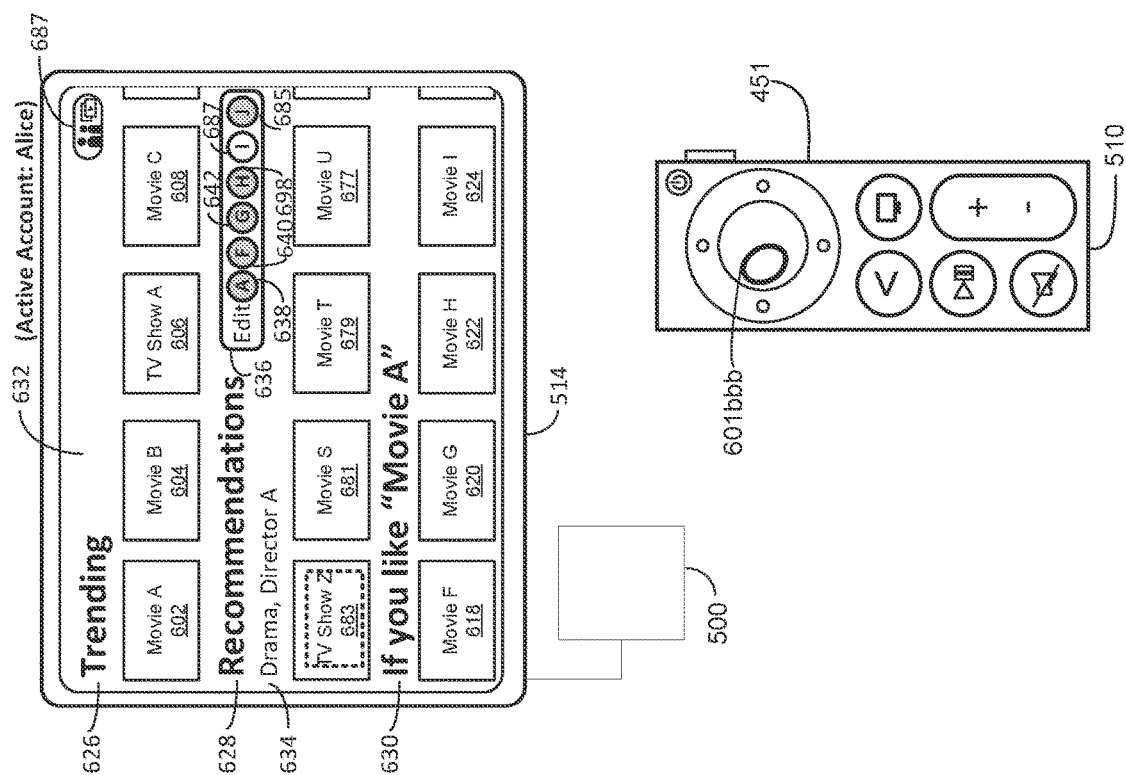
FIG. 6BBB

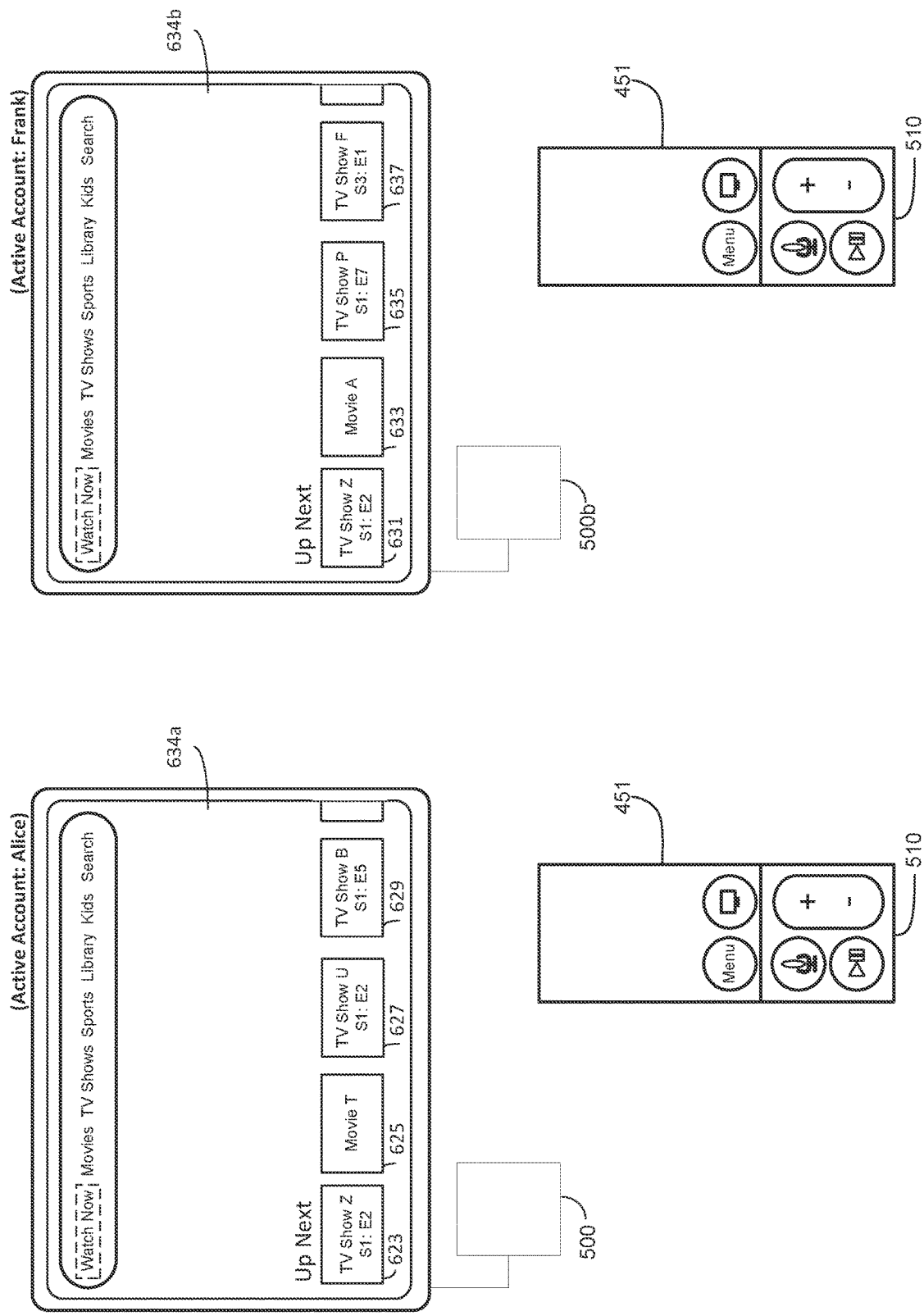

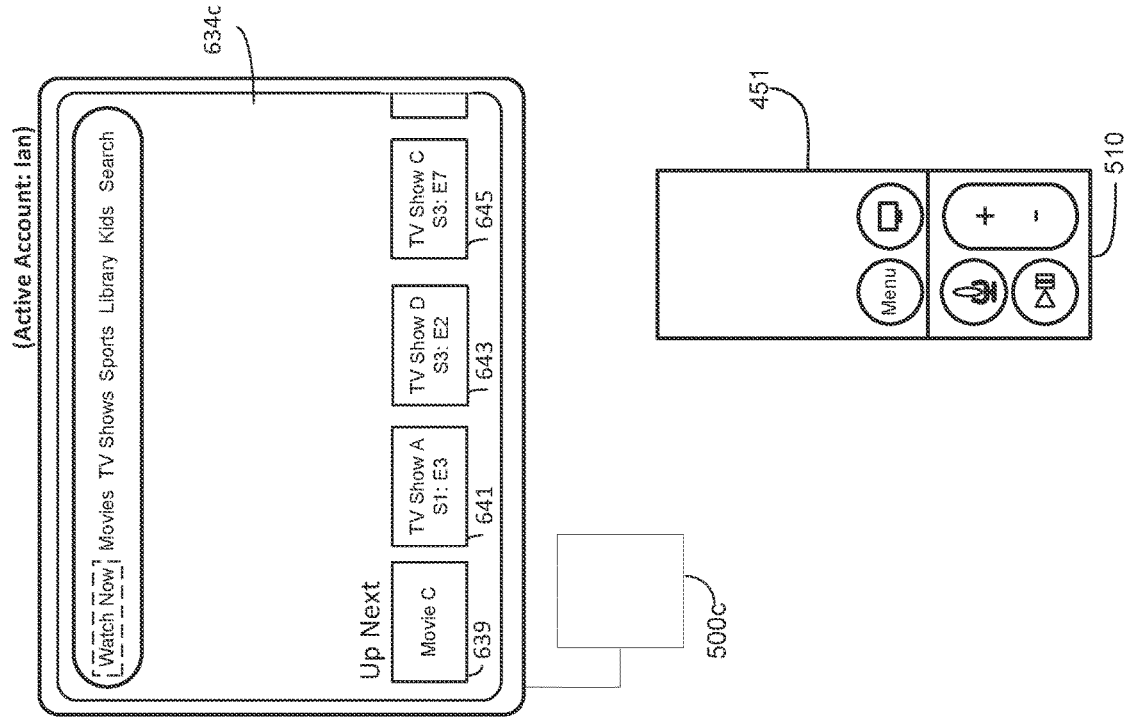
FIG. 6FFF

700

---

702 — While the electronic device is associated with a plurality of user accounts, including a first user account, display, via a display generation component, a media browsing user interface associated with the first user account

706 — In accordance with a determination that the first user account satisfies one or more criteria:

708 — In accordance with a determination that a first subset of user accounts of the plurality of user accounts associated with the electronic device has been selected for inclusion in content recommendations, display, in the media browsing user interface, one or more representations of media content recommendations based on one or more characteristics of the first user account and the first subset of user accounts

710 — In accordance with a determination that a second subset of user accounts of the plurality of user accounts associated with the electronic device, different from the first subset of user accounts, has been selected for inclusion in content recommendations, display, in the media browsing user interface, one or more representations of media content recommendations based on one or more characteristics of the first user account and the second subset of user accounts

FIG. 7

USER INTERFACES FOR DISPLAYING CONTENT RECOMMENDATIONS FOR A GROUP OF USERS

CROSS-REFERENCE TO RELATED APPLICATIONS

This application claims the benefit of U.S. Provisional Application No. 63/197,444, filed Jun. 6, 2021, the contents of which are incorporated herein by reference in its entirety for all purposes.

FIELD OF THE DISCLOSURE

This disclosure relates generally to user interfaces that include media content recommendations based on a group of user accounts.

BACKGROUND OF THE DISCLOSURE

User interaction with electronic devices has increased significantly in recent years. These devices can be devices such as computers, tablet computers, televisions, multimedia devices, or mobile devices. Sometimes a user may wish to view media content recommendations that are based on a group of user accounts. The user may therefore desire efficient ways of accessing media content recommendations that are based on a group of user accounts.

SUMMARY OF THE DISCLOSURE

Some embodiments described in this disclosure are directed to ways of designating user accounts for inclusion in content recommendations that are based on a set of selected or designated user accounts. Some embodiments described in this disclosure are directed to ways of displaying media content recommendations based on a set of selected or designated user accounts. Enhancing a user's interactions with an electronic device in performing the above actions improves the user's experience with the one or more electronic devices, which is particularly important where input devices are battery-operated. The full descriptions of the embodiments are provided in the Drawings and the Detailed Description, and it is understood that the Summary provided above does not limit the scope of the disclosure in any way.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 7 is a flow diagram illustrating a method of displaying media content recommendations for a set of users in accordance with some embodiments of the disclosure.

DETAILED DESCRIPTION

Figure 1A:
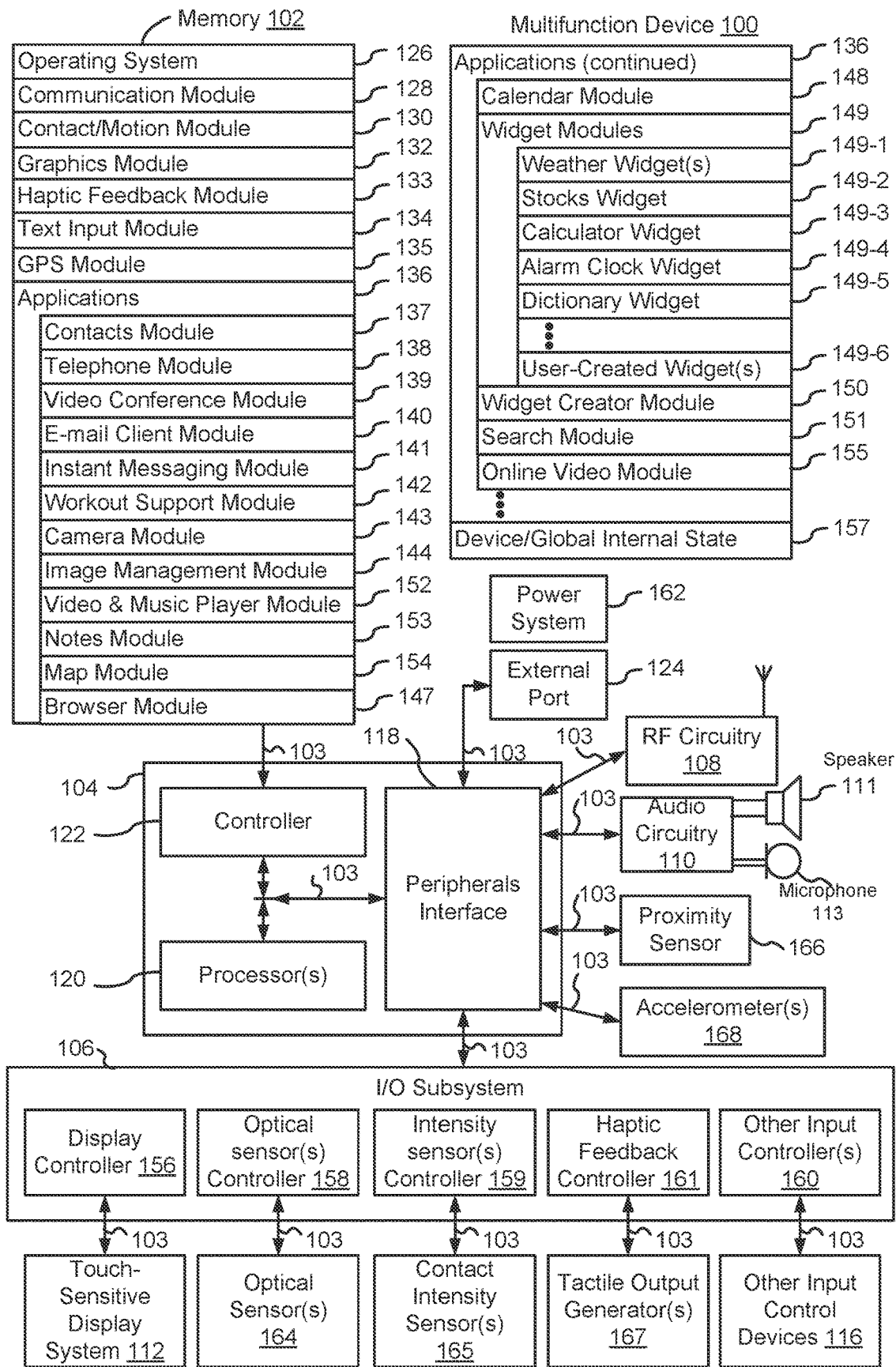
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

There is a need for electronic devices that provide efficient ways of displaying media content recommendations that are based on a set of selected or designated user accounts. In some implementations, if a first set of user accounts have been selected or designated for inclusion in content recommendations, the electronic device displays media content recommendations based on the first set of user accounts. In some embodiments, if a second set of user accounts have been selected or designated for inclusion in content recommendations, the electronic device displays media content recommendations based on the second set of user accounts. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
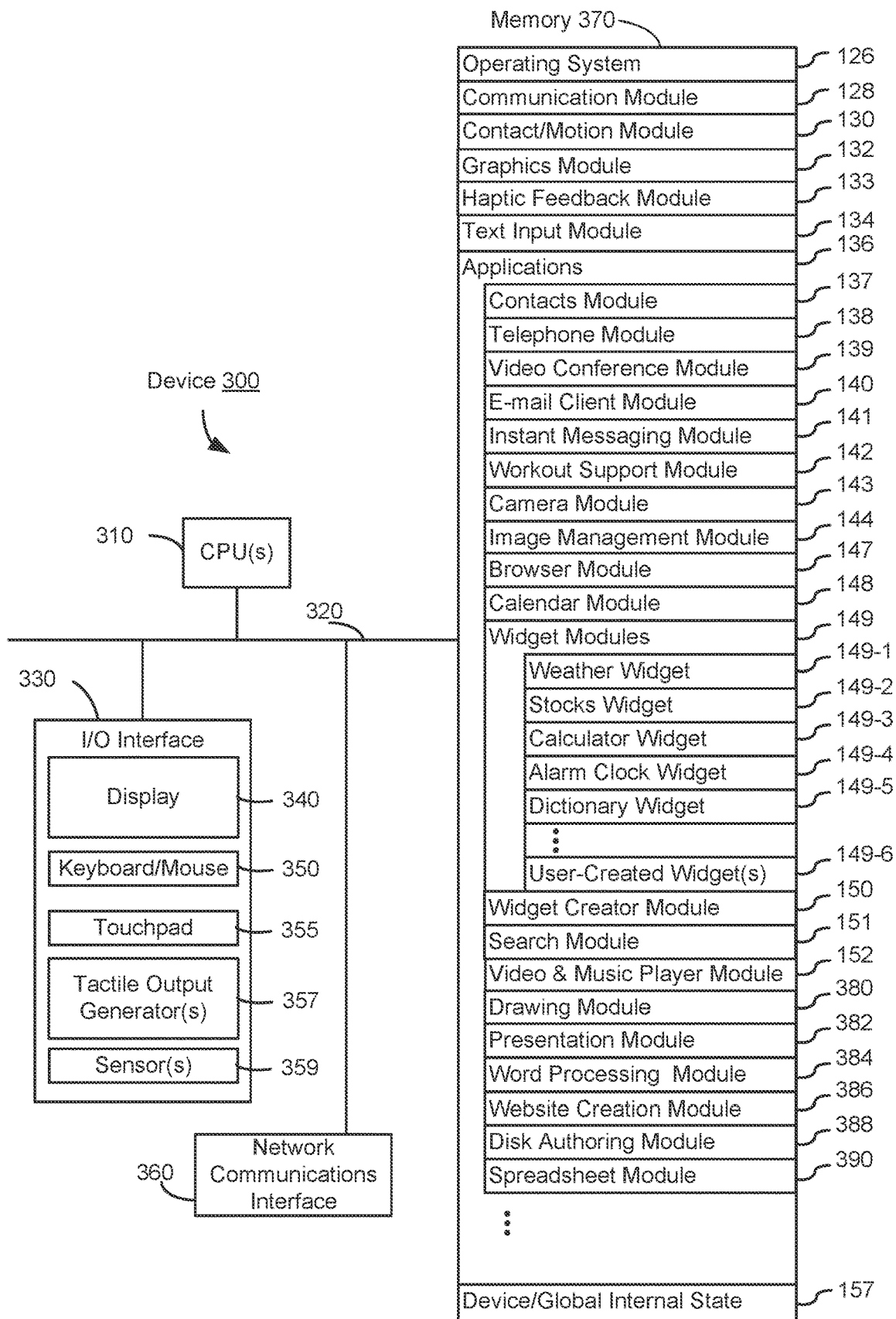
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
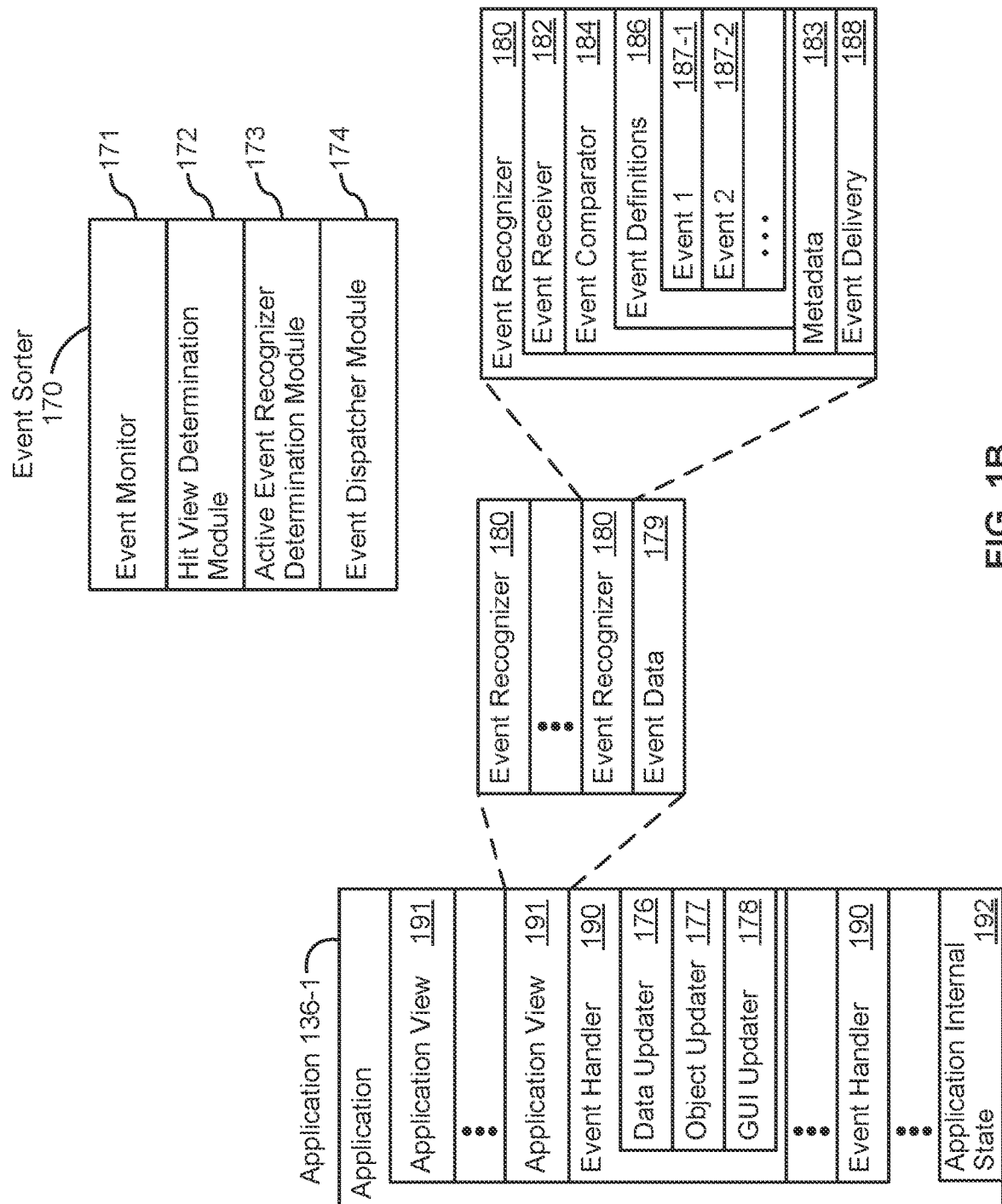
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
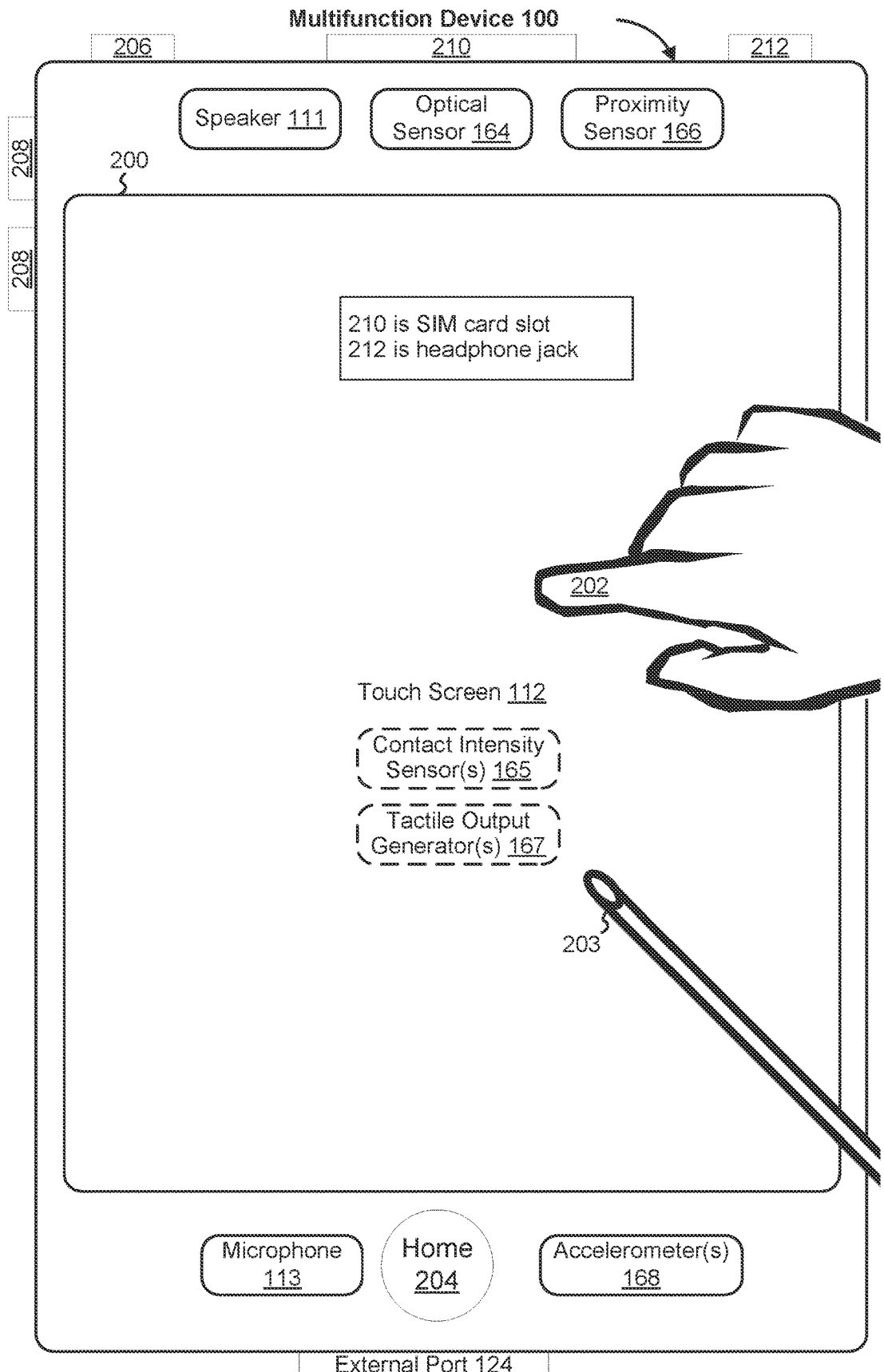
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
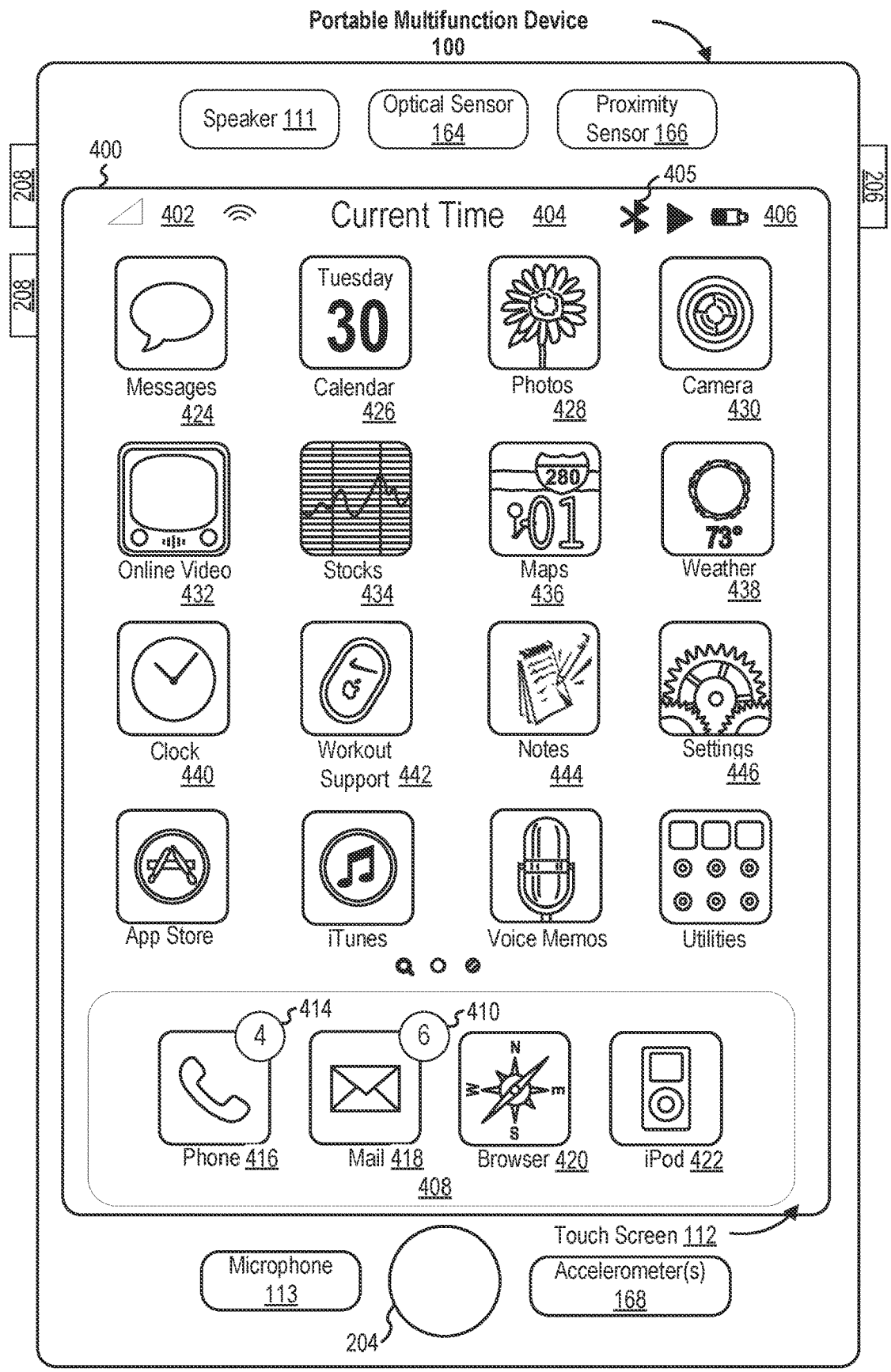
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
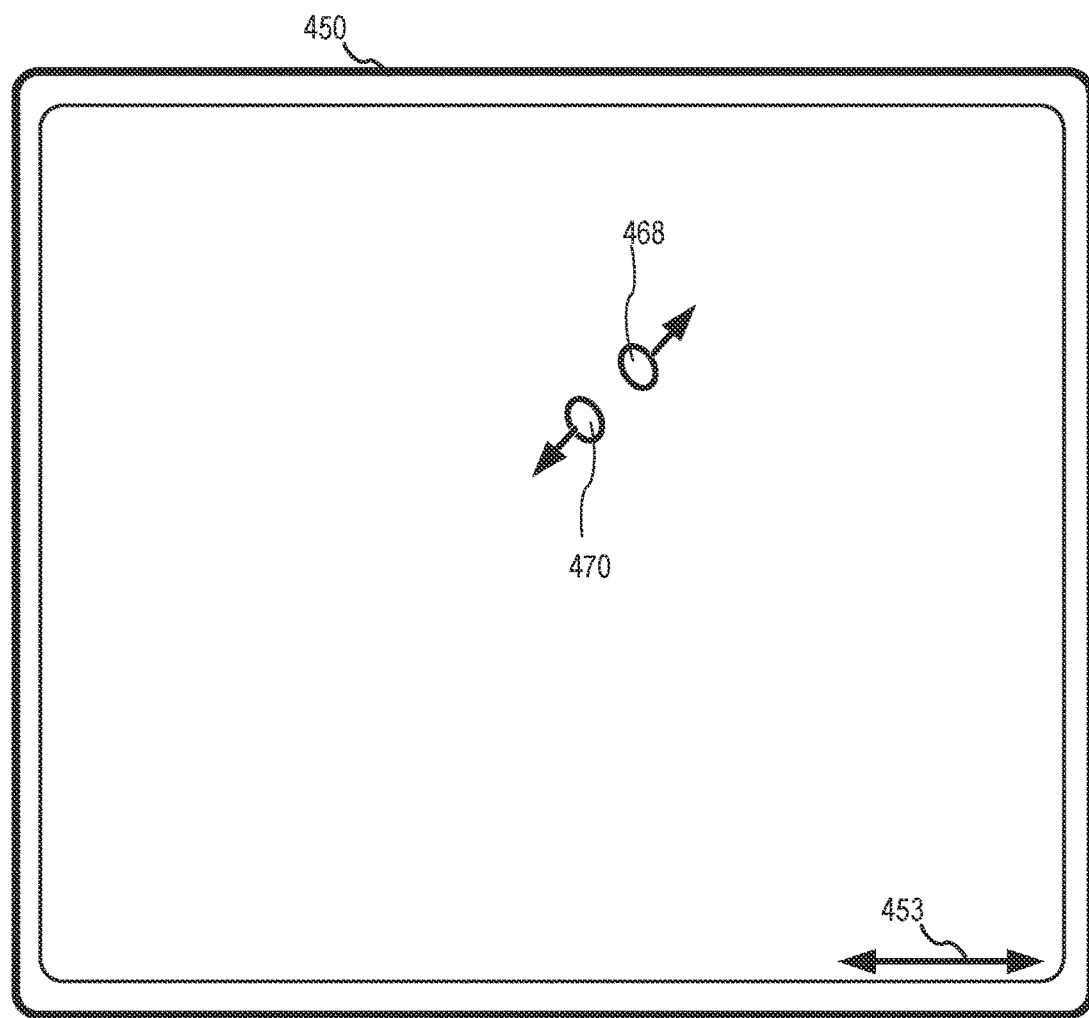
FIG. 4B illustrates an exemplary user interface for a multifunction device with a touch-sensitive surface that is separate from the display in accordance with some embodiments.
Figure 4B:
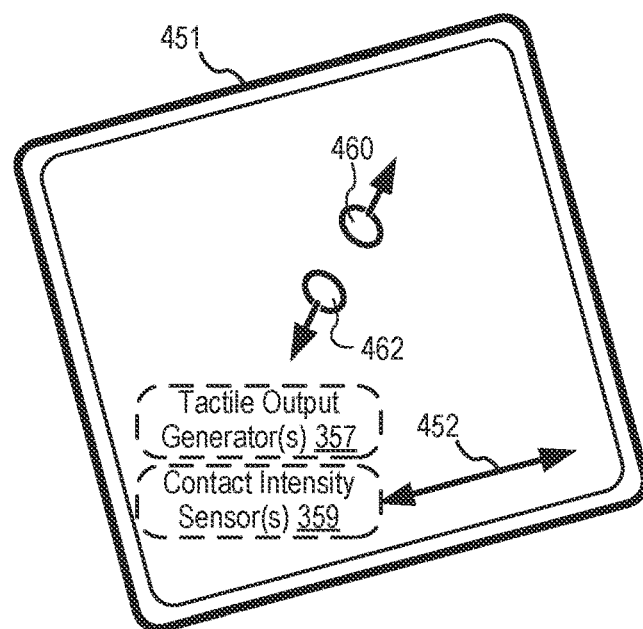

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
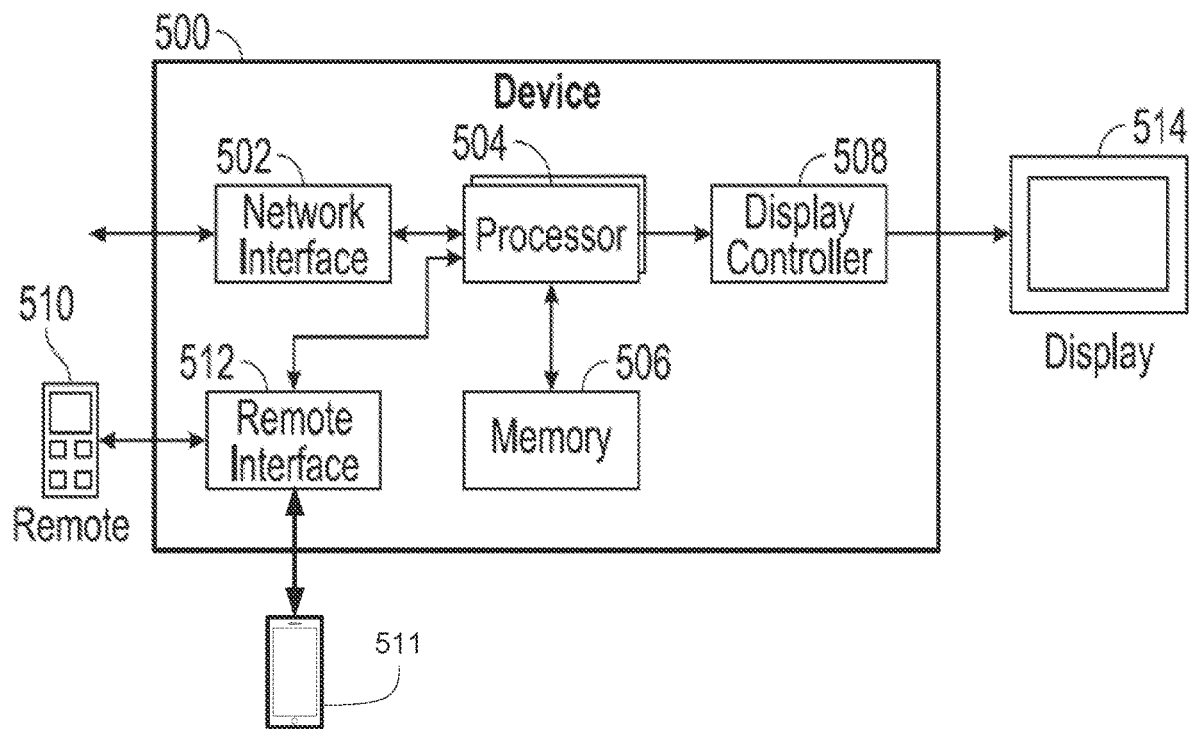
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4B; and, display 514 optionally corresponds to one or more of touch-sensitive display system 112 in FIGS. 1A and 2, and display 340 in FIG. 3.

Figure 5B:
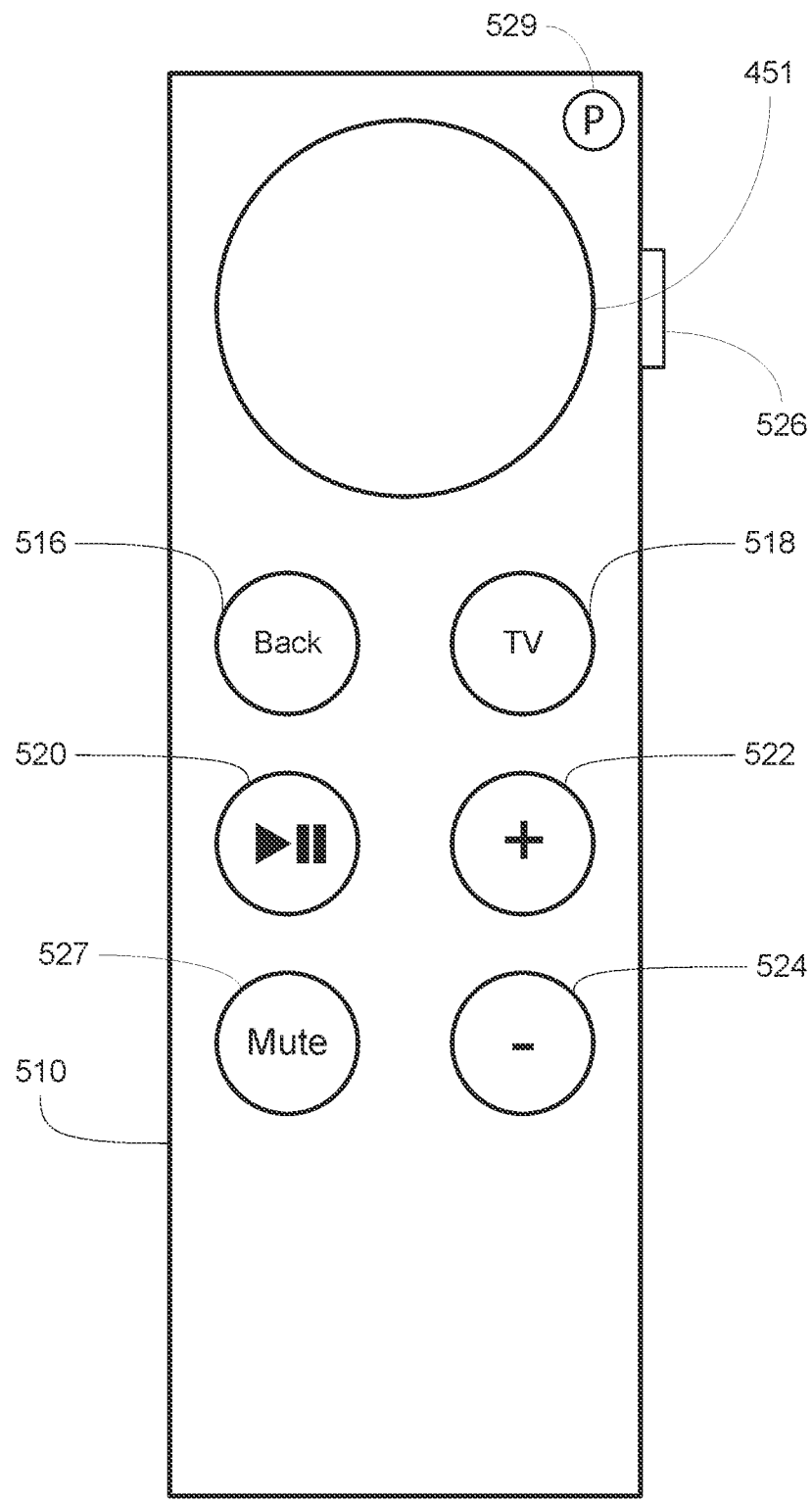

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524, 526, 527 and 529. Buttons 516, 518, 520, 522, 524, 526, 527 and 529 are optionally mechanical buttons or mechanical button alternatives that are able to sense contact with, or depression of, such buttons to initiate corresponding action(s) on, for example, device 500. In some embodiments, selection of "back" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "TV" button 518 by a user navigates device 500 to a main, home, media browsing user interface or root user interface from any user interface that is displayed on device 500 (e.g., to a home screen of device 500 that optionally includes one or more applications accessible on device 500 or to a media browsing user interface of device 500 that includes representations of media available for viewing via device 500). In some embodiments, selection of the "TV" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 (e.g., which is optionally a button on the side surface of remote 510, rather than on the surface of remote 510 that includes buttons 516, 518, 520, 522, 524 and 527) by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote. In some embodiments, selection of "Mute" button 527 toggles the audio reproduced by device 500 on and off. In some embodiments, selection of "Power" button 529 causes device 500 (and/or external devices coupled to device 500, such as display 514) to toggle between entering or exiting a low or off power state.

Figure 5C:
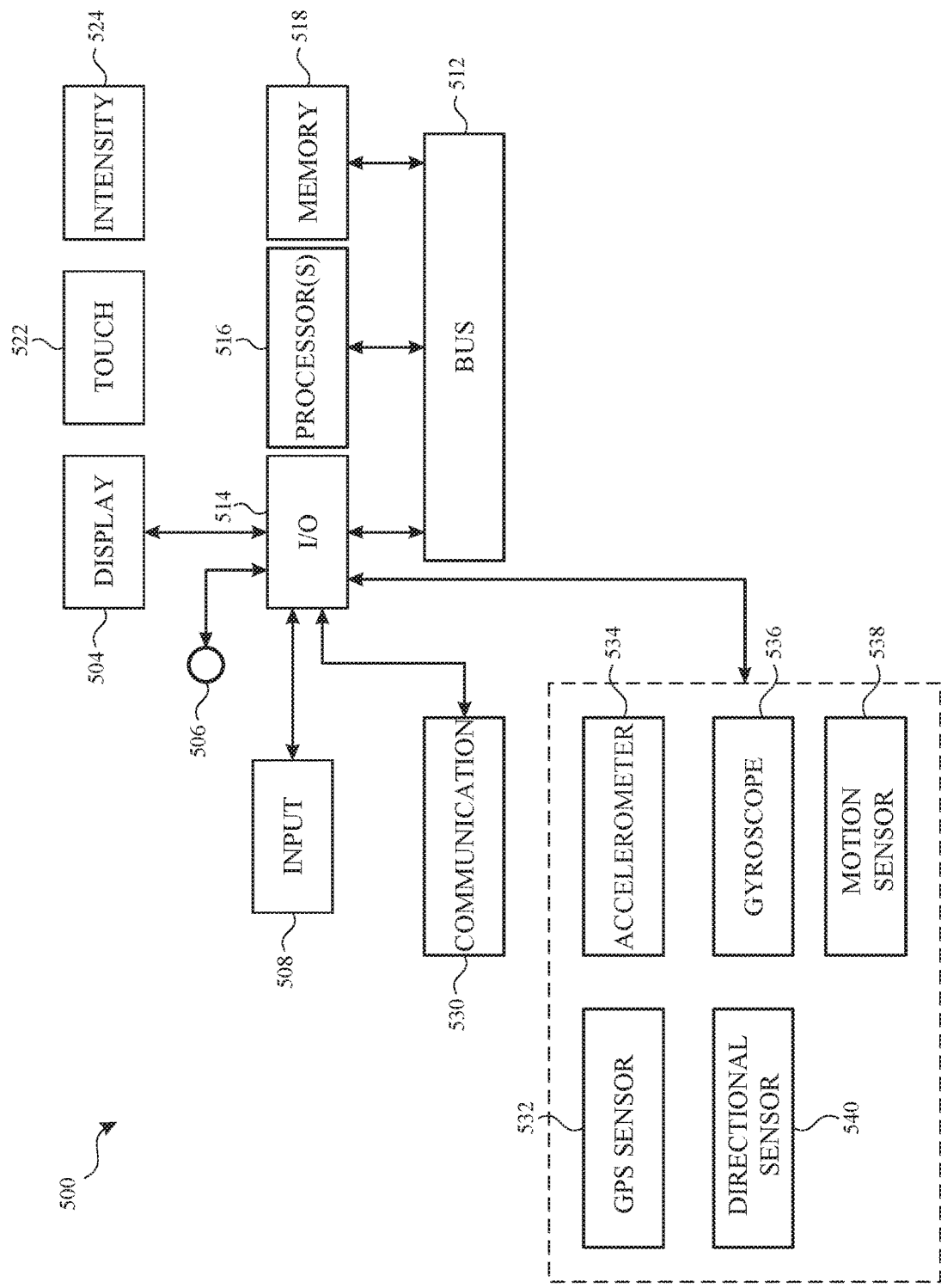

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" Application No. 62/822,952, filed Mar. 24, 2019), "User Interfaces For a Media Browsing Application" Application No. 62/822,948, filed Mar. 24, 2019), and "User Interface Specific to Respective Content Items" Application No. 62/822,966, filed Mar. 24, 2019), each of which is hereby incorporated by reference.

Attention is now directed towards embodiments of user interfaces ("UP") and associated processes that are implemented on an electronic device, such as portable multifunction device 100, device 300, or device 500.

User Interfaces and Associated Processes

Displaying Media Content Recommendations for a Group of Users

Users interact with electronic devices in many different manners, including using electronic devices for browsing user interfaces, such as a media browsing user interface. The embodiments described below provide ways in which an electronic device displays media content items and media content recommendations in a media browsing user interface based on designated user accounts. Providing efficient manners of designating particular user accounts for inclusion in content recommendations provides an efficient way for a user to view media content recommendations based on the designated user accounts, thus reducing the power usage of the electronic device, which increases battery life for battery-powered devices. It is understood that people use devices. When a person uses a device, that person is optionally referred to as a user of the device.

FIGS. 6A-6FFF illustrate exemplary ways in which an electronic device presents recommended content (e.g., movies, television shows, etc.) for a set of users in accordance with some embodiments of the disclosure. The embodiments in these figures are used to illustrate the processes described below, including the processes described with reference to FIG. 7. Although FIGS. 6A-6FFF illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6FFF.

FIG. 6A illustrates exemplary display 514. Display 514 optionally displays one or more user interfaces that include various content. In the example illustrated in FIG. 6A, display 514 is presenting a media browsing user interface 632 associated with Alice's user account (e.g., a user account that is configured on device 500 and that is currently active/logged in). Media user interface 632 includes, in a first respective row of media user interface 632, a representation 602 of Movie A that is selectable to cause device 500 to start playing Movie A, a representation 604 of Movie B that is selectable to cause device 500 to start playing Movie B, a representation 606 of TV Show A that is selectable to cause device 500 to start playing TV Show A, and a representation 608 of Movie C that is selectable to cause device 500 to start playing Movie C. The representations 602-608 correspond to media content that is currently trending (indicated by label 626 displayed above the first respective row). In some embodiments, the media items corresponding to representations 602-608 are trending because a large number of users have recently watched the media content corresponding to the representations 602-608 such as over the last hour, day, week, month, etc.

Media user interface 632 also includes, in a second respective row of the media user interface 632, a representation 610 of Movie D that is selectable to cause device 500 to start playing Movie D, a representation 612 of TV Show B that is selectable to cause device 500 to start playing TV Show B, a representation 614 of TV Show C that is selectable to cause device 500 to start playing TV Show C, and a representation 616 of Movie E that is selectable cause device 500 to start playing Movie E. The representations 610-616 correspond to media content that is being recommended based on a set of user accounts that have been selected or designated for inclusion content recommendations (indicated by label 628 displayed above the second respective row), as will be described in more detail later.

In some embodiments, media user interface 632 displays the user accounts that can be designated for inclusion in content recommendations. For example, as illustrated in FIG. 6A, media user interface 632 includes a selectable user interface element 636 that indicates the user accounts that can be designated for inclusion in content recommendations. Specifically, user interface 636 includes a representation 638 of Alice's user account indicating that Alice's user account is currently designatable for inclusion in content recommendations, includes a representation 640 of Bob's user account indicating that Bob's user account is currently designatable for inclusion in content recommendations, includes a representation 642 of Chloe's user account indicating that Chloe's user account is currently designatable for inclusion in content recommendations, and a representation 644 of Dan's user account indicating that Dan's user account is currently designatable for inclusion in content recommendations.

In some embodiments, the user accounts represented in the selectable user interface element 636 correspond to the user accounts that are configured on the electronic device. For example, in FIG. 6A, selectable user interface element 636 includes representations 638-644 because the user accounts corresponding to representations 638-644 are configured on the electronic device 500 (e.g., the user accounts corresponding to the users Alice, Bob, Chloe, and Dan are configured on the electronic device 500). In some embodiments, the representations of users accounts included in the selectable user interface element 636 are displayed with a first visual appearance if the corresponding user accounts have been selected or designated for inclusion in content recommendations, and are displayed with a second visual appearance if the corresponding user accounts have not been selected or designated for inclusion in content recommendations. In the example of FIG. 6A, device 500a is displaying the representations 638-644 of respective user accounts with a first visual appearance (e.g., displayed with a white background) because the user accounts corresponding to the representations 638-644 have not been selected for inclusion in content recommendations (e.g., that are based on a set of selected or designated user accounts). In some embodiments, none of the user accounts corresponding to the representations 638-644 have been selected or designated for inclusion because device 500 is displaying content recommendations that are based on a set of selected or designated user accounts for the first time.

In some embodiments, when no user accounts have been selected or designated for inclusion in content recommendations that are based on a set of selected or designated user accounts, the media user interface 632 includes generic content recommendations (e.g., includes generic content recommendations that are not specific to any particular group of user accounts). For example, in FIG. 6A, because none of the user accounts corresponding to representations 638-644 have been selected or designated for inclusion in content recommendations that are based on a set of selected or designated user accounts (indicated by device 500 displaying the representations 638-644 with a white background), representations 610-616, displayed in the second respective row in the media user interface 632, are generic content recommendations (e.g., not specific to any particular group of user accounts and/or are based on general, aggregated data of many/all user accounts subscribed to a particular content delivery service).

In some embodiments, the media browsing user interface 632 includes an indication summarizing the type of content being recommended for the selected or designated user accounts. For example, in FIG. 6A, the media user interface includes indication 634 indicating that the content generically being recommended relates to the categories Sci-Fi, 80s, and Adventure.

In some embodiments, media user interface 632 includes content recommendations that are not based on a set of selected or designated of user accounts (e.g., includes content recommendations that are based only on the user account currently active at device 500a). For example, in FIG. 6A, the media user interface 632 includes, in a third respective row of media user interface 632, a representation 618 of Movie F that is selectable to cause device 500 to play Movie F, a representation 620 of Movie G that is selectable to cause device 500 to play Movie G, a representation 622 of Movie H that is selectable to cause device 500 to play Movie H, and a representation 624 of Movie I that is selectable to cause device 500 to play Movie I. The representations 618-624 correspond to media items that are recommended to Alice (e.g., the active user account on device 500) because Alice recently watched "Movie A".

Figure 6I:
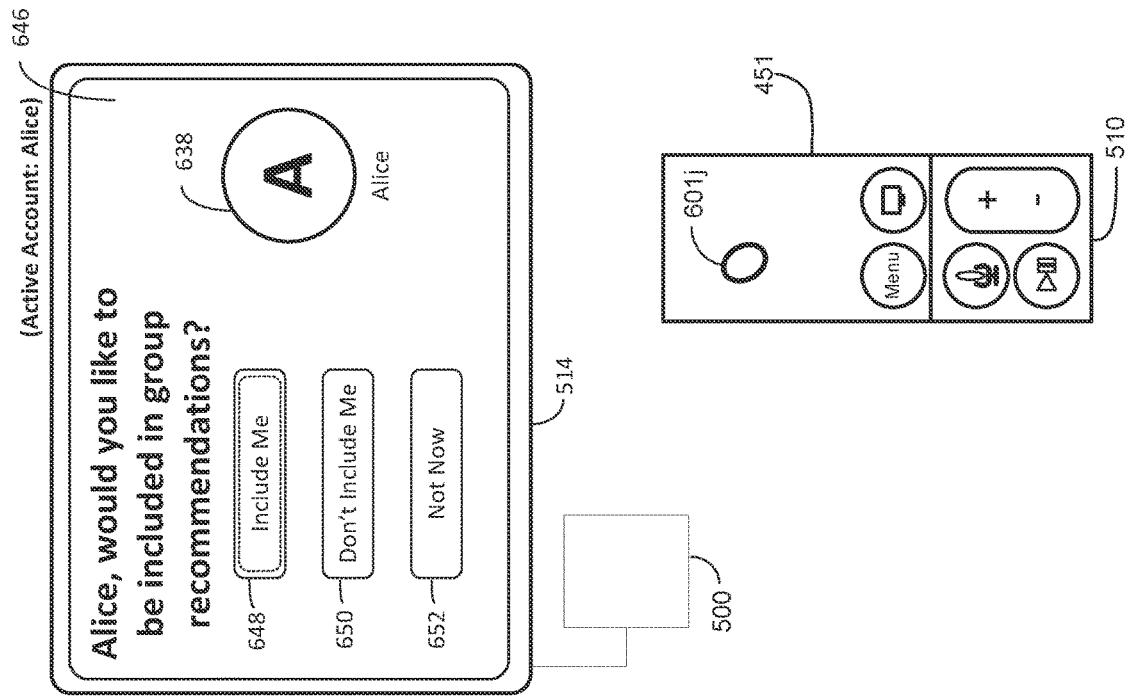
FIGS. 6A-6FFF illustrate exemplary ways in which an electronic device presents recommended content (e.g., movies, television shows, etc.) for a set of users in accordance with some embodiments of the disclosure.
Figure 6J:
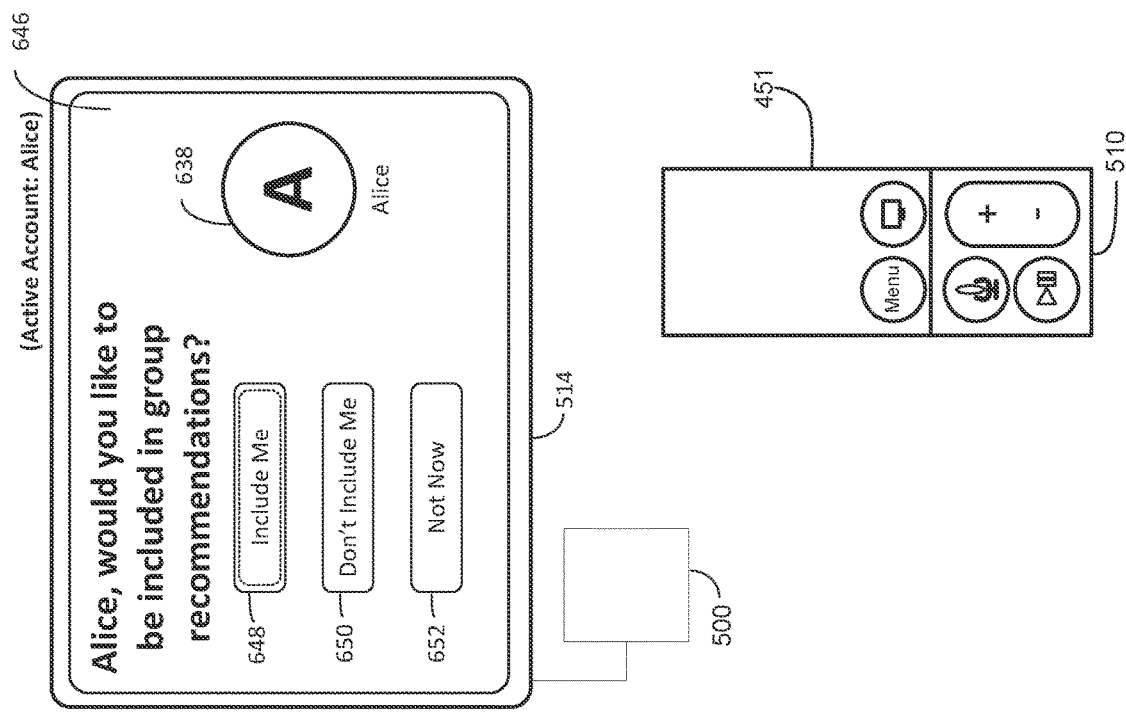
Figure 6L:
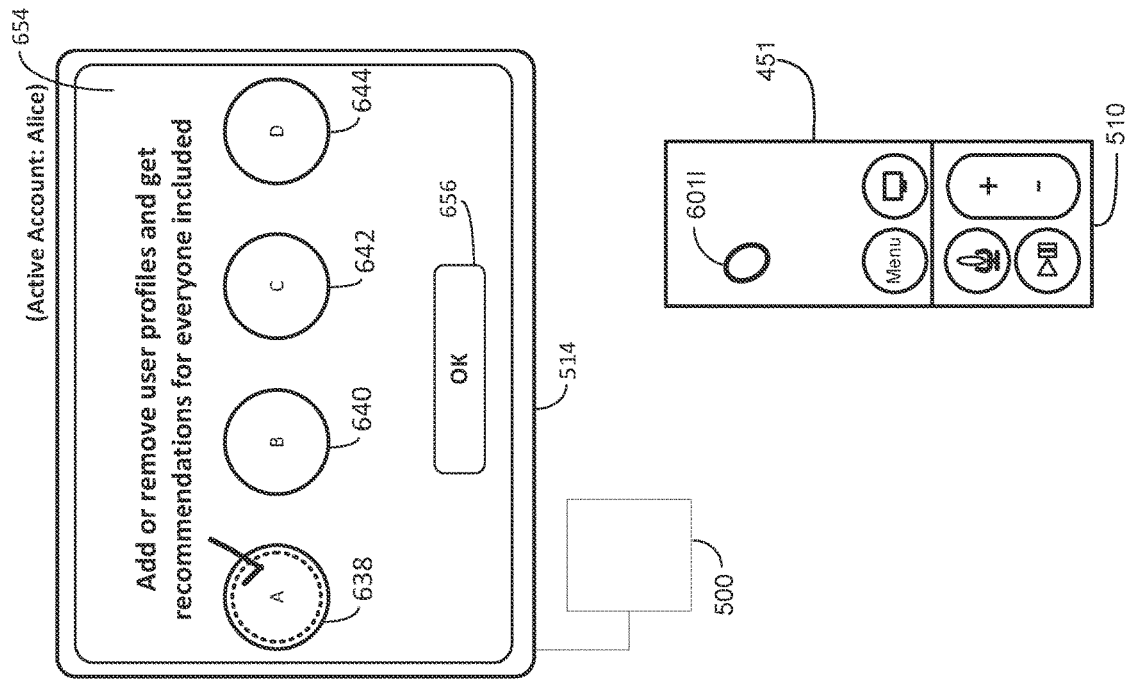
Figure 6K:
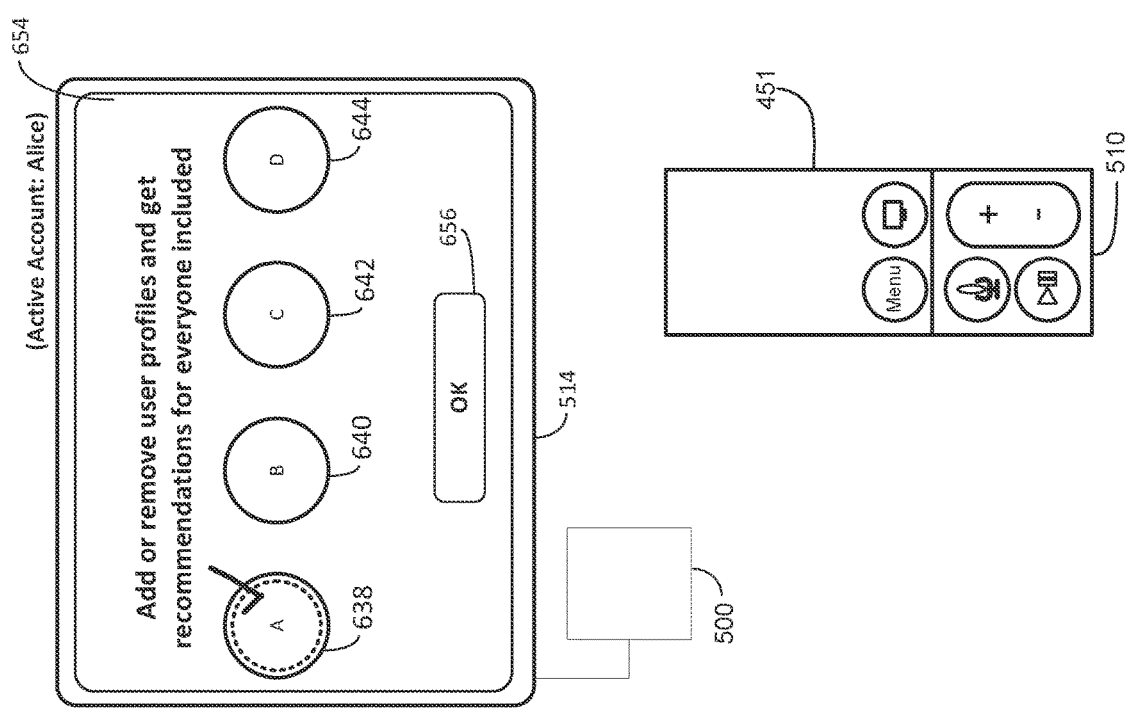
Figure 6N:
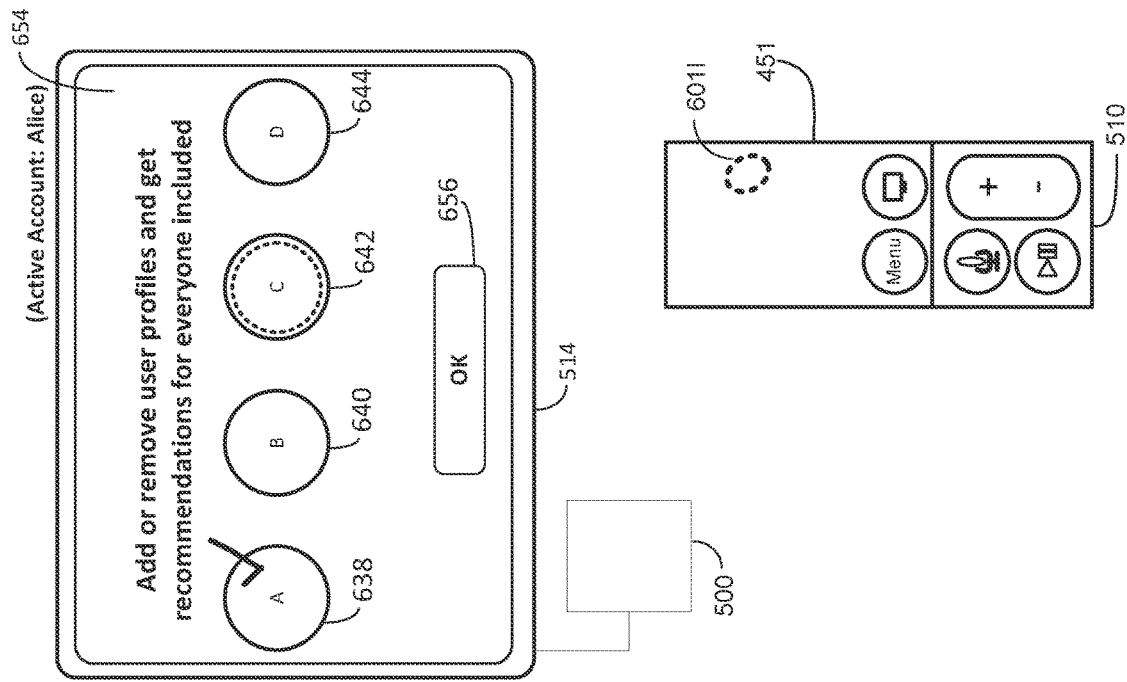
Figure 6M:
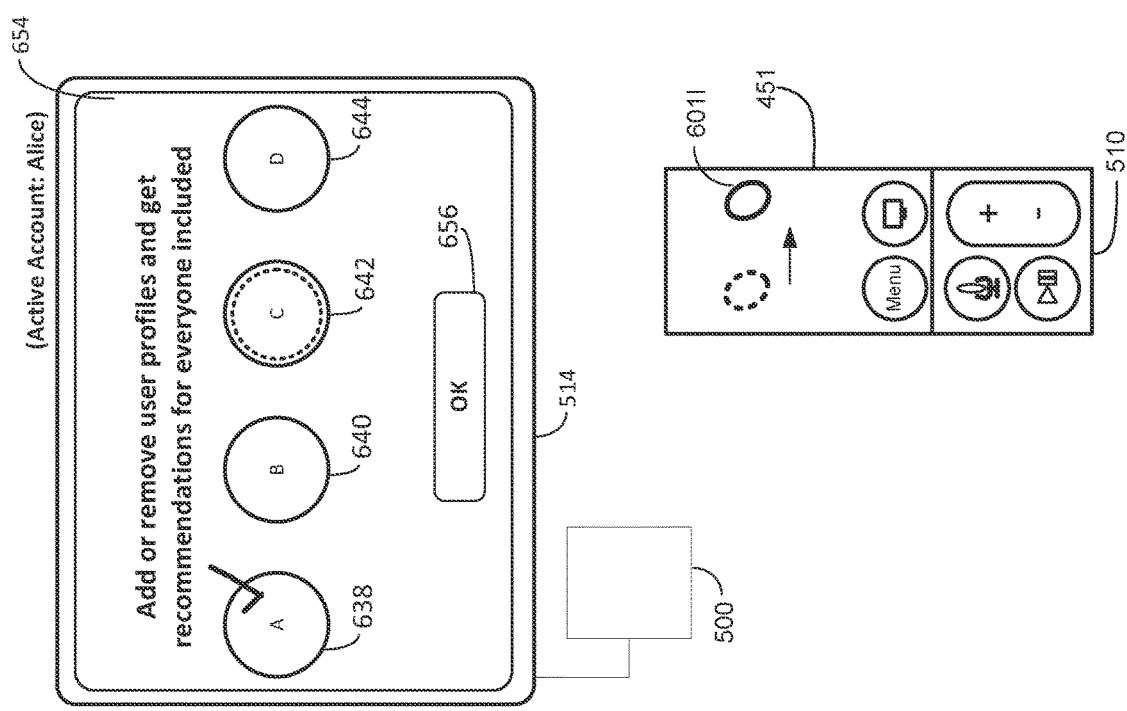

In some embodiments, user interface element 636 can be selected to edit the user accounts currently selected or designated for inclusion in content recommendations that are based on a set of selected or designated users accounts (e.g., add user accounts to and/or remove users accounts from inclusion in content recommendations). For example, in FIG. 6A, while device 500 is displaying the representation 610 of Movie D with focus (indicated by the dashed-line box at the representation 610), device 500 detects a request to move the focus (indicated by touch contact 601a touching down on touch-sensitive surface 451). In FIG. 6B, device 500 receives an indication that the touch contact 601a has swiped in the rightward direction (indicated by touch contact 601a moving rightward on touch-sensitive surface 451). In response to receiving the indication, device 500 moves the focus from the representation 610 of Movie D to the representation 616 of Movie E (indicated by the dashed-line box now being displayed at the representation 616). In FIG. 6C, after device 500 moved the focus to the representation 616 of Movie E, device 500 receives another indication that touch contact 601a has swiped in an upward direction (indicated by the new location of touch contact 601a on the touch-sensitive surface 451). In response to device 500 receiving the indication that touch contact 601a has swiped in an upward direction, device 500 moves the focus from the representation 616 of Movie E to the selectable user interface element 636 (indicated by device 500 updating the selectable user interface element 636 to include the text "Edit", and indicated by device 500 displaying a dashed-line box at the selectable user interface element 636). In FIG. 6D, while device 500 is displaying the selectable user interface element 636 with focus, device 500 receives an indication that touch contact 601a is no longer in contact with the touch-sensitive surface 451 (indicated by the dashed-line touch contact 601a on the touch-sensitive surface 451). In response to receiving the indication, device 500 continues to display the selectable user interface element 636 with focus and stops moving the focus in accordance the movement of touch contact 601a.

In FIG. 6E, device 500 detects a request for editing the user accounts currently selected or designated for inclusion in content recommendations (indicated by touch contact 601e tapping on the touch-sensitive surface 451 while the selectable user interface element 636 is being displayed with focus). In some embodiments, before one or more user accounts can be designated or selected for inclusion in content recommendations that are based on a set of selected or designated user accounts, the user account currently active account on device 500 must have previously opted-in to being included in such content recommendations. For example, in FIG. 6F, in response to device 500 receiving the selection of the selectable user interface element 636 in FIG. 6E, device 500 displays a consent user interface 646 associated Alice's user account because device 500 (or a server in communication with device 500) determines that the user account associated with Alice (e.g., the user account currently active at device 500) has not opted-in to being included in content recommendations that are based on a set of selected or designated user accounts.

Consent user interface 646 includes a selectable option 648 that, when selected, causes Alice's user account to opt-in to content recommendations that are based on a set of selected or designated user accounts, a selectable option 650 that, when selected, causes Alice's user accounts to opt-out of (e.g., be excluded from any) content recommendations that are based on a set of selected or designated user accounts, and a selectable option 652 that, when selected, causes Alice's user account to be temporarily opted-out of content recommendation that are based on a set of selected or designated user accounts (e.g., opted-out until the selectable user interface element 636 is selected again). Consent user interface 646 also includes a representation 638 of Alice's user account indicating that one or more settings of Alice's user account will be updated/modified when device 500a detects a selection of one of the selectable options 648-652.

Figure 6P:
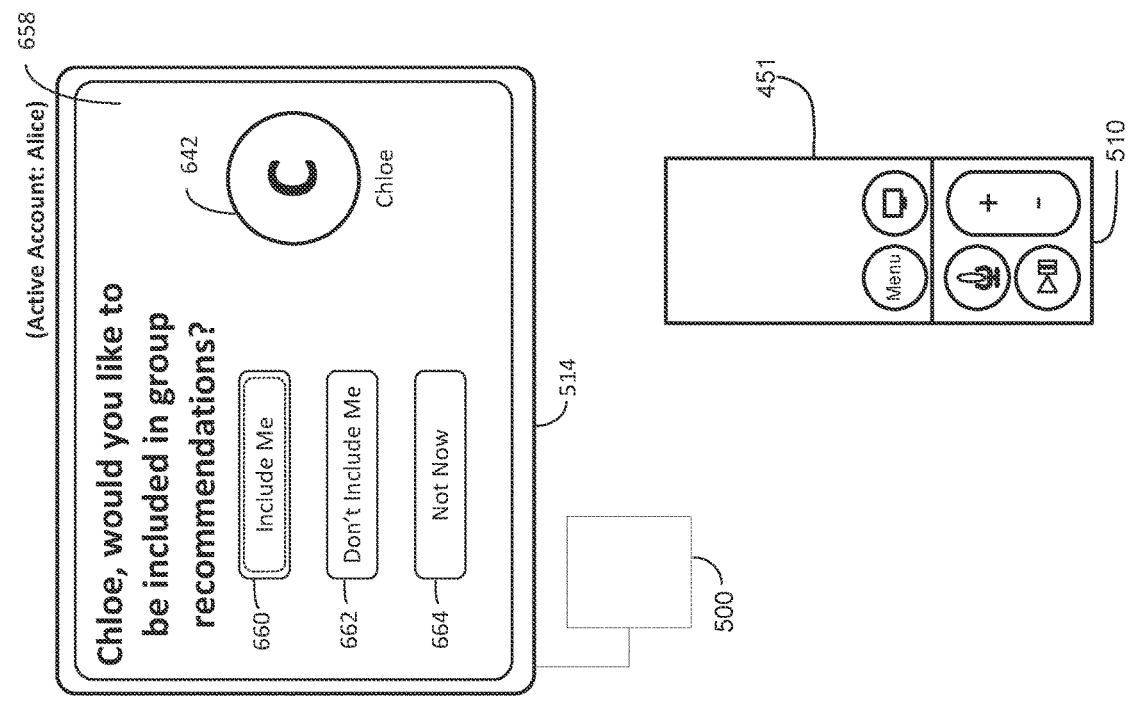
Figure 6O:
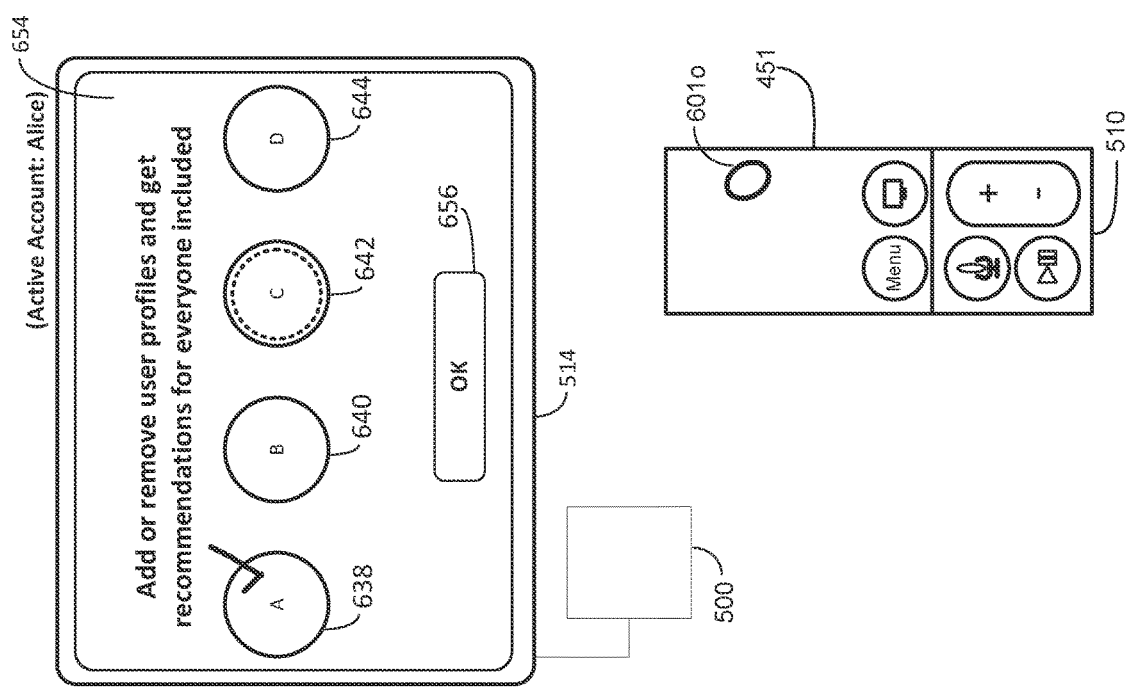
Figure 6V:
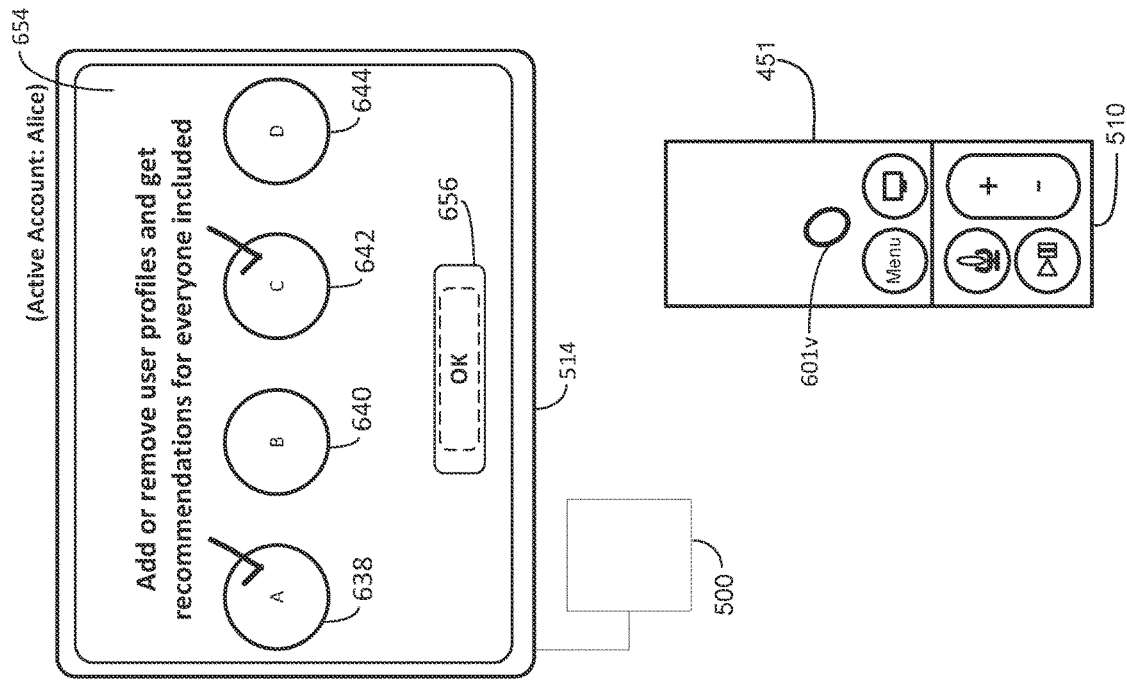
Figure 6U:
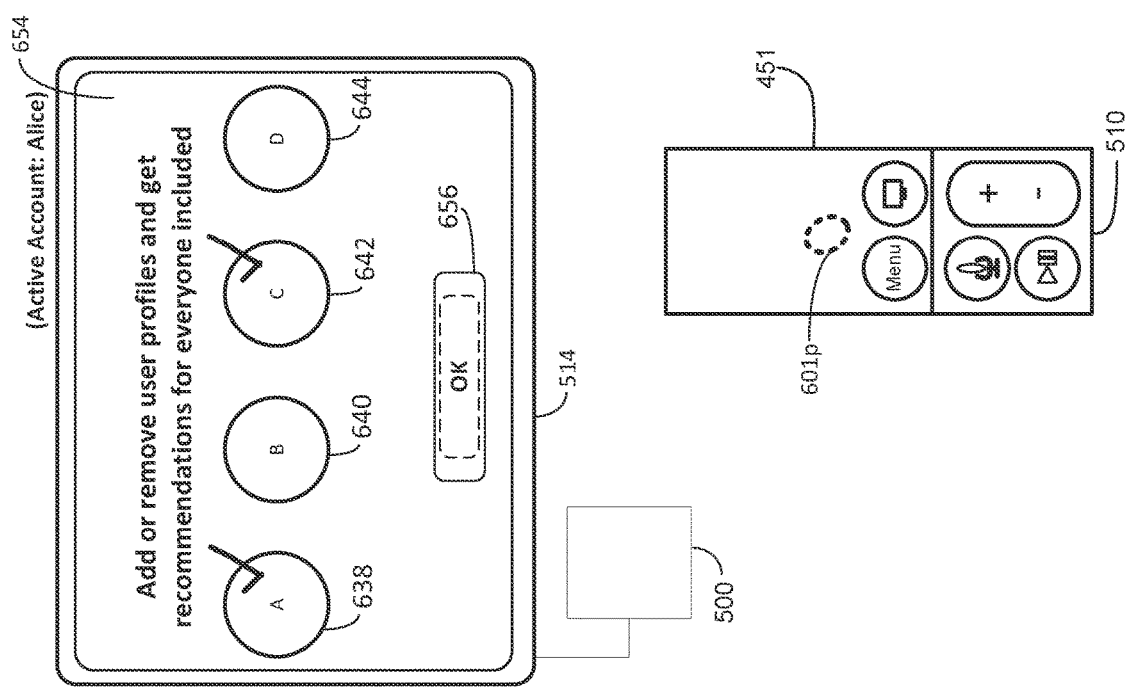
Figure 6D:
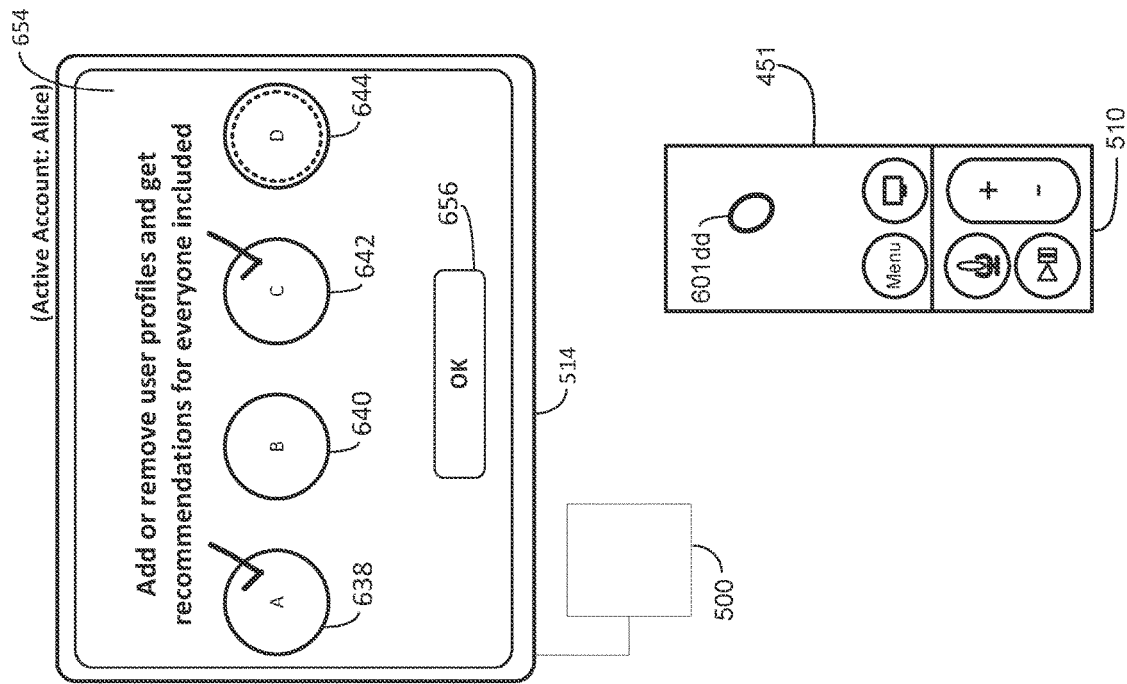
Figure 6C:
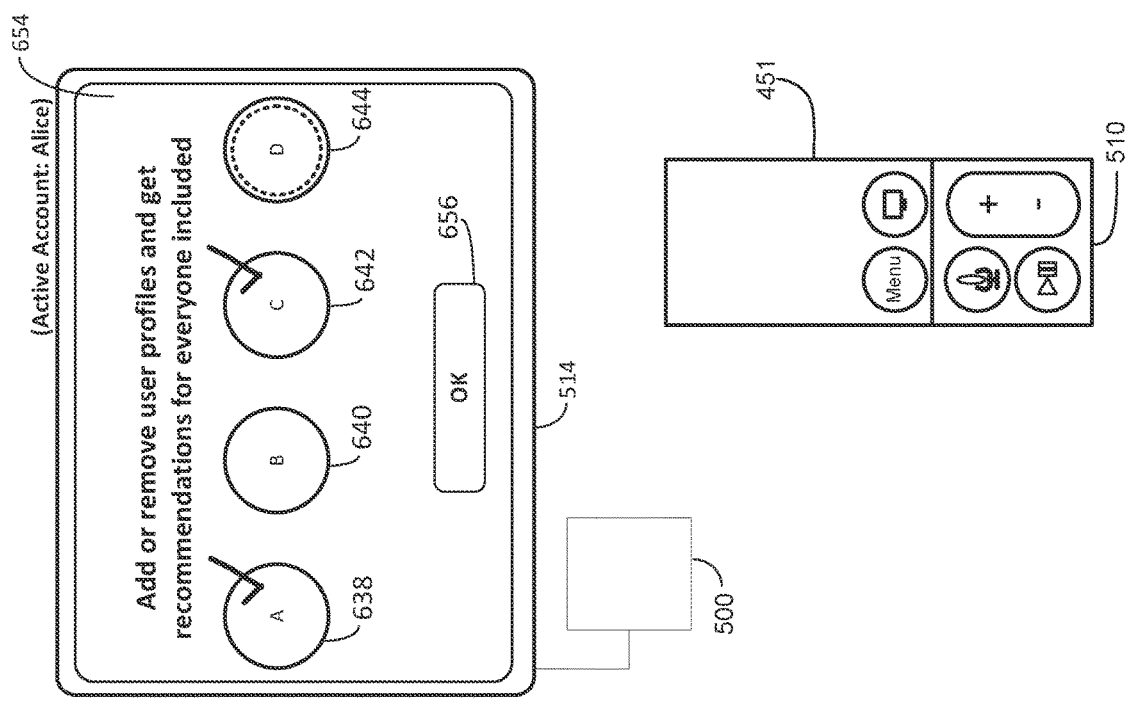
Figure 6H:
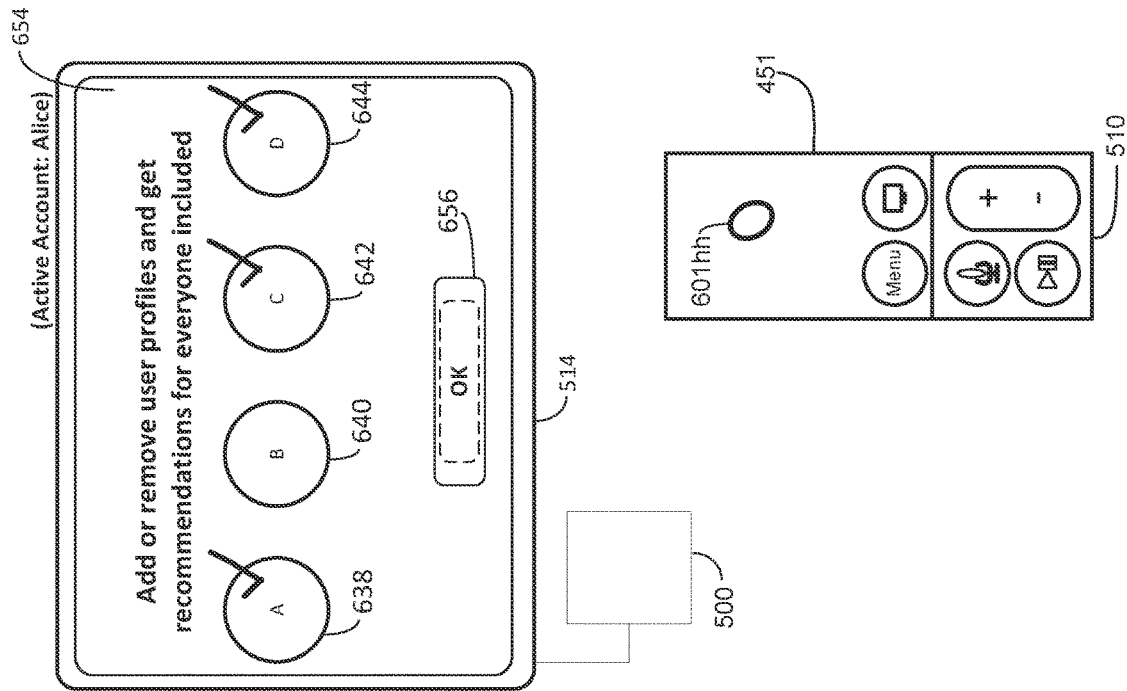
Figure 6G:
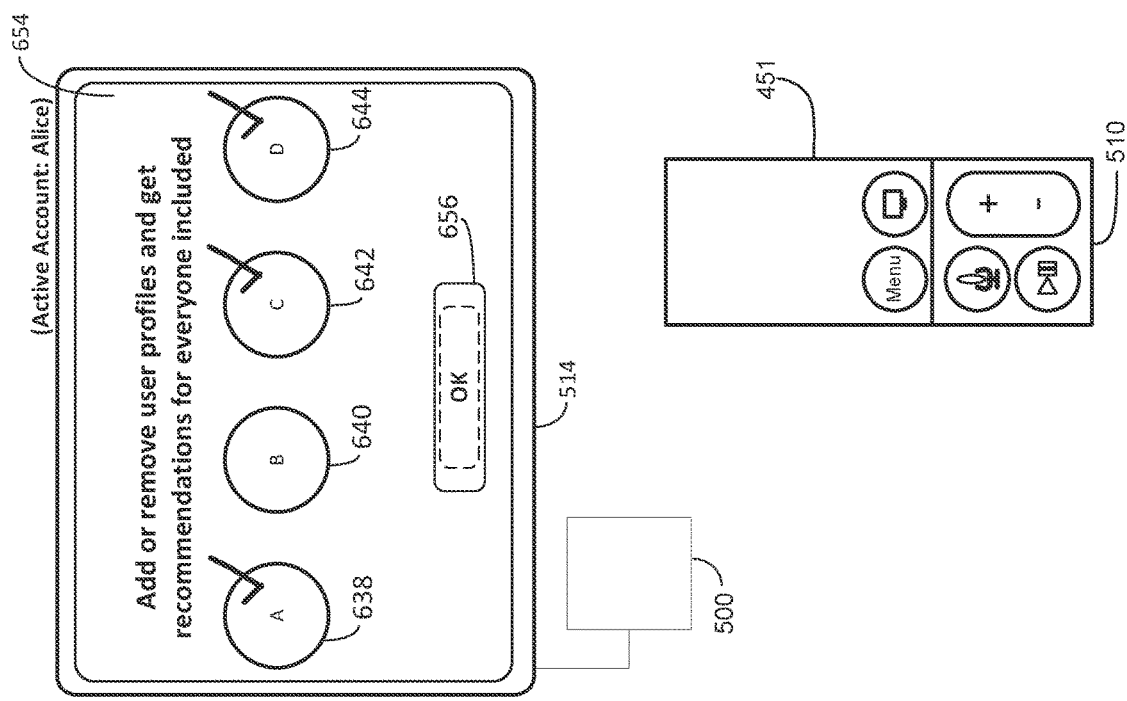
Figure 6U:
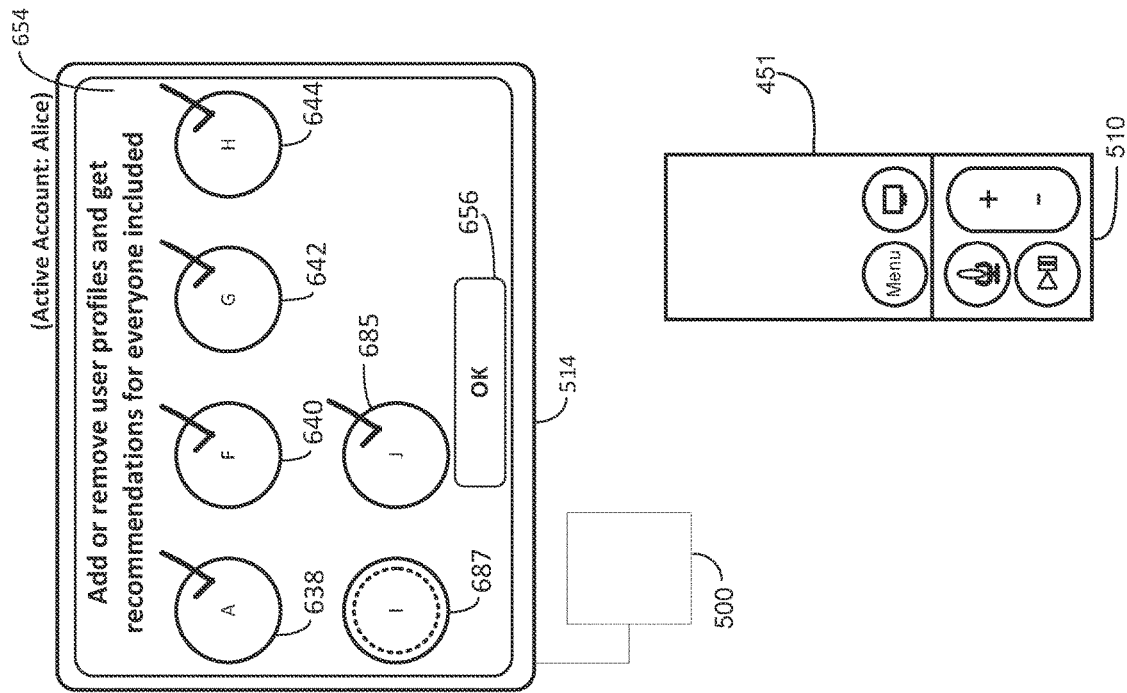
Figure 6U:
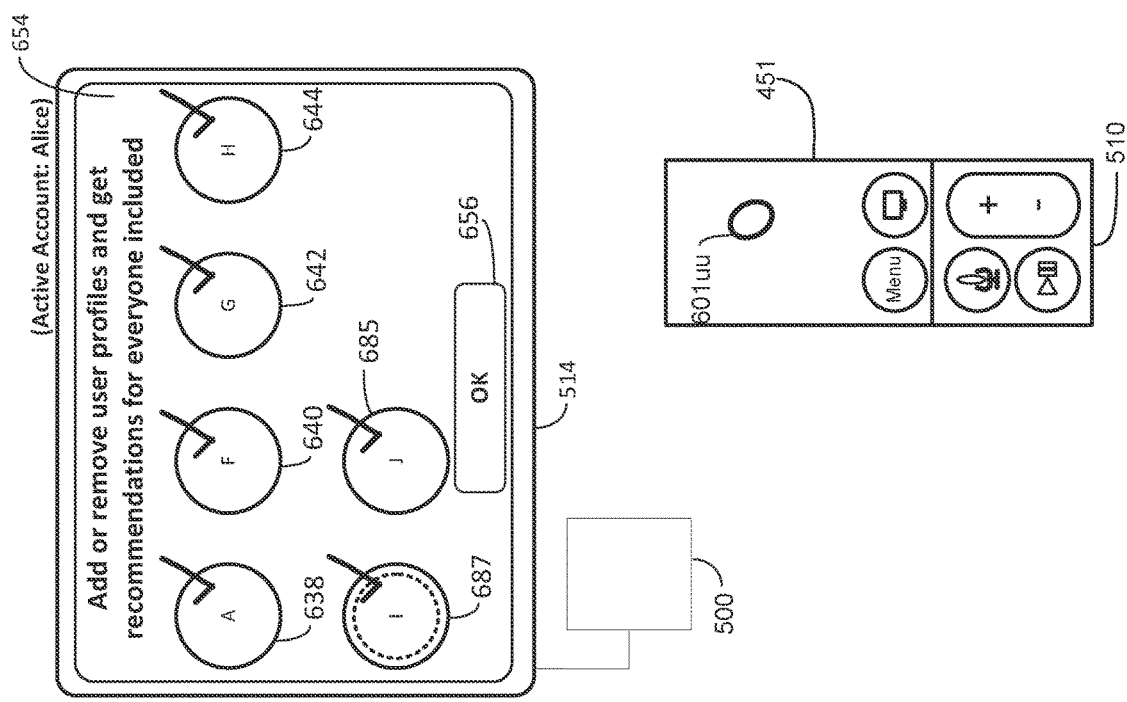

In FIG. 6G, while device 500 is displaying the consent user interface 646, device 500 receives a request to opt-out Alice's user account from content recommendations that are based on a set of selected or designated user accounts (indicated by touch contact 601g tapping on the touch-sensitive surface 451 while the selectable option 650 is being displayed with focus). In some embodiments, as will be described in more detail later, when a user account opts-out of such content recommendations, that user account is not able to be designated or selected for inclusion in content recommendations that are based on a set of selected or designated user accounts.

In some embodiments, if the opted-out user account corresponds to the user account that is currently active at device 500 (e.g., device 500 is displaying user interfaces/ content based on that user account), device 500a stops displaying content recommendations that are based on a set of selected or designated user accounts. For example, in FIG. 6H, in response to device 500 receiving the request to opt-out Alice's user account from content recommendations that are based on a set of selected or designated user accounts, device 500 opts-out Alice's user account from such content recommendations and ceases displaying, in media user interface 632, content recommendations that are based on a set of selected or designated user accounts (e.g., ceases display of the content recommendations corresponding to representations 610-616 illustrated in FIG. 6E). Additionally, in response to Alice's user account opting out of content recommendations that are based on a set of selected or designated user accounts, device 500 also ceases display of the user interface elements/controls that were being displayed in associated with the representations 610-616, including the label 628, the indication 634, and the user interface element 636, as previously illustrated in FIG. 6E.

Additionally, in FIG. 6H, as a result of device 500 causing Alice's user account to be opted-out of content recommendations that are based on a set of selected or designated user accounts, device 500 updates the media user interface 632 to include additional content recommendations that are not based a set of selected or designated user accounts (e.g., content recommendations that are not based on any user account other than Alice's user account). Specifically, device 500 updates media user interface 632 to include to include a representation 675 of Movie J that is selectable to cause device 500 to play Movie J, a representation 673 of Movie K that is selectable to cause device 500 to play Movie K, a representation 671 of Movie L that is selectable to cause device 500 to play Movie L, and a representation 669 of Movie M that is selectable cause device 500 to play Movie M. The representations 669-675 correspond to media items that are being recommended to Alice (e.g., the user account currently active at device 500) because Alice has watched "Movie B".

As mentioned previously, in some embodiments, before other user accounts can be selected or designated for inclusion in content recommendations, the user account currently active at device 500 must be opted-in to content recommendations that are based on a set of selected or designated user accounts. For example, in FIG. 6I, device 500 is displaying the consent user interface 646 previously illustrated in FIG. 6F. In FIG. 6J, while device 500 is displaying the consent user interface 646 and while Alice's user account is currently opted-out of content recommendations that are based on a set of selected or designated user accounts, device 500 receives a request to opt-in Alice's user account to content recommendations that are based on a set of selected or designated user accounts (indicated by touch contact 601j tapping on touch-sensitive surface 451 while selectable object 648 is being displayed with focus). In response to device 500 receiving the input to opt-in Alice's user account in FIG. 6J, in FIG. 6K, device 500 causes Alice's user account to become opted-in to content recommendations that are based on a set of selected or designated user accounts, and causes device 500 to display user interface 654. User interface 654 includes representations of user accounts that can be selected or designated for inclusion in content recommendations, including a representation 638 of Alice's user account, a representation 640 of Bob's user account, a representation 642 of Chloe's user account, and a representation 644 of Dan's user account. As illustrated in FIG. 6K, device 500 is displaying the representation 638 of Alice's user account with a checkmark indicating that Alice's user account is currently designated for inclusion in content recommendations that are based on a set of selected or designated user accounts. Device 500 is not displaying the representations 640-644 of respective user accounts with a checkmark indicating that those respective user accounts are not currently selected for inclusion in content recommendations that are based on a set of selected or designated user accounts.

In some embodiments, the representations of user accounts, displayed in user interface 654, are selectable to toggle the status of the respective user accounts inclusion in content recommendations (e.g., toggle the user account from being included in and excluded from content recommendations). For example, in FIG. 6L, while device 500 is displaying user interface 654 and while device 500 is currently displaying the representation 638 with focus, device 500 receives an indication that touch contact 601l has touched down on touch-sensitive surface 451. In FIG. 6M, after device 500 received an indication of the touchdown of touch contact 601l, device 500 receives a request to move the focus from the representation 638 of Alice's user account to the representation 642 of Chloe's user account (indicated by touch contact 601l swiping to the right on the touch-sensitive surface 451). In response to device 500 receiving the request to move the focus in user interface 654, device 500 moves the focus from the representation of Alice's user account 638 to the representation 642 of Chloe's user account (indicated by the dashed-line circle being displayed at the representation 642). In FIG. 6N, while device 500 is displaying the representation 642 with focus, device 500 receives an indication that touch contact 601l is no longer in contact with the touch-sensitive surface 451. In response to receiving the indication, device 500 continues to display the focus at the representation 642 of Choe's user account, and device 500 also stops moving the focus in user interface 654 in accordance the movement of touch contact 601l. In FIG. 6O, while device 500 is displaying the representation 642 of Chloe's user account with and while Chloe's user account is not currently designated for inclusion in content recommendations, device 500 detects a request to select Chloe's user account for inclusion in content recommendations (indicated by touch contact 601o tapping on the touch-sensitive surface 451 while the representation 642 of Choe's user account is being displayed with focus).

As mentioned previously, in some embodiments, before a respective user account can be selected for inclusion in content recommendations that are based on a set of selected or designated user account, that respective user account must have previously opted-in to such content recommendations.

For example, in FIG. 6P, because Chloe's user account has not previously opted-in to content recommendations that are based on a set of selected or designated user accounts, device 500 displays the consent user interface 658 in response to the input detected in FIG. 6O. Consent user interface 658 prompts Chloe (e.g., the user associated with Chloe's user account) to opt-in or opt-out of content recommendations that are based on a set of selected or designated user accounts. Specifically, control user interface 658 includes a selectable option 660 that, when selected, causes Chloe's user account to opt-in to content recommendations that are based on a set of selected or designated user accounts, a selectable option 662 that, when selected, causes Chloe's user accounts to opt-out of (e.g., be excluded from any) content recommendations that are based on a set of selected or designated user accounts, and a selectable option 664 that, when selected, causes Chloe's user account to be temporarily opted-out of content recommendation that are based on a set of selected or designated user accounts (e.g., opted-out until the selectable user interface element 636 is selected again). Consent user interface 658 also includes a representation 642 of Chloe's user account indicating that one or more settings of Chloe's user account will be updated/modified when device 500 detects a selection of one of the selectable options 660-664. In some embodiments, Chloe (e.g., the user associated with Chloe's user account) is able to provide input to device 500 because an electronic device associated with Chloe is in communication with device 500 and/or because Chloe is at a same physical location as remote 510.

In FIG. 6Q, while device 500 is displaying the consent user interface 658 for Chloe's user accounts, device 500 receives a request to opt-in Chloe's user account to content recommendations that are based on a set of selected or designated user accounts (indicated by touch contact 601q tapping on touch-sensitive surface 451 while selectable object 660 is being displayed with focus). In response to device 500 receiving the request to opt-in Chloe's user account to content recommendations that are based on a set of selected or designated user accounts, in FIG. 6R, device 500 opt-ins Chloe's user account to such content recommendations, and also selects Chloe's user account for inclusion in content recommendations (indicated by device 500 displaying the representation 642 of Chloe's user account with a checkmark). In FIG. 6S, after designating Chloe's user accounts for inclusion in content recommendations that are based on a set of selected or designated user accounts, device 500 receives a request to change the focus in user interface 654 (indicated by touch contact 601s touching the touch-sensitive surface 451). In FIG. 6T, after detecting the touchdown of touch contact 601s on the touch-sensitive surface 451, device 500 detects a request to move the focus from the representation 642 of Chloe's user account to the selectable object 656 (indicated by touch contact 601p swiping in a downward direction). In response, device 500 moves the focus from the representation of Chloe's user account 642 to selectable object 656. In FIG. 6U, while device 500 is displaying the selectable option 656 with focus, device 500 detects that touch contact 601p is no longer in contact with the touch-sensitive surface 451 (indicated by the dashed-line touch contact 601p). In response to detecting that touch contact 601p has lifted off of the touch-sensitive surface 451, device 500 continues to display the user interface element 656 with focus, and device 500 stops moving the focus in accordance the movement of touch contact 601p.

In FIG. 6V, while Alice's user account and Chloe's user accounts are currently designated for inclusion in content recommendations that are based on a set of selected or designated user accounts, device 500 detects a selection of selectable option 656 (indicated by touch contact 601v tapping on the touch-sensitive surface 451 while selectable option 656 is being displayed with focus). In FIG. 6W, in response to device 500 detecting the selection of selectable option 656 in FIG. 6V, device 500 updates media user interface 632 to include content recommendations based on characteristics of Alice's and Chloe's user accounts (e.g., the user accounts designated for inclusion in content recommendations, as illustrated in FIG. 6V, and not based on user accounts that have not been designated for inclusion in content recommendations).

Specifically, device 500 updates the media user interface 632 to include, in the second respective row of media user interface 632, a representation 666 of Movie N that, when selected, causes device 500 to play Movie N, a representation 668 of Movie O that, when selected, causes device 500 to play Movie O, a representation 670 of Movie P that, when selected, causes device 500 to play Movie P, and a representation 672 of TV Show E that, when selected, causes device 500 to play TV Show E. In some embodiments, the media items corresponding the representations 666-672 are selected for display in the media user interface 632 because device 500 (or a server in communication with device 500) determines that based on viewing behaviors of Alice's and Chloe's user accounts (e.g., the user accounts designated for inclusion in content recommendations), the media items corresponding to those representations have a high probability (e.g., 80%, 85%, 90%, 95%, etc.) of being liked by the users Alice and Chloe (e.g., the users corresponding to Alice's user account and Chloe's user account, respectively).

Additionally, because Alice's and Chloe's user accounts have been designated for inclusion in content recommendations, device 500 updates the visual appearance of the representation 638 of Alice's user account and the representation 642 of Chloe's user accounts to indicate that Alice's user account and Chloe's user account for are currently designated for inclusion in content recommendations. Device 500 also updates the indication 634 to include the text "Gritty, Modern" indicating that the content being recommended based on Alice's and Chloe's user account relates to the categories Gritty and Modern.

In some embodiments, additional users accounts can be designated for inclusion in content recommendations that are based on a set of selected or designated user accounts. For example, in FIG. 6X, while device 500 is displaying content recommendations based on Alice's and Chloe's user account (e.g., the user accounts currently designated for inclusion in content recommendations), device 500 receives a request to change the focus, in media browsing user interface 632 (indicated by touch contact 601x touching the touch-sensitive surface 451). In FIG. 6Y, after device 500 detected a touchdown of touch contact 601x on the touch-sensitive surface 451, device 500 receives an indication that touch contact 601x has swiped to the right (indicated by the new location of touch contact 601x in FIG. 6Y). In response to receiving the indication that touch contact 601x has swiped to the right, device 500 moves the focus from the representation 666 of Movie N to the representation 672 of TV Show E.

In FIG. 6Z, after device 500 moved the focus to the representation 672 of TV Show E, device 500 receives an indication that touch contact 601x has swiped in an upward direction (indicated by the new location of touch contact 601x in FIG. 6Z). In response to device receiving the indication that touch contact 601x swiped in an upward direction, device 500 moves the focus from the representation 672 of TV Show E to the user interface element 636 (indicated by device 500 updating the selectable user interface element 636 to include the text "Edit," and indicated by the dashed-line box being displayed at the selectable user interface 632). In FIG. 6AA, while device 500 is displaying the selectable user interface element 636 with focus, device 500 receives an indication that touch contact 601x is no longer in contact with the touch-sensitive surface 451 (indicated by the dashed-line touch contact 601x). In response to receiving the indication that touch contact 601x is no longer in contact with the touch-sensitive surface 451, device 500 continues displaying the selectable user interface element 636 with focus and stops moving the focus in accordance with the movement of touch contact 601x. In FIG. 6BB, while device 500 is displaying the selectable user interface element 636 with focus, device 500 detects a selection of the selectable user interface element 636 (indicated by touch contact 601bb tapping on the touch-sensitive surface 451 while the selectable user interface 636 is displayed with focus).

In response to device 500 receiving the selection of the selectable user interface element 636 in FIG. 6BB, in FIG. 6CC, device 500 displays the user interface 654 for editing the user accounts currently designated for inclusion in content recommendations. User interface 654 includes representations of user accounts that can be designated for inclusion in content recommendations, including a representation 638 of Alice's user account, a representation 640 of Bob's user account, a representation 642 of Chloe's user account, and a representation 644 of Dan's user account. As illustrated in FIG. 6CC, device 500 is displaying the representation 638 of Alice's user account and the representation 642 of Chloe's user account with a checkmark indicating that Alice's and Chloe's user accounts are currently selected for inclusion in content recommendations that are based on a set of selected or designated user accounts. In contrast, the representation 640 of Bob's user account and the representation 644 of Dan's user account are not being displayed with a checkmark indicating that both Bob's user account and Dan's user account are not currently selected for inclusion in content recommendations that are based on a set of selected or designated user accounts.

In FIG. 6DD, while device 500 is displaying the representation 644 of Dan's user account with focus and while Dan's user account is not currently selected for inclusion in content recommendations, device 500 detects a request to designate Dan's user account for inclusion in content recommendations (indicated by touch contact 601dd tapping on the touch-sensitive surface 451 while the representation 644 of Dan's user account is being displayed with focus). As mentioned previously, in some embodiments, before a respective user account can be selected or designated for inclusion in content recommendations, that respective user account must be opted-in to content recommendations that are based on a set of selected or designated user accounts. For example, in FIG. 6EE, in response to device 500 detecting the selection of the representation 644 of Dan's user account and because Dan's user account has not currently opted-in to content recommendations that are based on a set of selected or designated user, device 500 displays consent user interface 674. Consent user interface 674 prompts Dan (e.g., the user associated with Dan's user account) to opt-in or opt-out of content recommendations that are based on a set of selected or designated user accounts. Specifically, content user interface 674 includes a selectable option 676 that, when selected, causes Dan's user account to opt-in to content recommendations that are based on a set of selected or designated user accounts, a selectable option 678 that, when selected, causes Dan's user accounts to opt-out of (e.g., be excluded from any) content recommendations that are based on a set of selected or designated user accounts, and a selectable option 680 that, when selected, causes Dan's user account to be temporarily opted-out of content recommendation that are based on a set of selected or designated user accounts (e.g., opted-out until the selectable user interface element 636, illustrated in FIG. 6BB, is selected again). Consent user interface 674 also includes a representation 644 of Dan's user account indicating that one or more settings of Dan's user account will be updated/modified when device 500 detects a selection of one of the selectable options 676-680. In some embodiments, Dan (e.g., the user associated with Dan's user account) is able to provide input to device 500 because an electronic device associated with Dan is in communication with device 500 and/or because Dan is at a same physical location as remote 510.

In FIG. 6FF, while device 500 is displaying the consent user interface 674 for Dan's user account and while device 500 is displaying the selectable option 676 with focus, device 500 receives a request to opt-in Dan's user account to content recommendations that are based on a set of selected or designated user accounts (indicated by touch contact 601*ff* tapping on touch-sensitive surface 451 while selectable object 676 is being displayed with focus). In response to device 500 receiving the request to opt-in Dan's user account to content recommendations that are based on a set of selected or designated user accounts, in FIG. 6GG, device 500 opt-ins Dan's user account to content recommendations that are based on a set of selected or designated user accounts, and also selects Dan's user account for inclusion in content recommendations (indicated by device 500 displaying the representation 644 of Dan's user account with a checkmark). In FIG. 6HH, while Alice's user account, Chloe's user accounts, and Dan's user account are currently designated for inclusion in content recommendations that are based on a set of selected or designated user accounts, device 500 detects a selection of selectable option 656 (indicated by touch contact 601*hh* tapping on the touch-sensitive surface 451 while selectable option 656 is being displayed with focus). In FIG. 6II, in response to device 500 detecting the selection of selectable option 656 in FIG. 6HH while Alice's, Chloe's, and Dan's user accounts are currently designated for inclusion in content recommendations, device 500 updates media user interface 632 to include content recommendations based on characteristics of Alice's, Chloe's, and Dan's user accounts (e.g., the user accounts designated for inclusion, as illustrated in FIG. 6HH, and not based on user accounts that have not been designated for inclusion in content recommendations). Specifically, device 500 updates the media user interface 632 to include, in the second respective row of media user interface 632, a representation 682 of Movie Q that, when selected, causes device 500 to play Movie Q, a representation 684 of Movie R that, when selected, causes device 500 to play Movie R, a representation 686 of Movie S that, when selected, causes device 500 to play Movie S, and a representation 688 of TV Show F that, when selected, causes device 500 to play TV Show F. In some embodiments, the media items corresponding the representations 682-688 are selected for display in the media user interface 632 because device 500 (or a server in communication with device 500) determines that based on viewing behaviors of Alice's, Chloe's, and Dan's user accounts (e.g., the user accounts designated for inclusion in content recommendations), the media items corresponding to the representations 682-688 have a high probability (e.g., 80%, 85%, 90%, 95%, etc.) of being liked by users Alice, Chloe, and Dan (e.g., the users corresponding to Alice's user account, Chloe's user account, and Dan's user account, respectively).

Additionally, because Alice's, Chloe's, and Dan's user accounts are currently designated for inclusion in content recommendations, device 500 updates the visual appearance of the representation 638 of Alice's user account, the representation 642 of Chloe's user accounts, and the representation 644 of Dan's user account to indicate that Alice's user account, Chloe's user account, and Dan's user account are currently selected for inclusion in content recommendations. Device 500 also updates the indication 634 to include the text "Comedy, Mystery, Actor A" to indicate that the content being recommended based on Alice's, Chloe's, and Dan's user account relates to Actor A and the categories Comedy and Mystery.

In some embodiments, different types of user accounts can be designated for inclusion in content recommendations. For example, in FIG. 6JJ, Alice's user account, which corresponds to a "regular" user account, Chloe's user account, which also corresponds to a "regular" user account, and Dan's user account, which corresponds to a "child" user account, are currently designated for inclusion in content recommendations (indicated device 500*a* displaying the representation 638 of Alice's user account, the representation 642 of Chloe's user account, and the representation 644 of Dan's user account with a gray fill).

In some embodiments, "regular" user accounts are type of user accounts that have access to any type of media content accessible by device 500, such as media content that is rated G (General Audiences), PG (Parental Guidance Suggested), PG-13 (Parents Strongly Cautioned), R (Restricted), etc. In contrast, a "child" user account is optionally a type of user account that has access to media content up to a certain content/maturity rating (e.g., media content items that are rated up to and including PG-13).

In some embodiments, only the media items that satisfy the content rating restrictions of all the users accounts designated for inclusion are selected for display in the media user interface 632. For example, the user accounts designated for inclusion in FIG. 6II and FIG. 6JJ are the same user accounts, but in the example of FIG. 6JJ, one of the user accounts—Dan's user account—designated for inclusion corresponds to a "child" user account that restricts has access to media above a respective content/maturity rating (e.g., PG, PG-13, R, etc.). As a result of Dan's user account corresponding to a "child" user account in FIG. 6JJ, device 500 displays different media content recommendations as compared to when Dan's user account corresponds to a regular user account as illustrated in FIG. 6II. Specifically, when Dan's user account corresponds to a "child" user account, the media user interface includes a representation 682 of Movie Q that is selectable to cause device 500*a* to play Movie Q, a representation 684 of Movie R that is selectable to cause device 500*a* to play Movie R, a representation 686 of Movie S that is selectable to cause device 500*a* to play Movie S, and a representation 668-1 of TV Show F* that is selectable to cause device 500*a* to play TV Show F*. Which, in contrast to when Dan's user account does not correspond to a child's user account, as illustrated in FIG. 6II, the media user interface 632 includes a representation 682 of Movie Q that is selectable to cause device 500a to play Movie Q, a representation 684 of Movie R that is selectable to cause device 500a to play Movie R, a representation 686 of Movie S that is selectable to cause device 500a to play Movie S, and a representation 668 of TV Show F that is selectable to cause device 500a to play TV Show F.

In other words, when Dan's user account corresponds to a "child" user account (and Alice's, Chloe's, and Dan's user account are designated for inclusion in content recommendations), the media user interface 632 still includes representations of Movies Q-S because the content rating corresponding to those movies are accessible by the content restrictions defined by the "child" user account, but does not include a representation corresponding to TV Show F because TV Show F is not accessible to Dan's user account because of the content restrictions of a "child" user account (e.g., TV Show F exceeds a maximum maturity/content rating).

In some embodiments, a user account currently opted-in to content recommendations that are based on a set of selected or designated user accounts can opt-out of such content recommendations. For example, in FIG. 6KK, device 500 is displaying a settings user interface 690 for Dan's user account. In some embodiments, the electronic device 500 switches from displaying the media browsing user interface 632 associated with Alice's user account illustrated in FIG. 6JJ to displaying the settings user interface 690 associated Dan's user account when device 500 receives a sequence of inputs for changing the user account currently active at device 500 from Alice's user account to Dan's user account and for displaying the account settings of Dan's user account. Settings user interface 690 indicates the current settings of Dan's user account, including an indication 692 of an email address currently associated with Dan's user account (Dan.Appleseed@emailprovider.com), an indication 693 of the username of Dan's user account (Dan_Appleseed), an indication 694 that Dan's user account is currently opted-in to content recommendations that are based on a set of selected/designated user accounts (represented by selectable option 694 being displayed in a toggled on state), and an indication that purchases made with Dan's user account requires a password (represented by selectable option 696 being displayed in a toggled on state).

In FIG. 6KK, while the electronic device 500 is displaying the settings user interface 690 and while Dan's user account is currently opted-in to content recommendations that are based on a set of selected or designated user accounts (represented by selectable option 694 being displayed in a toggled on state), device 500 receives a request to opt-out Dan's user account from such content recommendations (indicated by touch contact 601kk tapping on touch-sensitive surface 451 while selectable option 694 is being displayed with focus). In FIG. 6LL, in response to device 500 receiving the request to opt-out Dan's user account from content recommendations that are based on a set of selected or designated user accounts, device 500 opts-out Dan's user account from such content recommendations (represented by selectable option 694 being displayed in a toggled off state).

In some embodiments, after a user account opts-out of content recommendations that are based on a set of selected or designated user accounts, that user account is no longer able to be selected or designated for inclusion in such content recommendations. For example, in FIG. 6MM, after device 500 caused Dan's user account to be opted-out of content recommendations that are based on a set of selected or designated user accounts in FIG. 6LL, device 500 receives a sequence of inputs for switching the user account currently active at device 500 from Dan's user account to Alice's user account and for displaying the media browsing user interface 632 as illustrated previously. In response to receiving the sequence of inputs, device 500 displays switches the user account currently active at device 500 from Dan's user account to Alice's user account, and displays media user interface 632 associated with Alice's user account.

As shown in FIG. 6MM, device 500 is not displaying the representation 644 of Dan's user account 644 (as illustrated in FIG. 6II) because Dan's user account is no longer able to be designated for inclusion in content recommendations that are based on a set of selected or designated user accounts. Additionally, because Dan's user account was previously designated for inclusion in content recommendations before Dan's user account became opted-out of content recommendations that are based on a set of selected or designated user accounts (as illustrated in FIG. 6II), device 500 updates the media user interface 632 to include content recommendations that are only based on Alice's and Chloe's user accounts (e.g., the users accounts that were also designated for inclusion in FIG. 6II), and not based on Dan's user account (indicated by device 500 displaying the representation 638 of Alice's user account and the representation 642 of Chloe's user account with a gray fill). Specifically, the media user interface 632 includes a representation 666 of Movie N that is selectable to cause device 500 to play Movie N, a representation 668 of Movie O that is selectable to cause device 500 to play Movie O, a representation 670 of Movie P that is selectable to cause device 500 to play Movie P, and a representation 672 of TV Show E that is selectable to cause device 500 to play TV Show E. In some embodiments, the media items corresponding to the representations 666-672 are optionally selected for display in the media user interface 632 for the same reasons described previously.

In some embodiments, user accounts that are currently opted-out of content recommendations that are based on a set of selected or designated user accounts can optionally opt-in to such content recommendations. For example, in FIG. 6NN, after displaying the media user interface 632 illustrated in FIG. 6MM, the electronic device 500 receives a sequence of inputs for switching the user account currently active at device 500 from Alice's user account to Ethan's user account and for displaying the account settings of Ethan's user account. In response to receiving the sequence of inputs, device 500 switches the user account currently active at device 500 from Alice's user account to Ethan's user account and displays a settings user interface 697 for Ethan's user account. Settings user interface 697 indicates the current settings of Ethan's user account, including an indication 695 of the email address currently associated with Ethan's user account (Ethan.Appeseed@emailprovider.com), an indication 693 of the user name currently associated with Ethan's user account (Ethan_Appleseed), an indication that Ethan's user account is currently opted-out of content recommendations that are based on a set of selected/designated user accounts (represented by selectable option 691 being displayed in a toggled off state), and an indication that purchases made with Ethan's user account do not require a password (represented by selectable option 689 being displayed in a toggled off state).

In FIG. 6NN, while device 500 is displaying the settings user interface 697 and while Ethan's user account is currently opted-out of content recommendations that are based on a set of selected or designated user accounts, device 500 receives a request to opt-in Ethan's user account to such content recommendations (indicated by touch contact 601nn tapping on the touch-sensitive surface 451 while the selectable option 691 is being displayed with focus). In response to device 500 receiving the request to opt-in Ethan's user account in FIG. 6NN, in FIG. 6OO, device 500 opts-in Ethan's user account to content recommendations that are based on a set of selected or designated user accounts (indicated by selectable option 691 being displayed in a toggled on state).

In some embodiments, while a user account is opted-in to content recommendations that are based on a set of selected or designated user accounts, that user account can be selected or designated for inclusion in such content recommendations. For example, in FIG. 6PP, after device 500 opted-in Ethan's user account to content recommendations that are based on a set of selected or designated user accounts, device 500 received a sequence of inputs for switching the user account currently active at device 500 from Ethan's user account to Alice's user account and for displaying the media browsing user interface 632, described previously. In response to receiving the sequence of inputs, device 500 switches the user account currently active at device 500 from Ethan's user account to Alice's user account and displays the media browsing user interface 632. As a result of Ethan's user account now being opted-in to content recommendations that are based on a set of selected or designated user accounts, device 500 displays, in the selectable user interface element 636, a representation 698 of Ethan's user account to indicate that Ethan's accounts is now designatable for inclusion in content recommendations.

In some embodiments, an electronic device 500 automatically designates for inclusion in content recommendations the user accounts that have previously opted-in to content recommendations that are based on a set of selected or designated user accounts when redisplaying user interface 632 after having ceased to display user interface 632. For example, in FIG. 6QQ, after some amount of time has passed from displaying the media user interface 632 illustrated in FIG. 6QQ, the electronic device 500 enters a low power mode (e.g., device 500 remains on, but the display 514 in communication with device 500 is turned off). In some embodiments, device 500 enters a low power mode (e.g., sleep mode) when device 500 has not detected an input for a predefined period of time (e.g., 5 mins, 10 mins, 30 mins, 60 mins, etc.) and/or when device 500 receives a command that causes device 500 to enter a low power mode (e.g., receives a command from a dedicated remote control 510 and/or from a multi-function device in communication with device 500).

In FIG. 6RR, device 500 receives an input corresponding to a request for waking device 500 and for displaying a media browsing user interface. In response to receiving the input, device 500 exits the low power state and displays the media browsing user interface 632. As illustrated in FIG. 6RR, Alice's user account, Chloe's user account, and Dan's user account have been automatically designated for inclusion in content recommendations (e.g., without device 500 detecting any user input to designated these user accounts) because Alice's, Chloe's, and Ethan's user accounts have previously opted-in to content recommendations that are based on a set of selected or designated users (indicated by device 500 displaying the representation 638 of Alice's user account, the representation 642 of Chloe's user account, and the representation 698 of Ethan's user account with a gray background). As a result of Alice's, Chloe's and Ethan's user accounts having been automatically designated for inclusion in content recommendations, the media user interface 632 also includes media content recommendations that are based on the Alice's, Chloe's and Ethan's user accounts. Specifically, the media user interface 632 includes a representation 666 of Movie N that is selectable to cause device 500 to play Movie N, a representation 668 of Movie O that is selectable to cause device 500 to play Movie O, and a representation 670 of Movie P that is selectable to cause device 500 to play Movie P, and a representation 672 of TV Show E that is selectable to cause device 500 to play TV Show E. In some embodiments, the media items corresponding to the representations 666-672 are optionally selected for display in the media user interface 632 for the same reasons described previously. In some embodiments, the user account corresponding the representation 640 is not automatically designated for inclusion in content recommendations because that respective user account has not opted-in to content recommendations that are based on a set of selected or designated user accounts.

In some embodiments, the electronic device 500 optionally joins (e.g., becomes part of) a synchronized media and communication session. For example, in FIG. 6SS, the electronic device 500 receives a sequence of inputs for joining a synchronized media and communication session with an electronic device associated with a user named Frank, with an electronic device associated with a user named Gary, with an electronic device associated with a user named Holly, with an electronic device associated with a user named Ian, and with an electronic device associated with a user named Jessica. In response to device 500 receiving the sequence of inputs, device 500 joins the synchronized media and communication session, and displays indication 687 indicating that device 500 is currently part of a synchronized media and communication session with the above-mentioned electronic devices. In some embodiments, when an electronic device that is currently part of a synchronized media and communication session starts playing a respective media content item, the other electronic devices that are also part of the same synchronized media and communication session start synchronously playing that respective media content item with the electronic device, as will be described in more detail later.

Additionally, as result of device 500 joining the synchronized media and communication session, device 500 updates the selectable user interface 636 to include representations of the user accounts that are associated the electronic devices in the synchronized media and communication session. Specifically, as a result of device 500 joining the synchronized media communication session with the electronic devices associated with Frank, Gary, Holly, Ian, and Jessica, device 500 updates user interface element 636 to include a representation 640 of Frank's user account indicating that Frank's user account can now be designated for inclusion in content recommendations, a representation 642 of Gary's user account indicating that Gary's user account can now be designated for inclusion in content recommendations, a representation 698 of Holly's user account indicating that Holly's user account can now be designated for inclusion in content recommendations, a representation 687 of Ian's user account indicating that Ian's user account can now be designated for inclusion in content recommendations, and a representation 685 of Jessica's user account indicating that Jessica's user account can now be designated for inclusion in content recommendations. In some embodiments, when device 500 joins a synchronized media and communication session, the user accounts currently configured on the electronic device 500—except for the user account currently active at device 500—are not able to be selected for inclusion in content recommendations until device 500 leaves the synchronized media and communication session.

In some embodiments, when an electronic device joins a synchronized media, the user accounts associated with the other electronic devices in the synchronized media and communication session are automatically designated for inclusion in content recommendations. For example, as illustrated in FIG. 6SS, as a result of device 500 joining the synchronized media and communication session with the electronic devices associated with the users Frank, Gary, Holly, Ian, and Jessica, device 500 automatically designates the user accounts corresponding to those devices for inclusion in content recommendations (represented by device 500 displaying the representations 640, 642, 698, 687, and 685 corresponding to Frank's, Gary's, Holly's, Ian's, and Jessica's user accounts, respectively, with a gray fill).

Additionally, because device 500 has automatically designated Alice's, Frank's, and Gray's, Harry's, Ian's, and Jessica's user accounts for inclusion in content recommendations, the media user interface 632 includes content recommendations based on these automatically designated user accounts. Specifically, the media user interface 632 includes a representation 663 of Movie W that, when selected, causes device 500 to play Movie W, a representation 661 of Movie X that, when selected, causes device 500 play Movie X, and a representation 659 of Movie Y that, when selected, causes device 500 to play Movie Y, and a representation 657 of TV Show I that, when selected, causes device to play TV Show I. In some embodiments, the media items corresponding to the representations 657-663 are optionally selected for display in the media user interface 632 for the same reasons described previously. Device 500 also updates the indication 634 to include the text "Gritty, Modern" indicating that the content being recommended based on the automatically designated user accounts relate to the categories Gritty and Modern.

In FIG. 6TT, while device 500 is displaying the media user interface 632 and while device 500 is displaying the selectable user interface element 636 with focus, device 500 receives a request to edit the user accounts currently designated for inclusion in content recommendations (indicated by touch contact 601*tt* tapping the touch-sensitive surface 451 while the user interface element 636 is being displayed with focus). In FIG. 6UU, in response to receiving the request to edit the user accounts currently designated for inclusion in content recommendations in FIG. 6TT, device 500 displays user interface 654. User interface 654 includes representations of the user accounts that can be selected or de-selected from inclusion in content recommendations, including a representation 638 of Alice's user account, a representation 640 of Frank's user account, a representation 642 of Gary's user account, and a representation 644 of Harry's user account, a representation 687 of Ian's user account, and a representation 685 of Jessica's user account. As illustrated in FIG. 6UU, device 500 is displaying the representations 638, 640, 642, 644, 685, and 687 with a checkmark indicating that the user accounts corresponding to those representations are currently selected for inclusion in content recommendations that are based on a set of selected or designated user accounts.

In FIG. 6UU, while Ian's user account is currently selected for inclusion in content recommendations (indicated by device 500 displaying the representation 687 of Ian's user account with a checkmark), device 500 detects a request to deselect Ian's user account from inclusion in content recommendations (indicated by touch contact 601*uu* tapping the touch-sensitive surface while the representation 687 of Ian's user account is being displayed with focus). In FIG. 6UU-1, in response to device 500 receiving the request to remove Ian's user account from inclusion in content recommendations, device 500 removes Ian's user account from inclusion in content recommendations that are based on a set of selected or designated user accounts (indicated by device 500 no longer displaying a checkmark at the representation 687 of Ian's user account). In FIG. 6VV, after device 500 removed Ian's user account from inclusion in content recommendations, device 500 receives a request to change the focus in user interface 654 (indicated by touch contact 601*vv* touching the touch-sensitive surface 451). In FIG. 6WW, after detecting the touchdown of touch contact 601*vv* in FIG. 6VV, device 500 receives an indication that touch contact 601*vv* has swiped to the right (indicating by touch contact 601*vv* swiping to the right on the touch-sensitive surface 451). In response to device 500 receiving the indication that touch contact 601*vv* has swiped to the right, device 500 moves the focus from the representation 687 of Ian's user account to the representation 685 of Jessica's user account (indicated by touch contact 610*vv* swiping to the right). In FIG. 6XX, after device 500 moved to the focus to the representation 685 of Jessica's user account, device 500 receives an indication that touch contact 601*vv* has swiped in a downward direction (indicated by the new location of touch contact 601*vv* on the touch-sensitive surface 451). In response to device 500 receiving the indication that touch contact 601*vv* has swiped in a downward direction, device 500 moves the focus from the representation 685 of Jessica's user account to the selectable option 656 (indicated by device 500 displaying the dashed-line box at selectable option 656). In FIG. 6YY, after device 500 moved the focus to the selectable option 656, device 500 detects that touch contact 601*vv* is no longer in contact with the touch-sensitive surface 451 (indicated by the dashed-line touch contact 601*vv*). In response to device 500 detecting that touch contact 601*vv* has lifted off of the touch-sensitive surface 451, device 500 continues to display the focus at user interface element 656 and stops moving the focus in accordance the movement of touch contact 601*vv*.

In FIG. 6ZZ, while Alice's, Frank's, Gary's, Harry's, and Jessica's user accounts are currently designated for inclusion in content recommendations (indicated by device 500 displaying a checkmark at the representations 638, 640, 642, 644, and 685), device 500 detects a selection of selectable option 656 (indicated by touch contact 601*zz* tapping on the touch-sensitive surface 451 while selectable option 656 is being displayed with focus). In FIG. 6AAA, in response to device 500 detecting the selection of selectable option 656 in FIG. 6ZZ while Alice's, Frank's, Gary's, Harry's, and Jessica's user accounts are designated for inclusion in content recommendations, device 500 updates media user interface 632 to include content recommendations based on characteristics of Alice's, Frank's, Gary's, Harry's, and Jessica's user accounts and not based on Ian's user accounts (e.g., the user accounts designated for inclusion, as illustrated in FIG. 6ZZ, and not based on user accounts that have not been designated for inclusion in content recommendations). Specifically, device 500 updates the media user interface 632 to include, in the second respective row of media user interface 632, a representation 683 of TV Show Z that, when selected, causes device 500 to play TV Show Z, a representation 681 of Movie S that, when selected, causes device 500 to play Movie S, a representation 679 of Movie T that, when selected, causes device 500 to play Movie T, and a representation 677 of Movie U that, when selected, causes device 500 to play Movie U. In some embodiments, as described previously, the media items corresponding the representations 677-683 are selected for display in the media user interface 632 because device 500 (or a server in communication with device 500) determines that based on viewing behaviors of Alice's, Frank's, Gary's, Harry's, and Jessica's user accounts (e.g., the user accounts designated for inclusion in content recommendations), the media items corresponding to the representations 677-683 have a high probability (e.g., 80%, 85%, 90%, 95%, etc.) of being liked by the users Alice, Frank, Gary, Harry, and Jessica (e.g., the users corresponding to Alice's, Frank's, Gary's, Harry's, and Jessica's user accounts, respectively).

Additionally, because Ian's user account has been removed from inclusion in content recommendations, device 500 updates the visual appearance of the representation corresponding to Ian's user account (e.g., the representation 687) to indicate that Ian's user account is no longer designated for inclusion in content recommendations. Device 500 also updates the indication 634 to include the text "Drama, Director A" indicating that the content being recommended based on designated user accounts relate to Director A and the category Drama.

In FIG. 6BBB, while device 500 is displaying the representation 683 of TV Show Z with focus (indicated by the dashed-line box), the electronic device 500 receives a request to play TV Show Z (indicated by touch contact 601bbb tapping on the touch-sensitive surface 451 while the representation 683 of TV Show Z is being displayed with focus). In some embodiments, if an electronic device receives a request to play a respective media item while that electronic device is also part of a synchronized media and communication session, the electronic device starts playing the media item corresponding to the selected representation and also starts playing the media item in the synchronized media and communication session. For example, in FIG. 6CCC, in response to device 500 detecting the selection of the representation 683 of TV Show Z in FIG. 6BBB, device 500 starts playing Season 1, Episode 1 of TV Show Z in the media user interface 603, and causes Season 1, Episode 1 of TV Show Z to also start playing in the synchronized media and communication session. In some embodiments, when device 500 starts playing a new media item in the synchronized media and communication session, the other electronic devices that are also part of the synchronized media and communication session receive an indication that the new media item that has started playing in the synchronized media and communication session and optionally start synchronously playing the new media item with the electronic device that added the new media item to the synchronized media and communication session.

In some embodiments, when device 500 starts and/or finishes playing a respective media content recommendation, device 500 updates the viewing history of the user account that initiated playback of the respective media content recommendation (e.g., the user account active at device 500). For example, because Alice's user account was designated for inclusion in content recommendations when device 500 received the selection to play TV Show Z in FIG. 6BBB (indicated by device 500 displaying the representation 638 of Alice's user account with a gray background in FIG. 6BBB), and because Alice's user account was the user account active at device 500 when the input in FIG. 6BBB was detected by device 500, device 500 updates Alice's user account to indicate that Alice has watched Season 1, Episode 1 of TV Show Z.

In some embodiments, an electronic device can display content recommendations based on the viewing history of a respective user account. For example, in FIG. 6DDD, device 500 is displaying a media browsing user interface 634a associated with Alice's user account (e.g., the user account that is currently configured on device 500 and that is currently active/logged in). Media browsing user interface 634a includes a representation 623 of TV Show Z that, when selected, causes device 500 to play Season 1, Episode 2 of TV Show Z, a representation 625 of Movie T that, when selected, causes device 500 to play Movie T, a representation 627 of TV Show U that, when selected, causes device 500b to play Season 1, Episode 1 of TV Show U, and a representation 629 of TV Show B that, when selected, causes device 500b to play Season 1, Episode 5 of TV Show B.

Specifically, in the example of FIG. 6DDD, the representation 623 of Season 1, Episode 2 of TV Show Z is displayed in media browsing user interface 634a because Season 1, Episode 1 of TV Show Z was played in the synchronized media and communication session while Alice's user account was selected for inclusion in content recommendations, and because Alice has not watched the next episode after Season 1, Episode 1 (e.g., has not watched Season 1, Episode 2 of TV Show Z). The media items corresponding to the representations 627 and 629 are optionally selected for similar reasons. In some embodiments, the media item corresponding to the representation 625 is optionally selected for display in media user interface 634, because device 500 (or a server in communication with device 500) determines that Alice has partially watched Movie T (e.g., the media item corresponding to the representation 625).

In some embodiments, if device 500 was part of a synchronized media and communication session when a respective media content recommendation was selected for playback, the viewing histories of the user accounts that were selected or designated for inclusion in content recommendations are updated to reflect the playback of that respective media content recommendation, and the viewing histories of the user accounts that were not selected for inclusion are not updated to reflect the playback of that respective media content recommendation. For example, because Frank's user account was designated for inclusion in content recommendations when device 500 received the selection to play TV Show Z in FIG. 6BBB (indicated by device 500 displaying the representation 640 of Frank's user account with a gray background in FIG. 6BBB), and because device 500 was part of a synchronized media and communication when the request to playback TV Show Z was detected, device 500 initiates a process to update Frank's user account to indicate that Frank has watched Season 1, Episode 1 of TV Show Z. In some embodiments, initiating the process to update Frank's user account to indicate that Frank has watched Season 1, Episode of TV Show Z includes device 500 transmitting an indication to device 500b (e.g., associated with Frank's user account) indicating Frank watched (or is watching) Season 1, Episode 1 of TV Show Z.

As previously mentioned, in some embodiments, an electronic device can display content recommendations based on the viewing history of a respective user account. For example, in FIG. 6EEE, device 500b is displaying a media browsing user interface 634b associated with Frank's user account (e.g., the user account that is currently configured on device 500b and that is currently active/logged in). Media browsing user interface 634*b* includes a representation 631 of TV Show Z that, when selected, causes device 500*b* to play Season 1, Episode 2 of TV Show Z, a representation 633 of Movie A that, when selected, causes device 500*b* to play Movie A, a representation 635 of TV Show P that, when selected, causes device 500*b* to play Season 1, Episode 7 of TV Show P, and a representation 637 of TV Show F that, when selected, causes device 500*b* to play Season 3, Episode 1 of TV Show F.

Specifically, in the example of FIG. 6EEE, the representation 623 of Season 1, Episode 2 of TV Show Z is displayed in media browsing user interface 634*b* because Season 1, Episode 1 of TV Show Z was played in the synchronized media and communication session while Frank's user account was selected for inclusion in content recommendations, and because Frank has not watched the next episode after Season 1, Episode 1 (e.g., has not watched Season 1, Episode 2 of TV Show Z). The media items corresponding to the representations 635 and 637 are optionally selected for similar reasons. In some embodiments, the media item corresponding to the representation 633 is optionally selected for display in media user interface 634, because device 500 (or a server in communication with device 500) determines that Alice has partially watched Movie A (e.g., the media item corresponding to the representation 633).

As previously mentioned, in some embodiments, the viewing histories of users accounts associated with a synchronized media and communication are not updated when those user accounts were not designated for inclusion when a respective media content recommendation is selected for playback. For example, because Ian's user account was not designated for inclusion in content recommendations when device 500 received the selection to play TV Show Z in FIG. 6BBB (indicated by device 500 displaying the representation 687 of Ian's user account with a white background in FIG. 6BBB), device 500 does not initiate a process to update Ian's user account to indicate that Ian has watched Season 1, Episode 1 of TV Show Z. In FIG. 6FFF, as a result of device 500 not updating Ian's user account to indicate that Ian has watched Season 1, Episode 1 of TV Show Z, the media user interface 634*c* (which has similar characteristics to media user interfaces 634*a* and 634*b*) associated with Ian's user account does not include a representation that corresponds to the next episode after Season 1, Episode 1 of TV Show Z.

In some embodiments, when an electronic device is not part of a synchronized media and communication session when a recommended content item is selected for viewing like in FIG. 6BBB, only the user account currently active at device 500 is updated to reflect the viewing of that content item, and other user accounts, even the user accounts that were selected for inclusion in content recommendations, are not updated to reflect viewing of the recommended content item for viewing. In such examples, only the viewing history of the user account that is active at the electronic device when a media content recommendation is selected for playback is updated if device 500 is unable to determine the users that are watching the recommended content item with Alice. Alternatively, in some embodiments, when the electronic device 500 starts playback of a content recommendation, the electronic device 500 initiates a process to detect the users that are watching the recommended content item with Alice, as described in more detail with reference to method 700.

FIG. 7 is a flow diagram illustrating a method of displaying media content recommendations for a set of users in accordance with some embodiments of the disclosure. The method 700 is optionally performed at electronic devices such as device 100, device 300, device 500, such as described above with reference to FIGS. 1A-1B, 2-3, 4A-4B and 5A-5C. Some operations in method 700 are, optionally, combined and/or order of some operations is, optionally, changed.

As described below, the method 700 provides ways in which electronic devices display content recommendations based on a set of selected or designated user accounts. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., 500) in communication with a display generation component (e.g., 514) and one or more input devices (e.g., 510). In some embodiments, the electronic device is a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, while the electronic device (e.g., 500) is associated with a plurality of user accounts, including a first user account (e.g., the electronic device is a multi-user device that is associated with a plurality of user accounts), the electronic device (e.g., 500) displays (702), via the display generation component (e.g., 514), a (e.g., multi-) media browsing user interface (e.g., a user interface that includes media items such as movies, tv shows, live sports, music, podcasts, books, videos, etc.) associated with the first user account, such as the media browsing user interface 632 associated with Alice's user account. In some embodiments, the plurality of user accounts associated with the electronic device are user accounts that have been configured on the electronic device and are accessible by (e.g., saved on) the electronic device. In some embodiments, the user accounts are configured and accessible on the electronic device when one or more users perform a process to create/setup one or more corresponding user accounts on the electronic device.

Additionally, or alternatively, in some embodiments, the electronic device is associated with user accounts that are not stored on the electronic device (e.g., the user accounts are not accessible on the electronic device). For example, the electronic device is optionally associated with user accounts that are part of an active synchronized media and communication session with the first user account. In some embodiments, the plurality of user accounts that is associated with the electronic device include both user accounts that are configured on the electronic device (e.g., user accounts local to the electronic device, user accounts that can be accessed on the electronic device, etc.), and user accounts that are not configured on the electronic device (e.g., user accounts that are not accessible on the electronic device and that are only associated with the electronic device when the first user account joins and/or is part of a synchronized media and communication session that includes those user accounts). In some embodiments, the first user account is the user account currently active on the electronic device, such that the electronic device operates based on the settings, purchases, subscriptions, etc. of the first user account (e.g., the electronic device is able to access content or application purchases for the first user account but not others of the user accounts and/or provides content recommendations based on the first user account but not others of the user accounts). In some embodiments, each of the plurality of user accounts are associated with different users.

In some embodiments, the media browsing user interface includes a user interface element, such as a navigation bar, for navigating to different types of media content (movies, tv shows, sports, search, etc.). For example, the electronic device is displaying the media browsing user interface of the first user account (e.g., the media in the media browsing user interface is displayed based on the settings and/or behavior defined by the first user account). In some embodiments, if the electronic device was switched to a second user account, different from the first user account, the media browsing user interface is displayed based on the settings and/or behavior defined by the first user account. In some embodiments, the media browsing user interface is optionally associated with a (e.g., media) application running on the electronic device. In some embodiments, the media browsing user interface is optionally controlled/navigated by a dedicated remote control of the electronic device or is optionally controlled/ navigated by a multi-function electronic device that can transmit control/navigation commands to the electronic device. In some embodiments, the media browsing user interface includes representations of media content (e.g., movies, episodic content, songs, podcasts, etc.) that are selectable to display a user interface (e.g., product page) dedicated to that selected representation or that are selectable to initiate a process to display (e.g., play) the media content corresponding to the selected representation at the electronic device. In some embodiments, the media browsing user interface optionally displays the one or more representations of media content in different categories/ groups. For example, the media browsing user interface optionally displays representations of media content that are popular/trending, that are new (e.g., recently added) or being featured, that are being recommended to the user of the first user account, that are being recommended to a group of (e.g., selected/designated) users, etc.))

In some embodiments, in accordance with a determination that the first user account satisfies one or more criteria (704) (e.g., if the first user account is among a plurality of user accounts that can be selected/designated for inclusion in content recommendations which are based on the user accounts that have been selected/designated (e.g., and not based on other user accounts that were not selected/designated)), in accordance with a determination that a first subset of user accounts of the plurality of user accounts associated with the electronic device (e.g., 500) has been (e.g., manually and/or automatically) selected for inclusion in content recommendations (e.g., in some embodiments, the first subset of user accounts is optionally selected by a user of the first user account), the electronic device (e.g., 500) displays (706), in the media browsing user interface, one or more representations of media content recommendations (e.g., representations of recommended music, movies, tv content, video, and/or audio content) based on one or more characteristics of the first user account and the first subset of user accounts, such as device 500 displaying content recommendations based on Alice's and Chloe's user account because those user accounts have been designated for inclusion in FIG. 6W. For example, the media browsing user interface optionally includes representations of the plurality of user accounts associated with the electronic device, which can be selected by the user of the first user account (or by the users associated with the plurality of user accounts) via a remote control or a remote-control application running on a second electronic device. In some embodiments, the users corresponding to the first subset of user accounts are at a same physical location as the user of the first user account. In some embodiments, the first subset of user accounts is optionally automatically selected. For example, the first subset is optionally automatically selected if the first user account (e.g., or if the electronic device) is in a synchronized media and communication session with the first subset of user account.

In some such examples, the first subset automatically corresponds to the user accounts that are part of the synchronized media and communication session (e.g., the first user account and the other user accounts that are also part of the synchronized media and communication session). In some embodiments, if the first subset is automatically selected, the first subset is selected without user input. In some embodiments, if the first subset is manually selected, the manual selection of the first subset of user accounts is performed at a user interface different from the media browsing user interface. Alternatively, in some embodiments, the manual selection of the first subset of user accounts is performed at the media browsing user interface. For example, in response to the first subset of user accounts having been selected (e.g., with or without user input), the media browsing user interface includes recommendations that are based on (e.g., viewing) characteristics of the selected user accounts (e.g., the first user account and the first subset of user accounts), and optionally at the exclusion of (e.g., not based on) characteristics of user accounts associated with the electronic device that were not selected/ designated for inclusion.

In some embodiments, media content recommendations are based on characteristics of the first user account and the first subset of user accounts, such as characteristics including viewing behaviors of the respective user accounts, respective user-assigned ratings for one or more (e.g., watched and/or recommended) media content items, viewing history of the respective user accounts, duration of time a viewer watched a respective media content item, etc. In some embodiments, the one or more representations are optionally selectable to begin (e.g., initiate a process) to playback that selected media item or are selectable to display a product page user interface corresponding to that selected media item.

In some embodiments, the first user account can be selected/designated if the first user account has opted-in to being included in content recommendations that are based on the user accounts that have been selected/designated. In some embodiments, the first user account is required to opt-in before content recommendations are generated using the first user account. In some embodiments, the first user account can opt-in when a user of the first user account initiates a process—for the first time (e.g., has not previously opted-in)—to select/designate the user accounts that should be considered when generating content recommendations. For example, if the user of the first user account initiates a process to select/designate user accounts that should be included in content recommendations and if the first user account has not previously opted-in to allowing the first user account to be used for recommending content, a selectable option is optionally displayed which allows the user to opt-in/consent. In some embodiments, the selectable option must be selected before the user of the first user account can select/designate other user accounts.

Additionally, or alternatively, the first user account can opt-in/out of content recommendations that are based on user accounts that have been selected/designated from a (e.g., settings) application running on the electronic device, separate from the media browsing application. In some embodiments, the first user account satisfies the one or more criteria automatically (e.g., without having to explicitly opt-in from a settings application or without having to select a selectable option that is displayed when selecting/designating users for the first time) when the first user account has previously provided consent to allowing the first user account to be utilized for content recommendations, such as when the first user account joins a synchronized media and communication session, when the first user account has previously consented during a previous use, etc.

In some embodiments, in accordance with a determination that the first user account satisfies one or more criteria (704), in accordance with a determination that a second subset of user accounts of the plurality of user accounts associated with the electronic device (e.g., 500), different from the first subset of user accounts, has been (e.g., manually and/or automatically) selected for inclusion in content recommendations (e.g., in some embodiments, the second subset of user accounts is optionally selected by a user of the first user account), the electronic device (e.g., 500) displays (708), in the media browsing user interface, one or more representations of media content recommendations (e.g., representations of recommended music, movies, tv content, video, and/or audio content) based on one or more characteristics of the first user account and the second subset of user accounts, such as device 500 displaying content recommendations based on Alice's, Chloe's, and Dan's user account because those user accounts have been designated for inclusion in FIG. 6II. For example, the media browsing user interface optionally includes representations of the plurality of user accounts associated with the electronic device, which can be selected by the user of the first user account (or by the users associated with the plurality of user accounts) via a remote control or a remote-control application running on a second electronic device. In some embodiments, the users corresponding to the second subset of user accounts are at a same physical location as the user of the first user account. In some embodiments, the second subset of user accounts is optionally automatically selected. For example, the second subset is optionally automatically selected if the first user account (e.g., or the electronic device) is in a synchronized media and communication session with the second subset of user accounts. In some such examples, the second subset automatically corresponds to the user accounts that are part of the synchronized media and communication session (e.g., the first user account and the other user accounts that are also part of the synchronized media and communication session). In some embodiments, if the second subset is automatically selected, the second subset was selected without user input. In some embodiments, if the second subset is manually selected, the manual selection of the second subset of user accounts is performed at a user interface different from the media browsing user interface. Alternatively, in some embodiments, the manual selection of the second subset of user accounts is performed at the media browsing user interface.

For example, in response to the second subset of user accounts having been selected (e.g., with or without user input), the media browsing user interface includes recommendations that are based on (e.g., viewing) characteristics of the selected user accounts (e.g., the first user account and the second subset of user accounts), and optionally at the exclusion of (e.g., not based on) characteristics of user accounts associated with the electronic device that were not selected/designated for inclusion. In some embodiments, media content recommendations are based on characteristics of the first user account and the second subset of user accounts, such as characteristics including viewing behaviors of the respective user accounts, respective user-assigned rating for a respective (e.g., watched and/or recommended) media content item, viewing history of the respective user accounts, duration of time a viewer watched a respective media content item, etc. In some embodiments, the one or more representations are optionally selectable to begin (e.g., initiate a process) to playback that selected media item or are selectable to display a product page user interface corresponding to that selected media item. In some embodiments, content recommended based on the first user account and the first subset of user accounts is different than the content recommended based on the first user account and the second subset of user accounts. In some embodiments, a portion of the content that is recommended based on the first user account and the first subset of user accounts is also recommended based on the first user account and the second subset of user accounts (e.g., because the first subset and second subset have similar characteristics).

The above-described manner of displaying content recommendations based on characteristics of the selected/designated user accounts of accounts associated with the electronic device provides an efficient way of recommending content based on multiple particular user accounts, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the media browsing user interface includes a first region that includes the one or more representations of media content recommendations based on a selected subset of the plurality of user accounts associated with the electronic device (e.g., 500), such as the second respective row in media user interface 632 in FIG. 6II including content recommendations based on the set of user accounts selected or designated for inclusion. For example, the electronic device displays, in a first row of the media browsing user interface, media content recommendations that are based on a set of selected or designated user accounts. In some embodiments, the one or more representation of media content recommendations are not displayed in the first region if the first user account has not opted-in to content recommendations that are based on a set of selected or designated user accounts. In some embodiments, the media content recommendations displayed in the first region are selectable to play, at the electronic device, the media item corresponding to that selected representation. In some embodiments, if the selected subset corresponds to the first subset of user accounts, the first region includes media content recommendations based on the first subset of user accounts. In some embodiments, if the selected subset corresponds to the second subset of user accounts, the first region includes media content recommendations based on the second subset of user accounts.

In some embodiments, the media browsing user interface includes a second region that includes one or more representations of media content recommendations not based on the selected subset of the plurality of user accounts associated with the electronic device (e.g., 500), such as third respective row in media browsing user interface 632 in FIG. 6II including media content recommendations that are recommended because the user Alice watched "Movie A". For example, in addition to the media browsing user interface including representations of media items that are being recommended based on a selected subset of user accounts, the media browsing user interface also includes one or more representations of media content recommendations that are not based on a selected subset of user accounts. In some embodiments, the representations of media content recommendations that are not based on a selected subset of user accounts are displayed in a second region (e.g., second row) of the media user interface while media content recommendations that are based on a set of selected or designated user accounts are displayed in a first region (e.g., a first row). In some embodiments, the media content recommendations displayed in the second region are selectable to play, at the electronic device, the media item corresponding to that selected representation. In some embodiments, the media content recommendations in the second region correspond to recommendations that are based only on the first user account (and not based on any other user account other). For example, content recommendations in the second region are optionally displayed because of activity associated with the first user account (e.g., the first user account watched Movie A).

The above-described manner of displaying content recommendations that are based on a set of selected or designated user accounts in a first region and displaying content recommendation that are not based on a set of selected or designated user accounts in a second region provides an efficient way of indicating content recommendations that are based on a selected set of user accounts and content recommendations that are not based on a selected set of user accounts, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

Accounts that can be considered (e.g., selected/designated) for content recommendations are displayed in an element proximate to the recommended content. In some embodiments, accounts that are considered are reset every session.

In some embodiments, the electronic device (e.g., 500) displays, in the media browsing user interface, a visual indication indicating one or more of the plurality of user accounts associated with the electronic device (e.g., 500) that are capable of being designated for inclusion in content recommendations, such as the selectable user interface element in FIG. 6II. For example, the user accounts that are designatable for inclusion in content recommendations (e.g., that are based on a set of selected or designated user accounts) are indicated in the media browsing user interface. In some embodiments, indicating the user accounts that are designatable for inclusion in content recommendations includes displaying an avatar of each user account that is designatable for inclusion in such content recommendations. In some embodiments, a user account is able to be designated for inclusion in content recommendations if that user account has not explicitly opted-out of content recommendations that are based on a set of selected or designated user accounts. In some embodiments, the visual indication is selectable to initiate a process to designate or select one or more user accounts for inclusion in content recommendations. In some embodiments, the visual indication is displayed in and/or proximate to the region of the media browsing user interface that includes the content recommendations that are based on a set of selected or designated user accounts. In some embodiments, the user accounts that have opted-in to content recommendations that are based on a set of selected or designated user accounts are automatically designated for inclusion in such content recommendations at the beginning of each session of the electronic device. The above-described manner of displaying an indication of the user accounts that are designatable for inclusion in content recommendations that are based on a set of selected or designated user accounts provides an efficient way of indicating the user accounts that are able to be selected or designated for inclusion in content recommendations, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the plurality of user accounts includes a second user account (e.g., the electronic device is associated with a first user account and a second user account) and displaying the visual indication indicating the one or more of the plurality of user accounts includes, in accordance with a determination that the second user account is not capable of being designated for inclusion in content recommendations, displaying the visual indication without including a visual indication of the second user account, such as the representation of Dan's user account not being displayed in FIG. 6MM because Dan's user account was opted out of content recommendations in FIG. 6LL. For example, if the second user account is opted-out of content recommendations that are based on a set of selected or designated user accounts, the visual indication does not include an indication of the second user account. In some embodiments, a setting of the second user account controls whether the second user account is or is not designatable for inclusion in content recommendations. In some embodiments, the second user account can opt-out of content recommendations that are based on a set of selected or designated user account after having previously opted-in. For example, by toggling off such content recommendations in a settings user interface associated with the second user account.

In some embodiments, the electronic device can switch to displaying user interfaces/content associated with the second user account in response to detecting one or more inputs. In some embodiments, the second user account is associated with a user different than a user that is associated with the first user account.

In some embodiments, the plurality of user accounts includes a second user account (e.g., the electronic device is associated with a first user account and a second user account) and displaying the visual indication indicating the one or more of the plurality of user accounts includes, in accordance with a determination that the second user account is capable of being designated for inclusion in content recommendations, displaying the visual indication including the visual indication of the second user account, such as, in FIG. 6A, the representations 638-644 are being displayed because the user accounts corresponding to those representations are designatable for inclusion in content recommendations. For example, if the second user account can be selected or designated for inclusion in content recommendations, the visual indication includes an indication of the second user account. In some embodiments, the second user account is designatable for inclusion in content recommendations because the second user account has opted-in to content recommendations that are based on a set of selected or designated user accounts and/or because the second user account has not opted-out of such content recommendations. In some embodiments, the second user account can opt-in to content recommendations that are based on a set of selected or designated user account after having previously opted-out of such content recommendations. For example, by toggling on content recommendations that are based on a set of selected or designated user accounts in a settings user interface.

The above-described manner of only indicating the user accounts that are designatable for inclusion in content recommendations provides an efficient way of indicating the user accounts available for inclusion in content recommendations, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the plurality of user accounts includes a second user account that is capable of being designated for inclusion in content recommendations, and displaying the visual indication indicating the one or more of the plurality of user accounts includes, in accordance with a determination that the second user account has been selected for inclusion in content recommendations, displaying the visual indication including a visual indication of the second user account displayed with a first visual appearance, such as the representations 638 and 642 in FIG. 6X being displayed with a gray back because the corresponding user accounts have been designated for inclusion. For example, if the second user account has been selected for inclusion in content recommendations, the visual indication indicates the second user account with the first visual appearance. In some embodiments, the first visual indication includes a representation (e.g., avatar, profile image, etc.) of the second user account. In some such embodiments, if the second user account has been designated for inclusion in content recommendations, the representation of the second user account is displayed with the first visual appearance. In some embodiments, displaying the representation of the second user account with the first visual appearance includes displaying the representation of the second user account with a solid-fill (e.g., non-white) background. In some embodiments, other user accounts that have also not been selected for inclusion in content recommendations are displayed with the first visual appearance.

In some embodiments, the second user account is associated with the electronic device because the second user account is configured on the electronic device. In some embodiments, the second user account is associated with the electronic device because a device associated with the second user account is part of a synchronized media and communication session with the electronic device.)

In some embodiments, the plurality of user accounts includes a second user account that is capable of being designated for inclusion in content recommendations, and displaying the visual indication indicating the one or more of the plurality of user accounts includes, in accordance with a determination that the second user account has not been selected for inclusion in content recommendations, displaying the visual indication including the visual indication of the second user account displayed with a second visual appearance, different from the first visual appearance, such as the representations 640 and 644 in FIG. 6X being displayed with a white background because the corresponding user accounts have not been designated for inclusion. For example, if the second user account has not been selected for inclusion in content recommendations, the visual indication indicates the second user account with the second visual appearance. In some embodiments, the second visual indication includes a representation (e.g., avatar, profile image, etc.) of the second user account. In some such embodiments, if the second user account has not been designated for inclusion in content recommendations, the representation of the second user account is displayed with the second visual appearance. In some embodiments, displaying the representation of the second user account with the second visual appearance includes displaying the representation of the second user account with a white/clear background. In some embodiments, other user accounts that have also been selected for inclusion in content recommendations are displayed with the second visual appearance.

The above-described manner of indicating the user accounts that have been selected for inclusion in content recommendations with a first visual appearance and indicating the user account that have not been selected for inclusion in content recommendations with a different visual appearance provides an efficient way of visually indicating which set of user accounts the currently displayed content recommendations are based on, which additionally reduces power usage and improves battery life of the electronic device by enabling the user to use the electronic device more quickly and efficiently.

In some embodiments, while the visual indication indicating the one or more of the plurality of user accounts indicates that the first subset of user accounts of the plurality of user account has been selected for inclusion in content recommendations, and while displaying, in the media browsing user interface, the one or more representations of media content recommendations based on the one or more characteristics of the first user account and the first subset of user accounts, the electronic device (e.g., 500) receives, via the one or more input devices (e.g., 510), a first sequence of one or more inputs directed to the visual indication corresponding to a request to select the second subset, not the first subset, of user accounts of the plurality of user account has been selected for inclusion in content recommendations, such as the inputs in FIG. 6BB-6HH to select Dan's user account for inclusion in content recommendations. For example, while the media user interface includes content recommendations based on the first subset of user accounts, the electronic device receives a request to modify the user accounts currently selected for inclusion in content recommendations. In some embodiments, before the second subset of user accounts can be selected for inclusion, the second subset of user accounts must be opted-in to content recommendations that are based on a set of selected or designated user accounts. In some embodiments, if the one or more inputs for selecting the second subset of user accounts are detected while the second subset of user accounts have not opted-in to content recommendations (e.g., that are based on a set of selected or designated user accounts), the electronic device displays a consent user interface for the second subset of user accounts that includes a selectable option for opting-in those user accounts to content recommendations.

In some embodiments the first sequence of inputs directed to the visual indication includes an input selecting the visual indication (e.g., via a dedicated remote control or a multi-function device in communication with the electronic device). In some embodiments, when the when the visual indication is selected, the electronic device displays a user interface for editing the user accounts currently selected for inclusion in content recommendations that are based on a set of selected or designated user accounts. In some embodiments, the user interface includes representations of the user accounts that are designatable for inclusion in content recommendations, and that are selectable (e.g., toggleable) to select or deselect a corresponding user account from inclusion in content recommendations.

In some embodiments, in response to receiving the first sequence of one or more inputs, the electronic device (e.g., 500) updates the visual indication to indicate that the second subset of user accounts of the plurality of user account has been selected for inclusion in content recommendations, such as, in FIG. 6II, device 500 indicating that Alice's, Chloe's and Dan's user accounts have been selected for inclusion because the representations corresponding to these user accounts are displayed with a gray background. For example, after selecting the second subset of user accounts for inclusion in content recommendations, the visual indication is updated to indicate that the first subset of user accounts and the second subset of user accounts are now selected for inclusion in content recommendations.

In some embodiments, in response to receiving the first sequence of one or more inputs, the electronic device (e.g., 500) updates the media browsing user interface to include the one or more representations of media content recommendations based on the one or more characteristics of the first user account and the second subset of user accounts, such as the media user interface 632 in FIG. 6II including representations 682-688 because the media items corresponding to those representations were recommended based on characteristics of Alice's, Chloe's, and Dan's user account. For example, after selecting additional user accounts for inclusion in content recommendations (e.g., user accounts corresponding to the second subset of user accounts), the media browsing user interface is updated to include media content recommendations based on all of the user accounts selected for inclusion (e.g., the first subset and second subset of user accounts). In some embodiments, the media content recommendations are recommended to the set of selected user accounts because those media items have a high probability of being liked by the users associated with the set of selected or designated user accounts. In some embodiments, the media content recommendations are based on characteristics of the first user account and the second subset of user accounts, such as characteristics including viewing behaviors of the respective user accounts, respective user-assigned rating for a respective (e.g., watched and/or recommended) media content item, viewing history of the respective user accounts, duration of time a viewer watched a respective media content item, etc. In some embodiments, the one or more representations are optionally selectable to begin (e.g., initiate a process) to playback that selected media item or are selectable to display a product page user interface corresponding to that selected media item.

The above-described manner of updating content recommendations when additional user accounts have been selected for inclusion in the content recommendations provides an efficient way of updating the displayed content recommendations in response to a change with the selected or designated user accounts, which additionally reduces power usage and improves battery life of the electronic device by enabling the user to use the electronic device more quickly and efficiently.

In some embodiments, while the visual indication indicating one or more of the plurality of user accounts associated with the electronic device that are capable of being designated for inclusion in content recommendations includes indications of first one or more user accounts, and while the media browsing user interface includes one or more representations of media content recommendations based on one or more characteristics of one or more of the first one or more user accounts, the electronic device (e.g., 500) detects an indication that a status of a respective user account of the plurality of user accounts with respect to inclusion in content recommendations has changed (e.g. the respective user account has changed from being opted-out of content recommendations that are based on a set of selected or designated user accounts to being opted-in to such content recommendations, or has changed from being opted-in to content recommendations that are based on a set of selected or designated user accounts to being opted-out of such content recommendations).

In some embodiments, after detecting the indication that the status of the respective user account with respect to inclusion in content recommendations has changed, the electronic device (e.g., 500) displays, via the display generation component (e.g., 514), the media browsing user interface including, in accordance with a determination that the respective user account is designatable for inclusion in content recommendations (e.g., if the respective user account is now available for inclusion in content recommendations), the visual indication including an indication of the respective user account, such as device 500 displaying the representation 698 of Ethan's user account in FIG. 6PP because Ethan's user account switched from being opted-out of content recommendations to being opted-in to content recommendations. For example, after the respective user account changes from being opted-out of content recommendations that are based on a set of selected or designated user account to being opted-in to such content recommendations, the visual indication includes an indication that respective user account is designatable for inclusion in content recommendations. In some embodiments, the status of the respective user account changes while the media browsing user interface is being displayed by the electronic device. In some embodiments, after the respective user account opts-in to content recommendations that are based on a set of selected or designated user accounts, the visual indication is selectable to select the respective user account for inclusion in content recommendations. In some embodiments, after the respective user account opts-in to content recommendations that are based on a set of selected or designated user accounts, that respective user account is automatically selected for inclusion in content recommendations.

In some embodiments, after detecting the indication that the status of the respective user account with respect to inclusion in content recommendations has changed, the electronic device (e.g., 500) displays, via the display generation component (e.g., 514), the media browsing user interface including one or more representations of media content recommendations based on one or more characteristics of one or more of the first one or more user accounts, including the respective user account. For example, after the respective user account opts-in to content recommendations that are based on a set of selected or designated user accounts, the media content recommendations are updated to be based on the first one or more user accounts (e.g., the user accounts that were previously selected for inclusion in content recommendations) and the new user account that has recently opted-in to content recommendations (the respective user account).

In some embodiments, after detecting the indication that the status of the respective user account with respect to inclusion in content recommendations has changed, the electronic device (e.g., 500) displays, via the display generation component (e.g., 514), the media browsing user interface including, in accordance with a determination that the respective user account is not designatable for inclusion in content recommendations (e.g., if the respective user account is no available for inclusion in content recommendations), the visual indication not including the indication of the respective user account, such as device 500 not displaying the representation 644 of Dan's user account in FIG. 6MM because Dan's user account switched from being opted-in to content recommendations to being opted-out of content recommendations. For example, after the respective user account changes from being opted-in to content recommendations that are based on a set of selected/designated user accounts to being opted-out of such content recommendations, the visual indication no longer indicates that the respective user account is available to be designated for inclusion in content recommendations.

In some embodiments, after detecting the indication that the status of the respective user account with respect to inclusion in content recommendations has changed, the electronic device (e.g., 500) displays, via the display generation component (e.g., 514), the media browsing user interface including, in accordance with a determination that the respective user account is not designatable for inclusion in content recommendations (e.g., if the respective user account is no available for inclusion in content recommendations), one or more representations of media content recommendations based on one or more characteristics of one or more of the first one or more user accounts, not including the respective user account. For example, after the respective user account opts-out of content recommendations that are based on a set of selected or designated user accounts, the content recommendations displayed in the media user interface are no longer based on the respective user account and only based on the user accounts that have been selected for inclusion in such content recommendations. In some embodiments, the media user interface includes a (e.g., graphical and/or textual) indication of the categories of content being recommended for the one or more first user accounts without explicitly indicating the profiles of the users that caused a particular media item to be recommended.

The above-described manner of updating the media browsing user interface in accordance with a change in status of a respective user account provides an efficient way of updating the media content recommendations in real-time as user accounts opt-in and opt-out of content recommendations that are based on a set of selected or designated user accounts, which additionally reduces power usage and improves battery life of the electronic device by enabling the user to use the electronic device more quickly and efficiently.

In some embodiments, (e.g., while the first user account is the user account currently active at the electronic device and) while not displaying the media browsing user interface (e.g., the electronic device is displaying a home screen user interface, a user interface for a respective media item, etc.), the electronic device (e.g., 500) receives, via the one or more input devices (e.g., 510), a first input corresponding to a request to display the media browsing user interface.

In some embodiments, in response to receiving the first input, the electronic device (e.g., 500) displays, via the display generation component (e.g., 514), the media browsing user interface, wherein the media browsing user interface includes, in accordance with a determination that at least one user account of the plurality of user accounts is designatable for inclusion in content recommendations, one or more representations of media content recommendations based on one or more characteristics of the at least one user account of the plurality of user accounts. For example, if at least one user account is selected for inclusion in content recommendations, the media user interface includes content recommendations based on the user accounts that have been selected for inclusion in content recommendations (e.g., and optionally at the exclusion of (e.g., not based on) characteristics of user accounts that are not available to be selected/designated for inclusion in content recommendations). In some embodiments, the one or more representations of media content recommendations are optionally selectable to begin (e.g., initiate a process) to playback that selected media item or are selectable to display a product page user interface corresponding to that selected media item.

In some embodiments, in response to receiving the first input, the electronic device (e.g., 500) displays, via the display generation component (e.g., 514), the media browsing user interface, wherein the media browsing user interface includes, in accordance with a determination that at least one user account of the plurality of user accounts is not designatable for inclusion in content recommendations, one or more representations of media content recommendations that are not based on one or more characteristics of one or more of the plurality of user accounts, without including the one or more representations of media content recommendations based on the one or more characteristics of the at least one user account of the plurality of user accounts, such as the content recommendations in FIG. 6A corresponding to generic recommendations because no user accounts have been designated for inclusion. For example, if no user accounts are available for inclusion in content recommendations that are based on a set of selected or designated user accounts, the media user interface includes content recommendations that are not specific to any selected/designated user accounts (e.g., displays media content that is trending, media content that is recommended based on only the viewing profile of the first user account, etc.). In some embodiments, the electronic device automatically designates user accounts for inclusion in content recommendations. For example, in some embodiments, when the electronic device wakes from a low power mode (e.g., sleep mode), the electronic device automatically designates for inclusion the user accounts that have previously opted-in to content recommendations that are based on a set of selected or designated user accounts (e.g., and does not automatically designate for inclusion in content recommendations the user accounts that have not previously opted-in to such content recommendations). The above-described manner of displaying media content recommendations that are based on a set of selected or designated user accounts if at least one user account has been selected or designated and not displaying such content recommendations if no user accounts have been selected or designated provides an efficient way of only displaying such content recommendations when at least one user account is available for inclusion in content recommendations that are based on a set of selected or designated user accounts, which additionally reduces power usage and improves battery life of the electronic device by enabling the user to use the electronic device more quickly and efficiently.

In some embodiments, the one or more criteria include a criterion that is satisfied if the first user account is designatable for inclusion in content recommendations, and not satisfied if the first user account is not designatable for inclusion in content recommendations. In some embodiments, the first user account can be selected/designated for inclusion if the first user account has opted-in to being included in content recommendations that are based on a set of selected or designated user accounts. In some embodiments, the first user account is not designatable for inclusion in content recommendations if the first user account has opted-out of content recommendations that are based on a set of selected or designated user accounts. In some embodiments, the first user account can opt-in/out of content recommendations that are based on a set of selected designated user accounts from a (e.g., settings) user interface, separate from the media browsing user interface.

In some embodiments, in accordance with a determination that the first user account does not satisfy the one or more criteria, the media browsing user interface does not include one or more representations of media content recommendations that are based on one or more characteristics of one or more of the plurality of user accounts, such as, in FIG. 6H, the media user interface 632 does not include media content recommendations based on a set of selected or designated user accounts because Alice's user account is opted-out of such content recommendations. For example, if the first user account is opted-out of content recommendations that are based on a set of selected or designated user accounts, the media browsing user interface associated with the first user account does not include any content recommendations that are based on a set of selected or designated user accounts. In some embodiments, other user accounts at the electronic devices that are opted-in to content recommendations that are based on a set of selected or designated user accounts can display such content recommendations while the first user account has opted-out of such content recommendations. In some embodiments, if the media browsing user interface does not include content recommendations based on a set of selected or designated user accounts, the media browsing user interface displays other categories of media content (e.g., popular media content, trending media content, etc.) or displays other content recommendations that are based only on the first user account (and not based on a group of user accounts that have been explicitly selected (e.g., by a user) for inclusion in content recommendations). In some embodiments, user accounts that were selected or designated for inclusion in content recommendations are no longer selected after the device enters a sleep mode. For example, the next time the media browsing user interface is displayed by the electronic, content recommendations are based on all user accounts that have previously opted-in to content recommendations that are based on a set of selected or designated user accounts.

The above-described manner of forgoing displaying content recommendations that are based on a set of selected or designated user accounts when the first user account has not opted-in to content recommendations provides an efficient way only of displaying content recommendations when the user account associated with the media browsing user interface (e.g., the first user account) has opted-in to such content recommendations, which additionally reduces power usage and improves battery life of the electronic device by enabling the user to use the electronic device more quickly and efficiently.

In some embodiments, the one or more criteria include a criterion that is satisfied if an additional user account other than the first user account is designatable for inclusion in content recommendations, and not satisfied if an additional user account other than the first user account is not designatable for inclusion in content recommendations. For example, the media user interface includes content recommendations that are based on a selected set of user accounts if the user account associated with the media user interface (e.g., the first user account) and at least one additional user account is designatable for inclusion in content recommendation. In some embodiments, the first user account and the additional user account are designatable for inclusion in content recommendations if those user accounts have not opted-out of content recommendations that are based on a set of selected or designated user accounts. In some embodiments, if the first user account and/or least one additional user account has not opted-in to content recommendations that are based on a selected set of user accounts, the media user interface does not included media content recommendations that are based on a set of selected user accounts.

The above-described criteria which is satisfied when the first user account and an additional user account is designatable for content recommendations provides an efficient way of only of displaying content recommendations for a set of selected/, which additionally reduces power usage and improves battery life of the electronic device by enabling the user to use the electronic device more quickly and efficiently.

In some embodiments, the one or more representations of media content recommendations based on the one or more characteristics of the first user account and the first subset of user accounts include, in accordance with a determination that the first subset of user accounts is associated with a first set of content restrictions, first representations of first media content recommendations based on the first set of content restrictions, such as the content recommendations recommended in FIG. 6JJ because Dan's user account corresponds to a "child" user account. For example, media content is recommended in accordance with the content restrictions of the first subset of user accounts. In some embodiments, the first set of content restrictions is based on the type of user accounts included in the first subset. For example, in some embodiments, the first subset of user accounts correspond to only "regular" user accounts, which are optionally a type of user account that has access to any rating of media content such as media content that is rated G (General Audiences), PG (Parental Guidance Suggested), PG-13 (Parents Strongly Cautioned), R (Restricted), etc. Thus, in some embodiments, if the first subset of user accounts corresponds to only "regular" user accounts, the first media content recommendations are based on the content restrictions defined for "regular" user accounts.

In some embodiments, the one or more representations of media content recommendations based on the one or more characteristics of the first user account and the first subset of user accounts include, in accordance with a determination that the first subset of user accounts is associated with a second set of content restrictions, different from the first set of content restrictions, second representations of second media content recommendations, without including the first representations of first media content recommendations, based on the second set of content restrictions, such as the content recommendations recommended in FIG. 6II because Dan's user account does not correspond to a "child" user account. For example, media content is recommended in accordance with the content restrictions of the second subset of user accounts. In some embodiments, the second set of content restrictions is based on the type of user accounts included in the first subset. For example, in some embodiments, the first subset of user accounts can include "regular" user accounts and "child" user accounts. As mentioned above, in some embodiments, "regular" user accounts are type of user accounts that have access to any type of media content such as media content that is rated G (General Audiences), PG (Parental Guidance Suggested), PG-13 (Parents Strongly Cautioned), R (Restricted), etc. In contrast, a "child" user account is optionally a type of user account that has access to media content up to a certain content/maturity rating (e.g., media content items that are rated up to PG-13). If the second subset of user accounts includes "regular" user accounts and "child" user accounts, the second media content recommendations are based on the content restrictions defined by the "child" user accounts (and the "regular" user accounts) in the first subset (e.g., because the child user accounts have the most and/or more restrictive restrictions with respect to accessing media content). Thus, in some embodiments, if the first subset of user accounts include a "child" user account, a different set of content recommendations are recommended in contrast to when the first subset of user accounts do not include a "child" user account.

The above-described manner of recommending content based on the content restrictions of user accounts included in the first subset of user accounts provides an efficient way of only recommending content that is appropriate for the selected or designated user accounts, which additionally reduces power usage and improves battery life of the electronic device by enabling the user to use the electronic device more quickly and efficiently.

In some embodiments, a respective user account is associated with a plurality of electronic devices. In some embodiments, the respective user account can optionally opt-out of content recommendations that are based on a set of selected or designated users at one or more respective electronic devices and opt-in to content recommendations that are based on a set of selected or designated users at one or more second respective electronic devices.

In some embodiments, in accordance with a determination that the electronic device (e.g., 500) is part of a synchronized media and communication session with one or more second electronic devices (e.g., the electronic device is currently part of a session which optionally allows media content to be synchronously played (e.g., streamed) at the electronic device and the one or more second electronic devices), the plurality of user accounts includes one or more user accounts associated with the one or more second electronic devices, and does not include user accounts, other than the first user account, not associated with the one or more second electronic devices, such as, in FIG. 6SS, the user accounts indicated are only the user accounts included in the synchronized media and communication session and the user account currently active at device 500. For example, when the device is part of a synchronized media and communication session, the user accounts that are available for inclusion in content recommendations correspond to the user accounts that are associated with the devices in the synchronized media and communication session (e.g., the user accounts associated with the electronic device and the one or more second electronic devices). In some embodiments, the user accounts associated with the synchronized media and communication session (e.g., the user accounts associated with the one or more second electronic devices and the first user account), are automatically designated for inclusion in content recommendations. In some embodiments, some of the user accounts that were automatically designated for inclusion in content recommendations are able to be de-designated (or deselected) by modifying the user accounts currently designated for inclusion in content recommendations. Additionally, the electronic device is optionally part of a session which allows users of the electronic device and the one or more second electronic devices to collaborate/communicate (e.g., talk, text, chat, message) with each other.

The above-described manner of associating the electronic device with the user accounts of the devices in the synchronized media and communication session provides an efficient way of displaying content recommendations based on the user accounts in the synchronized media and communication session, which additionally reduces power usage and improves battery life of the electronic device by enabling the user to use the electronic device more quickly and efficiently.

In some embodiments, in accordance with a determination that the electronic device (e.g., 500) is part of a synchronized media and communication session with one or more second electronic devices (e.g., the electronic device is currently part of a session which optionally allows media content to be synchronously played (e.g., streamed) at the electronic device and the one or more second electronic devices. Additionally, the electronic device is optionally part of a session which allows users of the electronic device and the one or more second electronic devices to collaborate/communication (e.g., talk, text, chat, message) with each other), the plurality of user accounts includes one or more user accounts associated with the one or more second electronic devices, and includes a plurality of user accounts configured on the electronic device, such as, if, in FIG. 6SS, the user accounts indicated in user interface element 636 are the user accounts included in the synchronized media and communication session and the user account currently configured on device 500.

For example, when the electronic device is part of a synchronized media and communication session, the user accounts that are available for inclusion in content recommendations correspond to the plurality users that are configured on the electronic device and the user accounts that are associated with the devices in the synchronized media and communication session. In some embodiments, the user accounts associated with the synchronized media and communication session are automatically designated for inclusion in content recommendations while the user accounts configured on the electronic device are not automatically designated for inclusion in content recommendations. In some embodiments, some of the user accounts that were automatically designated for inclusion in content recommendations can be de-designated (or deselected) by modifying the user accounts currently designated for inclusion in content recommendations. The above-described manner of associating the electronic device with user accounts configured on the electronic device and user accounts of the devices in the synchronized media and communication session provides an efficient way of displaying content recommendations based on the user accounts in the synchronized media and communication session the user accounts configured on the electronic device, which additionally reduces power usage and improves battery life of the electronic device by enabling the user to use the electronic device more quickly and efficiently.

In some embodiments, in accordance with a determination that the electronic device (e.g., 500) is not part of a synchronized media and communication session (e.g., the electronic device is not part of a session which synchronizes playback of media content with one or more second electronic devices), the plurality of user accounts includes one or more user accounts configured on the electronic device (e.g., 500), including the first user account, such as the user accounts in FIG. 6RR being indicated because those user accounts are configured on the device 500. For example, while the electronic device is not in a synchronized media and communication session, the user accounts that can be selected or designated for inclusion in content recommendations that are based on a set of selected or designated user accounts include the user accounts that are configured on the electronic device.

In some embodiments, in accordance with a determination that the electronic device (e.g., 500) is part of the synchronized media and communication session with one or more second electronic devices (e.g., the electronic device is currently part of a session which optionally allows media content to be synchronously played (e.g., streamed) at the electronic device and the one or more second electronic devices), the plurality of user accounts includes one or more user accounts associated with the one or more second electronic devices, such as the user accounts in FIG. 6SS being indicated because those user accounts are associated with a synchronized media and communication session. For example, when the device is part of a synchronized media and communication session, the user accounts that are available for inclusion in content recommendations correspond to the user accounts that are associated with the devices in the synchronized media and communication session (e.g., the user accounts associated with the electronic device and the one or more second electronic devices). In some embodiments, the user accounts associated with the synchronized media and communication session (e.g., the user accounts associated with the one or more second electronic devices and the first user account), are automatically designated for inclusion in content recommendations. In some embodiments, some of the user accounts that were automatically designated for inclusion in content recommendations are able to be de-designated (or deselected) by modifying the user accounts currently designated for inclusion in content recommendations. Additionally, the electronic device is optionally part of a session which allows users of the electronic device and the one or more second electronic devices to collaborate/communicate (e.g., talk, text, chat, message) with each other.

The above-described manner of associating the electronic device with user accounts configured on the electronic device and user accounts of the devices in the synchronized media and communication session when the electronic device is in a synchronized media and communication session and associating the electronic device with the user accounts configured on the electronic device when the electronic device is not part of a synchronized media and communication session provides an efficient way of displaying content recommendations based the user accounts currently associated with the electronic device, which additionally reduces power usage and improves battery life of the electronic device by enabling the user to use the electronic device more quickly and efficiently.

In some embodiments, while the first subset of user accounts of the plurality of user accounts associated with the electronic device (e.g., 500) has been selected for inclusion (e.g., in content recommendations that are based on a set of selected or designated user accounts), the electronic device (e.g., 500) receives, via the one or more input devices (e.g., 510), a first input corresponding to a request to initiate playback of a first media content recommendation of the media content recommendations based on the one or more characteristics of the first user account and the first subset of user accounts. In some embodiments, in response to receiving the first input, the electronic device (e.g., 500) initiates playback of the first media content recommendation, such as device 500 playing Season 1, Episode 1 of TV Show Z in response to the input in FIG. 6BBB.

In some embodiments, after receiving the first input, in accordance with a determination that the electronic device (e.g., 500) was part of a synchronized media and communication session with one or more second electronic devices when the first input was received, the electronic device (e.g., 500) initiates a process to update viewing histories of the first subset of user accounts, including the first user account, to reflect consumption of the first media content recommendation, such as, in FIG. 6EEE, device 500 recommending the next episode following Season 1, Episode 1 of TV Show Z. For example, because the electronic device and the one or more second electronic devices are part of a synchronized media and communication session, the electronic device and the one or more second electronic devices synchronously play the first media content recommendations. As a result of the first media content recommendation being played at the electronic device and the one or more second electronic devices, the viewing histories of the first user account and the first subset of user accounts (e.g., the user accounts associated with the electronic device and the one or more second electronic devices) are updated to indicate (e.g., reflect) consumption of the first media content recommendation. In some embodiments, an electronic device utilizes the view history of one or more respective accounts to display media content recommendations (e.g., recommendations based on a group of selected/designated user accounts and content recommendations that are based on only on the respective user account associated with the electronic device. In some embodiments, a respective electronic device (e.g., the electronic device or a second electronic device) display, in a user interface, suggested media items are selected for display in the respective user interface based on user actions associated with the suggested media items (e.g., the user corresponding to a respective user account). For example, the user may have partially watched some media items to cause them to be included in the suggested media items, the user may have favorited some media items to cause them to be included in the suggested media items, the user may have watched previous episodes in a TV series such that the current/next episode is included in the suggested media items, etc. In some embodiments, the electronic device removes a media item from the suggested media items when it determines that the media item no longer should be suggested for viewing to the user. For example, the user has completely watched the media item, the media item is no longer available (e.g., the rental has expired), etc. In some embodiments, the suggested media items are different displayed at one electronic device are different than the suggested media items displayed at a second electronic device (e.g., because the viewing histories of the user accounts associated with the respective electronic device are different).

In some embodiments, after receiving the first input, in accordance with a determination that the electronic device was not part of the synchronized media and communication session when the first input was received, the electronic device (e.g., 500) initiates a process to update viewing histories of one or more user accounts, of the first subset of user accounts, that are associated with one or more users determined by the electronic device to have been watching the first media content recommendation to reflect consumption of the first media content recommendation, such as only updating the user accounts for the users that device 500 determined watched Season 1, Episode 1 of TV Show Z in FIG. 6CCC. Alternatively, in some embodiments, if the electronic device was not part of a synchronized media and communication session, only the viewing history of the user account currently active at the electronic device that is playing the first media content recommendation is updated (e.g., the viewing histories of other user accounts that were selected for inclusion in content recommendations are not updated because those user accounts were not active at the electronic device while the first media content recommendation was playing at the electronic device). In some embodiments, the electronic device determines the user accounts that watched the first media content recommendation and updates the viewing histories of those user accounts in a similar manner as described above. For example, the electronic device receives an indication that one or more second electronic devices associated with one or more second electronic devices are within a threshold distance (e.g., 50, 100, 200, 500 feet) of the electronic device while the electronic device is playing the first media content recommendation. In response, the viewing histories associated with the one or more second electronic devices are updated to reflect consumption of the first media content recommendation. In some embodiment, the electronic device detects, via a camera, the users that are currently watching the first media content recommendation. In response, the user accounts associated with detected users are updated to reflect consumption of the first media content recommendation.

The above-described manner of updating the viewing histories of all users that are part of a synchronized media and communication session and updating the viewing history of only the detected users when the electronic device is not part of a synchronized media and communication session provides an efficient way for updating the viewing history of one or more user accounts that watched a respective media item, which additionally reduces power usage and improves battery life of the electronic device by enabling the user to use the electronic device more quickly and efficiently.

In some embodiments, the electronic device automatically selects or designates (e.g., pre-selects, pre-designates) the user accounts that are selected or designated in content commendations (e.g., that are based on a set of selected or designated user accounts). For example, the electronic device detects, via a camera, the users that are at a same location as the electronic device (e.g., within 10, 15, 25, 50 feet from the electronic device), and automatically designates the user accounts associated with the detected users for inclusion in content recommendations. In some embodiments, the electronic device detects that one or more user devices are within a threshold distance of the electronic device (e.g., 30, 60, 90, 200 feet) and automatically designates the user accounts associated with these electronic devices for inclusion in content recommendations that are based on a set of selected or designated user accounts. In some embodiments, the above described presence determinations are additionally, or alternatively, used for updating the viewing histories for the users that were detected by the electronic device. For example, in some embodiments, a first user account, a second user account, and a third user account are currently selected or designated for inclusion in content recommendations, but only the viewing history of the first user account and the second user account (and not the third user account) are updated after initiating playback of a media content recommendation because the users corresponding to the first user account and the second user account were detected, via a camera (or other detection techniques), while the electronic device was playing a respective media content recommendation.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. The operations in the information processing methods described above are, optionally, implemented by running one or more functional modules in an information processing apparatus such as general purpose processors (e.g., a as described with respect to FIGS. 1A-1B, 3, 5A-5C) or application specific chips. Further, the operations described above with reference to FIG. 7 are, optionally, implemented by components depicted in FIGS. 1A-1B. For example, displaying operations 702, 706, and 708 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology includes displaying content recommendations based on a set of selected or designated user accounts. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, license plate numbers, or any other personal information.

The present disclosure recognizes that the use of such personal information data, in the present technology, can be used to the benefit of users. For example, the personal information data can be for providing media content recommendations. Accordingly, use of such personal information data enables users to have move personalized content recommendations. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to opt-in to content recommendations that are based on a set of selected and/or designated user accounts. In yet another example, users can select to limit the use of one or more characteristics of the user account when included in content recommendations based on a group of selected or designated user accounts. In addition to providing "opt in" and "opt out" options, the present disclosure contemplates providing notifications relating to the access or use of personal information. For instance, a user may be notified upon being selected for inclusion in content recommendations that are based on a set of selected or designated user accounts.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting characteristics of user accounts at a group level, rather than an individual level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can still browse media items in a media browsing user interface that are not based on content recommendations for a selected group of user accounts.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users, such as by anonymizing personally identifiable information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
while the electronic device is associated with a plurality of user accounts, including a first user account, displaying, via the display generation component, a media browsing user interface associated with the first user account, including displaying, in the media browsing user interface, a visual indication indicating one or more of the plurality of user accounts associated with the electronic device that are capable of being designated for inclusion in content recommendations, including:
in accordance with a determination that the electronic device is part of a synchronized media and communication session with one or more second electronic devices, displaying the visual indication including respective one or more visual indications of one or more user accounts associated with the one or more second electronic devices; and
in accordance with a determination that the electronic device is not part of the synchronized media and communication session with the one or more second electronic devices, displaying the visual indication without including the respective one or more visual indications of the one or more user accounts associated with the one or more second electronic devices; and
in accordance with a determination that the first user account satisfies one or more criteria:
in accordance with a determination that a first subset of user accounts included in the visual indication has been selected for inclusion in content recommendations, displaying, in the media browsing user interface, one or more representations of media content recommendations based on one or more characteristics of the first user account and the first subset of user accounts; and in accordance with a determination that a second subset of user accounts included in the visual indication, different from the first subset of user accounts, has been selected for inclusion in content recommendations, displaying, in the media browsing user interface, one or more representations of media content recommendations based on one or more characteristics of the first user account and the second subset of user accounts.

2. The method of claim 1, wherein the media browsing user interface includes:
a first region that includes the one or more representations of media content recommendations based on a selected subset of the plurality of user accounts associated with the electronic device, and
a second region that includes one or more representations of media content recommendations not based on the selected subset of the plurality of user accounts associated with the electronic device.

3. The method of claim 1, wherein the plurality of user accounts includes a second user account, and displaying the visual indication indicating the one or more of the plurality of user accounts includes:
in accordance with a determination that the second user account is not capable of being designated for inclusion in content recommendations, displaying the visual indication without including a visual indication of the second user account; and
in accordance with a determination that the second user account is capable of being designated for inclusion in content recommendations, displaying the visual indication including the visual indication of the second user account.

4. The method of claim 1, wherein the plurality of user accounts includes a second user account that is capable of being designated for inclusion in content recommendations, and displaying the visual indication indicating the one or more of the plurality of user accounts includes:
in accordance with a determination that the second user account has been selected for inclusion in content recommendations, displaying the visual indication including a visual indication of the second user account displayed with a first visual appearance; and
in accordance with a determination that the second user account has not been selected for inclusion in content recommendations, displaying the visual indication including the visual indication of the second user account displayed with a second visual appearance, different from the first visual appearance.

5. The method of claim 1, further comprising:
while the visual indication indicating the one or more of the plurality of user accounts indicates that the first subset of user accounts has been selected for inclusion in content recommendations, and while displaying, in the media browsing user interface, the one or more representations of media content recommendations based on the one or more characteristics of the first user account and the first subset of user accounts, receiving, via the one or more input devices, a first sequence of one or more inputs directed to the visual indication corresponding to a request to select the second subset, not the first subset, of user accounts; and
in response to receiving the first sequence of one or more inputs:
updating the visual indication to indicate that the second subset of user accounts has been selected for inclusion in content recommendations; and
updating the media browsing user interface to include the one or more representations of media content recommendations based on the one or more characteristics of the first user account and the second subset of user accounts.

6. The method of claim 1, further comprising:
while the visual indication indicating one or more of the plurality of user accounts associated with the electronic device that are capable of being designated for inclusion in content recommendations includes indications of first one or more user accounts, and while the media browsing user interface includes one or more representations of media content recommendations based on one or more characteristics of one or more of the first one or more user accounts, detecting an indication that a status of a respective user account of the plurality of user accounts with respect to inclusion in content recommendations has changed; and
after detecting the indication that the status of the respective user account with respect to inclusion in content recommendations has changed, displaying, via the display generation component, the media browsing user interface including:
in accordance with a determination that the respective user account is designatable for inclusion in content recommendations:
the visual indication including an indication of the respective user account; and
one or more representations of media content recommendations based on one or more characteristics of one or more of the first one or more user accounts, including the respective user account; and
in accordance with a determination that the respective user account is not designatable for inclusion in content recommendations:
the visual indication not including the indication of the respective user account; and
one or more representations of media content recommendations based on one or more characteristics of one or more of the first one or more user accounts, not including the respective user account.

7. The method of claim 1, wherein the one or more criteria include a criterion that is satisfied if the first user account is capable of being designated for inclusion in content recommendations, and not satisfied if the first user account is not capable of being designated for inclusion in content recommendations, the method further comprising:
in accordance with a determination that the first user account does not satisfy the one or more criteria, the media browsing user interface does not include one or more representations of media content recommendations that are based on one or more characteristics of one or more of the plurality of user accounts.

8. The method of claim 7, wherein the one or more criteria include a criterion that is satisfied if an additional user account other than the first user account is capable of being designated for inclusion in content recommendations, and not satisfied if an additional user account other than the first user account is not capable of being designated for inclusion in content recommendations.

9. The method of claim 1, wherein the one or more representations of media content recommendations based on the one or more characteristics of the first user account and the first subset of user accounts include:

in accordance with a determination that the first subset of user accounts is associated with a first set of content restrictions, first representations of first media content recommendations based on the first set of content restrictions; and in accordance with a determination that the first subset of user accounts is associated with a second set of content restrictions, different from the first set of content restrictions, second representations of second media content recommendations, without including the first representations of first media content recommendations, based on the second set of content restrictions.

10. The method of claim 1, wherein:

in accordance with a determination that the electronic device is part of the synchronized media and communication session with the one or more second electronic devices, the visual indication includes the one or more user accounts associated with the one or more second electronic devices, and includes a plurality of user accounts configured on the electronic device.

11. The method of claim 1, wherein:

in accordance with a determination that the electronic device is not part of the synchronized media and communication session, the plurality of user accounts includes one or more user accounts configured on the electronic device, including the first user account, and in accordance with a determination that the electronic device is part of the synchronized media and communication session with the one or more second electronic devices, the plurality of user accounts includes one or more user accounts associated with the one or more second electronic devices.

12. The method of claim 1, further comprising:

while the first subset of user accounts has been selected for inclusion, receiving, via the one or more input devices, a first input corresponding to a request to initiate playback of a first media content recommendation of the media content recommendations based on the one or more characteristics of the first user account and the first subset of user accounts;

in response to receiving the first input, initiating playback of the first media content recommendation; and after receiving the first input:

in accordance with a determination that the electronic device was part of the synchronized media and communication session with the one or more second electronic devices when the first input was received, initiating a process to update viewing histories of the first subset of user accounts, including the first user account, to reflect consumption of the first media content recommendation; and in accordance with a determination that the electronic device was not part of the synchronized media and communication session when the first input was received, initiating a process to update viewing histories of one or more user accounts, of the first subset of user accounts, that are associated with one or more users determined by the electronic device to have been watching the first media content recommendation to reflect consumption of the first media content recommendation.

13. An electronic device, comprising:

one or more processors;

memory; and one or more programs, wherein the one or more programs are stored in the memory and configured to be executed by the one or more processors, the one or more programs including instructions for:

while the electronic device is associated with a plurality of user accounts, including a first user account, displaying, via a display generation component, a media browsing user interface associated with the first user account, including displaying, in the media browsing user interface, a visual indication indicating one or more of the plurality of user accounts associated with the electronic device that are capable of being designated for inclusion in content recommendations, including:

in accordance with a determination that the electronic device is part of a synchronized media and communication session with one or more second electronic devices, displaying the visual indication including respective one or more visual indications of one or more user accounts associated with the one or more second electronic devices; and in accordance with a determination that the electronic device is not part of the synchronized media and communication session with the one or more second electronic devices, displaying the visual indication without including the respective one or more visual indications of the one or more user accounts associated with the one or more second electronic devices; and in accordance with a determination that the first user account satisfies one or more criteria:

in accordance with a determination that a first subset of user accounts included in the visual indication has been selected for inclusion in content recommendations, displaying, in the media browsing user interface, one or more representations of media content recommendations based on one or more characteristics of the first user account and the first subset of user accounts; and in accordance with a determination that a second subset of user accounts included in the visual indication, different from the first subset of user accounts, has been selected for inclusion in content recommendations, displaying, in the media browsing user interface, one or more representations of media content recommendations based on one or more characteristics of the first user account and the second subset of user accounts.

14. The electronic device of claim 13, wherein the media browsing user interface includes:

a first region that includes the one or more representations of media content recommendations based on a selected subset of the plurality of user accounts associated with the electronic device, and a second region that includes one or more representations of media content recommendations not based on the selected subset of the plurality of user accounts associated with the electronic device.

15. The electronic device of claim 13, wherein the plurality of user accounts includes a second user account, and displaying the visual indication indicating the one or more of the plurality of user accounts includes:

in accordance with a determination that the second user account is not capable of being designated for inclusion in content recommendations, displaying the visual indication without including a visual indication of the second user account; and in accordance with a determination that the second user account is capable of being designated for inclusion in content recommendations, displaying the visual indication including the visual indication of the second user account.

16. The electronic device of claim 13, wherein the plurality of user accounts includes a second user account that is capable of being designated for inclusion in content recommendations, and displaying the visual indication indicating the one or more of the plurality of user accounts includes:
in accordance with a determination that the second user account has been selected for inclusion in content recommendations, displaying the visual indication including a visual indication of the second user account displayed with a first visual appearance; and
in accordance with a determination that the second user account has not been selected for inclusion in content recommendations, displaying the visual indication including the visual indication of the second user account displayed with a second visual appearance, different from the first visual appearance.

17. The electronic device of claim 13, the one or more programs further including instructions for:
while the visual indication indicating the one or more of the plurality of user accounts indicates that the first subset of user accounts has been selected for inclusion in content recommendations, and while displaying, in the media browsing user interface, the one or more representations of media content recommendations based on the one or more characteristics of the first user account and the first subset of user accounts, receiving, via one or more input devices, a first sequence of one or more inputs directed to the visual indication corresponding to a request to select the second subset, not the first subset, of user accounts; and
in response to receiving the first sequence of one or more inputs:
updating the visual indication to indicate that the second subset of user accounts has been selected for inclusion in content recommendations; and updating the media browsing user interface to include the one or more representations of media content recommendations based on the one or more characteristics of the first user account and the second subset of user accounts.

18. The electronic device of claim 13, the one or more programs further including instructions for:
while the visual indication indicating one or more of the plurality of user accounts associated with the electronic device that are capable of being designated for inclusion in content recommendations includes indications of first one or more user accounts, and while the media browsing user interface includes one or more representations of media content recommendations based on one or more characteristics of one or more of the first one or more user accounts, detecting an indication that a status of a respective user account of the plurality of user accounts with respect to inclusion in content recommendations has changed; and
after detecting the indication that the status of the respective user account with respect to inclusion in content recommendations has changed, displaying, via the display generation component, the media browsing user interface including:
in accordance with a determination that the respective user account is designatable for inclusion in content recommendations:
the visual indication including an indication of the respective user account; and
one or more representations of media content recommendations based on one or more characteristics of one or more of the first one or more user accounts, including the respective user account; and
in accordance with a determination that the respective user account is not designatable for inclusion in content recommendations:
the visual indication not including the indication of the respective user account; and
one or more representations of media content recommendations based on one or more characteristics of one or more of the first one or more user accounts, not including the respective user account.

19. The electronic device of claim 13, wherein the one or more criteria include a criterion that is satisfied if the first user account is capable of being designated for inclusion in content recommendations, and not satisfied if the first user account is not capable of being designated for inclusion in content recommendations, the one or more programs further including instructions for:
in accordance with a determination that the first user account does not satisfy the one or more criteria, the media browsing user interface does not include one or more representations of media content recommendations that are based on one or more characteristics of one or more of the plurality of user accounts.

20. The electronic device of claim 19, wherein the one or more criteria include a criterion that is satisfied if an additional user account other than the first user account is capable of being designated for inclusion in content recommendations, and not satisfied if an additional user account other than the first user account is not capable of being designated for inclusion in content recommendations.

21. The electronic device of claim 13, wherein the one or more representations of media content recommendations based on the one or more characteristics of the first user account and the first subset of user accounts include:
in accordance with a determination that the first subset of user accounts is associated with a first set of content restrictions, first representations of first media content recommendations based on the first set of content restrictions; and
in accordance with a determination that the first subset of user accounts is associated with a second set of content restrictions, different from the first set of content restrictions, second representations of second media content recommendations, without including the first representations of first media content recommendations, based on the second set of content restrictions.

22. The electronic device of claim 13, wherein:
in accordance with a determination that the electronic device is part of the synchronized media and communication session with the one or more second electronic devices, the visual indication includes the one or more user accounts associated with the one or more second electronic devices, and includes a plurality of user accounts configured on the electronic device.

23. The electronic device of claim 13, wherein:
in accordance with a determination that the electronic device is not part of the synchronized media and communication session, the plurality of user accounts includes one or more user accounts configured on the electronic device, including the first user account, and
in accordance with a determination that the electronic device is part of the synchronized media and communication session with the one or more second electronic devices, the plurality of user accounts includes one or more user accounts associated with the one or more second electronic devices.

24. The electronic device of claim 13, the one or more programs further including instructions for:
while the first subset of user accounts been selected for inclusion, receiving, via one or more input devices, a first input corresponding to a request to initiate playback of a first media content recommendation of the media content recommendations based on the one or more characteristics of the first user account and the first subset of user accounts;
in response to receiving the first input, initiating playback of the first media content recommendation; and
after receiving the first input:
in accordance with a determination that the electronic device was part of the synchronized media and communication session with the one or more second electronic devices when the first input was received, initiating a process to update viewing histories of the first subset of user accounts, including the first user account, to reflect consumption of the first media content recommendation; and
in accordance with a determination that the electronic device was not part of the synchronized media and communication session when the first input was received, initiating a process to update viewing histories of one or more user accounts, of the first subset of user accounts, that are associated with one or more users determined by the electronic device to have been watching the first media content recommendation to reflect consumption of the first media content recommendation.

25. A non-transitory computer readable storage medium storing one or more programs, the one or more programs comprising instructions, which when executed by one or more processors of an electronic device, cause the electronic device to perform a method comprising:
while the electronic device is associated with a plurality of user accounts, including a first user account, displaying, via a display generation component, a media browsing user interface associated with the first user account, including displaying, in the media browsing user interface, a visual indication indicating one or more of the plurality of user accounts associated with the electronic device that are capable of being designated for inclusion in content recommendations, including:
in accordance with a determination that the electronic device is part of a synchronized media and communication session with one or more second electronic devices, displaying the visual indication including respective one or more visual indications of one or more user accounts associated with the one or more second electronic devices; and
in accordance with a determination that the electronic device is not part of the synchronized media and communication session with the one or more second electronic devices, displaying the visual indication without including the respective one or more visual indications of the one or more user accounts associated with the one or more second electronic devices; and
in accordance with a determination that the first user account satisfies one or more criteria:
in accordance with a determination that a first subset of user accounts included in the visual indication has been selected for inclusion in content recommendations, displaying, in the media browsing user interface, one or more representations of media content recommendations based on one or more characteristics of the first user account and the first subset of user accounts; and
in accordance with a determination that a second subset of user accounts included in the visual indication, different from the first subset of user accounts, has been selected for inclusion in content recommendations, displaying, in the media browsing user interface, one or more representations of media content recommendations based on one or more characteristics of the first user account and the second subset of user accounts.

26. The non-transitory computer readable storage medium of claim 25, wherein the media browsing user interface includes:
a first region that includes the one or more representations of media content recommendations based on a selected subset of the plurality of user accounts associated with the electronic device, and
a second region that includes one or more representations of media content recommendations not based on the selected subset of the plurality of user accounts associated with the electronic device.

27. The non-transitory computer readable storage medium of claim 25, wherein the plurality of user accounts includes a second user account , and displaying the visual indication indicating the one or more of the plurality of user accounts includes:
in accordance with a determination that the second user account is not capable of being designated for inclusion in content recommendations, displaying the visual indication without including a visual indication of the second user account; and
in accordance with a determination that the second user account is capable of being designated for inclusion in content recommendations, displaying the visual indication including the visual indication of the second user account.

28. The non-transitory computer readable storage medium of claim 25, wherein the plurality of user accounts includes a second user account that is capable of being designated for inclusion in content recommendations, and displaying the visual indication indicating the one or more of the plurality of user accounts includes:
in accordance with a determination that the second user account has been selected for inclusion in content recommendations, displaying the visual indication including a visual indication of the second user account displayed with a first visual appearance; and
in accordance with a determination that the second user account has not been selected for inclusion in content recommendations, displaying the visual indication including the visual indication of the second user account displayed with a second visual appearance, different from the first visual appearance.

29. The non-transitory computer readable storage medium of claim 25, the method further comprising:
while the visual indication indicating the one or more of the plurality of user accounts indicates that the first subset of user accounts has been selected for inclusion in content recommendations, and while displaying, in the media browsing user interface, the one or more representations of media content recommendations based on the one or more characteristics of the first user account and the first subset of user accounts, receiving, via one or more input devices, a first sequence of one or more inputs directed to the visual indication corresponding to a request to select the second subset, not the first subset, of user accounts; and in response to receiving the first sequence of one or more inputs:
updating the visual indication to indicate that the second subset of user accounts has been selected for inclusion in content recommendations; and updating the media browsing user interface to include the one or more representations of media content recommendations based on the one or more characteristics of the first user account and the second subset of user accounts.

30. The non-transitory computer readable storage medium of claim 25, the method further comprising:
while the visual indication indicating one or more of the plurality of user accounts associated with the electronic device that are capable of being designated for inclusion in content recommendations includes indications of first one or more user accounts, and while the media browsing user interface includes one or more representations of media content recommendations based on one or more characteristics of one or more of the first one or more user accounts, detecting an indication that a status of a respective user account of the plurality of user accounts with respect to inclusion in content recommendations has changed; and
after detecting the indication that the status of the respective user account with respect to inclusion in content recommendations has changed, displaying, via the display generation component, the media browsing user interface including:
in accordance with a determination that the respective user account is designatable for inclusion in content recommendations:
the visual indication including an indication of the respective user account; and
one or more representations of media content recommendations based on one or more characteristics of one or more of the first one or more user accounts, including the respective user account; and
in accordance with a determination that the respective user account is not designatable for inclusion in content recommendations:
the visual indication not including the indication of the respective user account; and
one or more representations of media content recommendations based on one or more characteristics of one or more of the first one or more user accounts, not including the respective user account.

31. The non-transitory computer readable storage medium of claim 25, wherein the one or more criteria include a criterion that is satisfied if the first user account is capable of being designated for inclusion in content recommendations, and not satisfied if the first user account is not capable of being designated for inclusion in content recommendations, the method further comprising:
in accordance with a determination that the first user account does not satisfy the one or more criteria, the media browsing user interface does not include one or more representations of media content recommendations that are based on one or more characteristics of one or more of the plurality of user accounts.

32. The non-transitory computer readable storage medium of claim 31, wherein the one or more criteria include a criterion that is satisfied if an additional user account other than the first user account is capable of being designated for inclusion in content recommendations, and not satisfied if an additional user account other than the first user account is not capable of being designated for inclusion in content recommendations.

33. The non-transitory computer readable storage medium of claim 25, wherein the one or more representations of media content recommendations based on the one or more characteristics of the first user account and the first subset of user accounts include:
in accordance with a determination that the first subset of user accounts is associated with a first set of content restrictions, first representations of first media content recommendations based on the first set of content restrictions; and
in accordance with a determination that the first subset of user accounts is associated with a second set of content restrictions, different from the first set of content restrictions, second representations of second media content recommendations, without including the first representations of first media content recommendations, based on the second set of content restrictions.

34. The non-transitory computer readable storage medium of claim 25, wherein:
in accordance with a determination that the electronic device is part of the synchronized media and communication session with the one or more second electronic devices, the visual indication includes the one or more user accounts associated with the one or more second electronic devices, and includes a plurality of user accounts configured on the electronic device.

35. The non-transitory computer readable storage medium of claim 25, wherein:
in accordance with a determination that the electronic device is not part of the synchronized media and communication session, the plurality of user accounts includes one or more user accounts configured on the electronic device, including the first user account, and
in accordance with a determination that the electronic device is part of the synchronized media and communication session with the one or more second electronic devices, the plurality of user accounts includes one or more user accounts associated with the one or more second electronic devices.

36. The non-transitory computer readable storage medium of claim 25, the method further comprising:
while the first subset of user accounts been selected for inclusion, receiving, via one or more input devices, a first input corresponding to a request to initiate playback of a first media content recommendation of the media content recommendations based on the one or more characteristics of the first user account and the first subset of user accounts;
in response to receiving the first input, initiating playback of the first media content recommendation; and
after receiving the first input:
in accordance with a determination that the electronic device was part of the synchronized media and communication session with the one or more second electronic devices when the first input was received, initiating a process to update viewing histories of the first subset of user accounts, including the first user account, to reflect consumption of the first media content recommendation; and in accordance with a determination that the electronic device was not part of the synchronized media and communication session when the first input was received, initiating a process to update viewing histories of one or more user accounts, of the first subset of user accounts, that are associated with one or more users determined by the electronic device to have been watching the first media content recommendation to reflect consumption of the first media content recommendation.

* * * * *

UNITED STATES PATENT AND TRADEMARK OFFICE
CERTIFICATE OF CORRECTION

| | | |
|---|---|---|
| PATENT NO. | : 12,010,364 B2 | Page 1 of 1 |
| APPLICATION NO. | : 17/805356 | |
| DATED | : June 11, 2024 | |
| INVENTOR(S) | : Christopher J. Sanders et al. | |

It is certified that error appears in the above-identified patent and that said Letters Patent is hereby corrected as shown below:

In the Claims
In Column 76, Line 58, in Claim 15, please delete "account ," and insert --account,--.
In Column 80, Line 31, in Claim 27, please delete "account ," and insert --account,--.

Signed and Sealed this
Eighteenth Day of November, 2025

John A. Squires
*Director of the United States Patent and Trademark Office*